US012514143B2

(12) United States Patent
Koyama et al.

(10) Patent No.: US 12,514,143 B2
(45) Date of Patent: Jan. 6, 2026

(54) AGRICULTURAL MACHINE, AGRICULTURAL WORK ASSISTANCE APPARATUS, AND AGRICULTURAL WORK ASSISTANCE SYSTEM

(71) Applicant: KUBOTA CORPORATION, Osaka (JP)

(72) Inventors: Yu Koyama, Sakai (JP); Kohei Okura, Sakai (JP); Ryota Kikuchi, Sakai (JP); Fumiya Yoshimura, Sakai (JP)

(73) Assignee: KUBOTA CORPORATION, Osaka (JP)

(*) Notice: Subject to any disclaimer, the term of this patent is extended or adjusted under 35 U.S.C. 154(b) by 196 days.

(21) Appl. No.: 18/231,853

(22) Filed: Aug. 9, 2023

(65) Prior Publication Data

US 2023/0380323 A1    Nov. 30, 2023

Related U.S. Application Data

(63) Continuation of application No. PCT/JP2021/046011, filed on Dec. 14, 2021.

(30) Foreign Application Priority Data

Feb. 16, 2021 (JP) ................. 2021-022620

(51) Int. Cl.
*A01B 69/04* (2006.01)
*G05D 1/00* (2006.01)

(52) U.S. Cl.
CPC ......... *A01B 69/008* (2013.01); *G05D 1/0219* (2013.01)

(58) Field of Classification Search
CPC .............. A01B 69/008; G05D 1/0219; G05D 2105/15; G05D 2107/21; G05D 2109/10; G05D 1/229; G05D 1/648
See application file for complete search history.

(56) References Cited

U.S. PATENT DOCUMENTS

2011/0084851 A1* 4/2011 Peterson ............. A01M 7/0089
340/902
2015/0319913 A1 11/2015 Foster et al.
(Continued)

FOREIGN PATENT DOCUMENTS

CN 113124870 A * 7/2021 ............. G01C 21/20
EP 2984916 A1 * 2/2016 ............. A01B 9/007
(Continued)

OTHER PUBLICATIONS

WO2021145009A1 (Year: Jul. 2021).*
(Continued)

*Primary Examiner* — Ramon A. Mercado
*Assistant Examiner* — Shaheda Hoque
(74) *Attorney, Agent, or Firm* — Keating & Bennett, LLP

(57) ABSTRACT

An agricultural machine includes a traveling vehicle body, a connector to connect a working device for agricultural work to the traveling vehicle body, a route creator to create a travel route along which the traveling vehicle body is to travel, a supply point setter to set, at a location off the travel route, a supply point where supply of material used during the agricultural work is to be received, a position detector to detect a position of the traveling vehicle body, an automatic operation controller to cause the traveling vehicle body to travel based on the position of the traveling vehicle body and the travel route and cause the traveling vehicle body to move to the supply point, and a notifier to provide a notification indicating that the traveling vehicle body is about to move to the supply point, while the automatic operation controller causes the traveling vehicle body to travel.

13 Claims, 39 Drawing Sheets

(56) References Cited

U.S. PATENT DOCUMENTS

| | | | |
|---|---|---|---|
| 2017/0168501 A1* | 6/2017 | Ogura | G05D 1/2232 |
| 2019/0122454 A1* | 4/2019 | Fukunaga | A01B 69/008 |
| 2020/0064144 A1* | 2/2020 | Tomita | B62D 6/00 |
| 2022/0232750 A1 | 7/2022 | Shirafuji et al. | |

FOREIGN PATENT DOCUMENTS

| | | | | |
|---|---|---|---|---|
| JP | 2016-007196 A | | 1/2016 | |
| JP | 2016093127 A | * | 5/2016 | |
| JP | 2017127292 A | * | 7/2017 | |
| JP | 2018-000039 A | | 1/2018 | |
| JP | 2018102219 A | * | 7/2018 | |
| JP | 2020-103092 A | | 7/2020 | |
| JP | 2020-129393 A | | 8/2020 | |
| JP | 2020-184974 A | | 11/2020 | |
| JP | 7265347 B2 | * | 4/2023 | |
| WO | 2011045650 A2 | | 4/2011 | |
| WO | WO-2017154715 A1 | * | 9/2017 | A01B 9/008 |
| WO | 2017195395 A1 | | 11/2017 | |
| WO | 2021145009 A1 | | 7/2021 | |

OTHER PUBLICATIONS

Official Communication issued in corresponding European Patent Application No. 21926777.0, mailed on Dec. 23, 2024, 11 pages.
Official Communication issued in International Patent Application No. PCT/JP2021/046011, mailed on Mar. 8, 2022.

\* cited by examiner

Fig.18

Enter material information

Enter material information about the added material and press "Next" button.
In the case of manual operation, press "Next" button without entering information.

| Theoretical remaining amount | 150 | kg |
| Amount of material introduced | 50 | kg |
| Amount of material consumption | 10 | kg/10a (1,000m²) |
| Remaining amount for entering material-supply-receiving mode Remaining amount | 40 | % |

Rest remaining amount — B19
+ — B45
− — B46
Next — B9
Back — B8

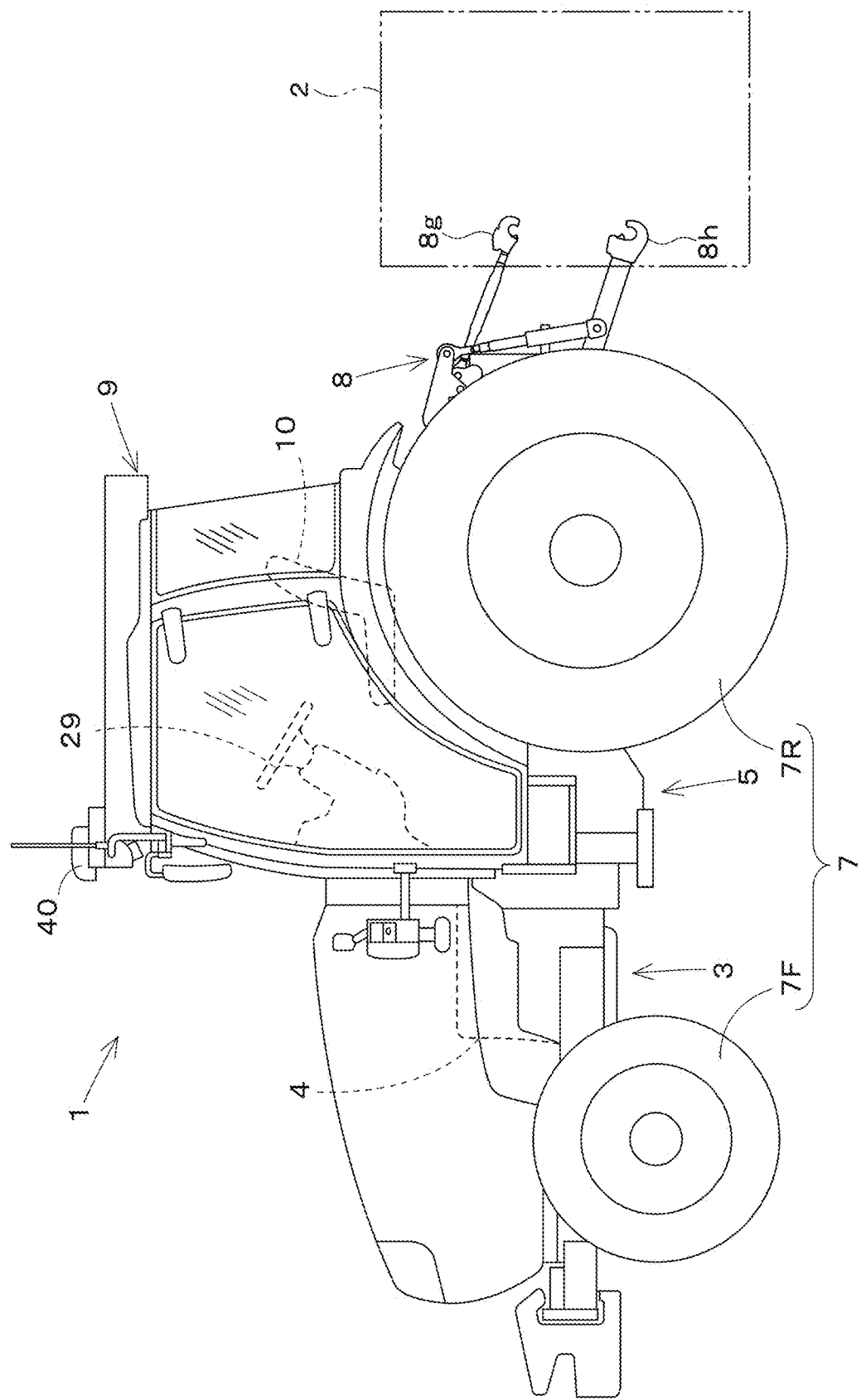

AGRICULTURAL MACHINE, AGRICULTURAL WORK ASSISTANCE APPARATUS, AND AGRICULTURAL WORK ASSISTANCE SYSTEM

CROSS REFERENCE TO RELATED APPLICATIONS

This application is a continuation application of International Application No. PCT/JP2021/046011, filed on Dec. 14, 2021, which claims the benefit of priority to Japanese Patent Application No. 2021-022620, filed on Feb. 16, 2021. The entire contents of each of these applications are hereby incorporated herein by reference.

BACKGROUND OF THE INVENTION

1. Field of the Invention

The present invention relates to an agricultural machine that performs agricultural work while traveling in an agricultural field, and an agricultural work assistance apparatus and an agricultural work assistance system that support the agricultural work.

2. Description of the Related Art

Japanese Unexamined Patent Application Publication No. 2018-000039 discloses a technique to support agricultural work performed by a working device connected to an agricultural machine while the agricultural machine is caused to travel by automatic operation in an agricultural field. The agricultural machine disclosed in Japanese Unexamined Patent Application Publication No. 2018-000039 includes an acquirer, a work setter, a material remaining amount detector, and a material notifier. The acquirer acquires position data of a peripheral portion of the agricultural field. Based on the position data of the peripheral portion of the agricultural field, the work setter sets a work travel line and a turn line along which the agricultural machine travels in the agricultural field, a work start point, and a work end point. The material remaining amount detector detects the remaining amount of a material provided on the agricultural machine. When the remaining material is running low, the material notifier provides, to an operator, a notification indicating that the supply of material should be received near a footpath. After this notification, in response to an operation of a switch by the operator or automatically, the agricultural machine stops traveling and working along the work traveling line where the agricultural machine is currently located, and then moves to the vicinity of the nearby footpath.

SUMMARY OF THE INVENTION

In the technique of Japanese Unexamined Patent Application Publication No. 2018-000039, when the remaining material is running low during the travel/work performed by the agricultural machine by automatic operation, the material notifier provides a notification indicating that the supply of material should be received. However, when the agricultural machine thereafter behaves differently from during the work, such as moving to the vicinity of a footpath where the supply of material can be received, the user who has looked at the behavior may misunderstand that the user is in danger and immediately stop the agricultural machine. If the agricultural machine is stopped suddenly in this way, the efficiency of material supply will decrease and the work efficiency of the agricultural work will also decrease.

Preferred embodiments of the present invention make it possible to efficiently supply an agricultural machine with material.

An agricultural machine according to an aspect of a preferred embodiment of the present invention includes a traveling vehicle body to travel, a connector to connect a working device for agricultural work to the traveling vehicle body, a route creator to create a travel route along which the traveling vehicle body is to travel by automatic operation, a supply point setter to set, at a location that is off the travel route, a supply point at which supply of a material used during agricultural work performed by the working device is to be received, a position detector to detect a position of the traveling vehicle body, an automatic operation controller to cause the traveling vehicle body to travel by automatic operation based on the position of the traveling vehicle body and the travel route and cause the traveling vehicle body to move to the supply point, and a notifier to provide a notification indicating that the traveling vehicle body is about to move toward the supply point, while the automatic operation controller causes the traveling vehicle body to travel by automatic operation.

In an aspect of a preferred embodiment of the present invention, the notifier may provide a plurality of the notifications each indicating that the traveling vehicle body is about to move toward the supply point at one or more predetermined intervals, before the traveling vehicle body moves toward the supply point.

In an aspect of a preferred embodiment of the present invention, the automatic operation controller may perform an automatic traveling-and-working mode in which the automatic operation controller causes the working device to perform agricultural work while causing the traveling vehicle body to travel by automatic operation based on the position of the traveling vehicle body and the travel route, and perform a material-supply-receiving mode in which the automatic operation controller causes the traveling vehicle body to move to the supply point by automatic operation upon the traveling vehicle body reaching a predetermined point on the travel route that is just before the supply point during the automatic traveling-and-working mode. The notifier may provide, during the automatic traveling-and-working mode, the notification indicating that the traveling vehicle body is about to move toward the supply point, based on the position of the traveling vehicle body and the supply point.

In an aspect of a preferred embodiment of the present invention, the notifier may provide a notification of at least one of information indicating that the material is running short, information indicating the supply point, or information indicating a behavior of at least one of the traveling vehicle body or the working device in the material-supply-receiving mode.

In an aspect of a preferred embodiment of the present invention, the travel route includes work route portions along which agricultural work is to be performed by the working device while the traveling vehicle body travels, and turn route portions along each of which the traveling vehicle body is to turn from one of adjacent ones of the work route portions to the other of the adjacent ones of the work route portions. The notifier may provide the notification indicating that the traveling vehicle body is about to move toward the supply point, when the traveling vehicle body travels based on one of the work route portions or one of the turn route portions before moving toward the supply point.

In an aspect of a preferred embodiment of the present invention, the agricultural machine according further includes a remaining amount calculator to calculate a remaining amount of the material based on the amount of the material introduced into the working device and the amount of the material consumed during agricultural work performed by the working device. The supply point setter may predict a below-threshold point at which the remaining amount of the material falls below a predetermined threshold because of agricultural work performed by the working device while the traveling vehicle body travels, and set the supply point on an extension of one of the work route portions that includes the below-threshold point, the extension extending in a direction opposite to a direction of travel. The notifier may set a notification point on another of the work route portions along which the traveling vehicle body travels before the one of the work route portions, and provide the notification indicating that the traveling vehicle body is about to move toward the supply point when the traveling vehicle body passes the notification point.

In an aspect of a preferred embodiment of the present invention, the agricultural machine further includes an input to receive input of the amount of the material introduced and the amount of the material consumption per unit area. The remaining amount calculator may, before or during travel of the traveling vehicle body by automatic operation, calculate the remaining amount of the material based on the amount of the material introduced, the amount of the material consumption per unit area, and states of the traveling vehicle body and the working device The supply point setter may, before or during travel of the traveling vehicle body by automatic operation, set the supply point based on the remaining amount of the material. The notifier may, before or during travel of the traveling vehicle body by automatic operation, set the notification point based on the supply point.

In an aspect of a preferred embodiment of the present invention, the agricultural machine may further include a threshold changer to change the threshold.

In an aspect of a preferred embodiment of the present invention, the agricultural machine may further include a display to display, on a screen, the notification provided by the notifier.

In an aspect of a preferred embodiment of the present invention, the agricultural machine may further include a warning generator to issue a warning indicating, via sound or light, the notification provided by the notifier.

An agricultural work assistance apparatus according to an aspect of a preferred embodiment of the present invention includes a route creator to create a travel route along which a traveling vehicle body of an agricultural machine is to travel by automatic operation, a supply point setter to set, at a location that is off the travel route, a supply point at which supply of a material used during agricultural work performed by a working device connected to the traveling vehicle body is to be received, and a notifier to provide a notification indicating that the traveling vehicle body is about to move toward the supply point, while the agricultural machine causes the traveling vehicle body to travel by automatic operation based on a position of the traveling vehicle body detected by a position detector and the travel route.

The agricultural work assistance apparatus may further include a remaining amount calculator to calculate a remaining amount of the material for the supply point setter to set the supply point, an input to receive input of one or more parameters for the remaining amount calculator to calculate the remaining amount of the material, and a display to display the travel route, the position of the traveling vehicle body, and the notification provided by the notifier.

An agricultural work assistance system according to an aspect of a preferred embodiment of the present invention includes a route creator to create a travel route along which a traveling vehicle body of an agricultural machine is to travel by automatic operation, a supply point setter to set, at a location that is off the travel route, a supply point at which supply of a material used during agricultural work performed by a working device connected to the traveling vehicle body is to be received, a position detector to detect a position of the traveling vehicle body, an automatic operation controller to cause the traveling vehicle body to travel by automatic operation based on the position of the traveling vehicle body and the travel route and cause the traveling vehicle body to move to the supply point, and a notifier to provide a notification indicating that the traveling vehicle body is about to move toward the supply point, while the automatic operation controller causes the traveling vehicle body to travel by automatic operation based on the position of the traveling vehicle body detected by the position detector and the travel route.

In an aspect of a preferred embodiment of the present invention, the agricultural work assistance system may include the agricultural machine, and an agricultural work assistance apparatus provided in or on the agricultural machine. The agricultural machine may include the position detector and the automatic operation controller. The agricultural work assistance apparatus may include the route creator, the supply point setter, the notifier, and a communicator to communicate with the automatic operation controller and the position detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 18 illustrates an example of a material information input screen of the agricultural work assistance apparatus.

FIG. 24 is a general side view of a working vehicle.

DETAILED DESCRIPTION OF THE PREFERRED EMBODIMENTS

Figure 1:
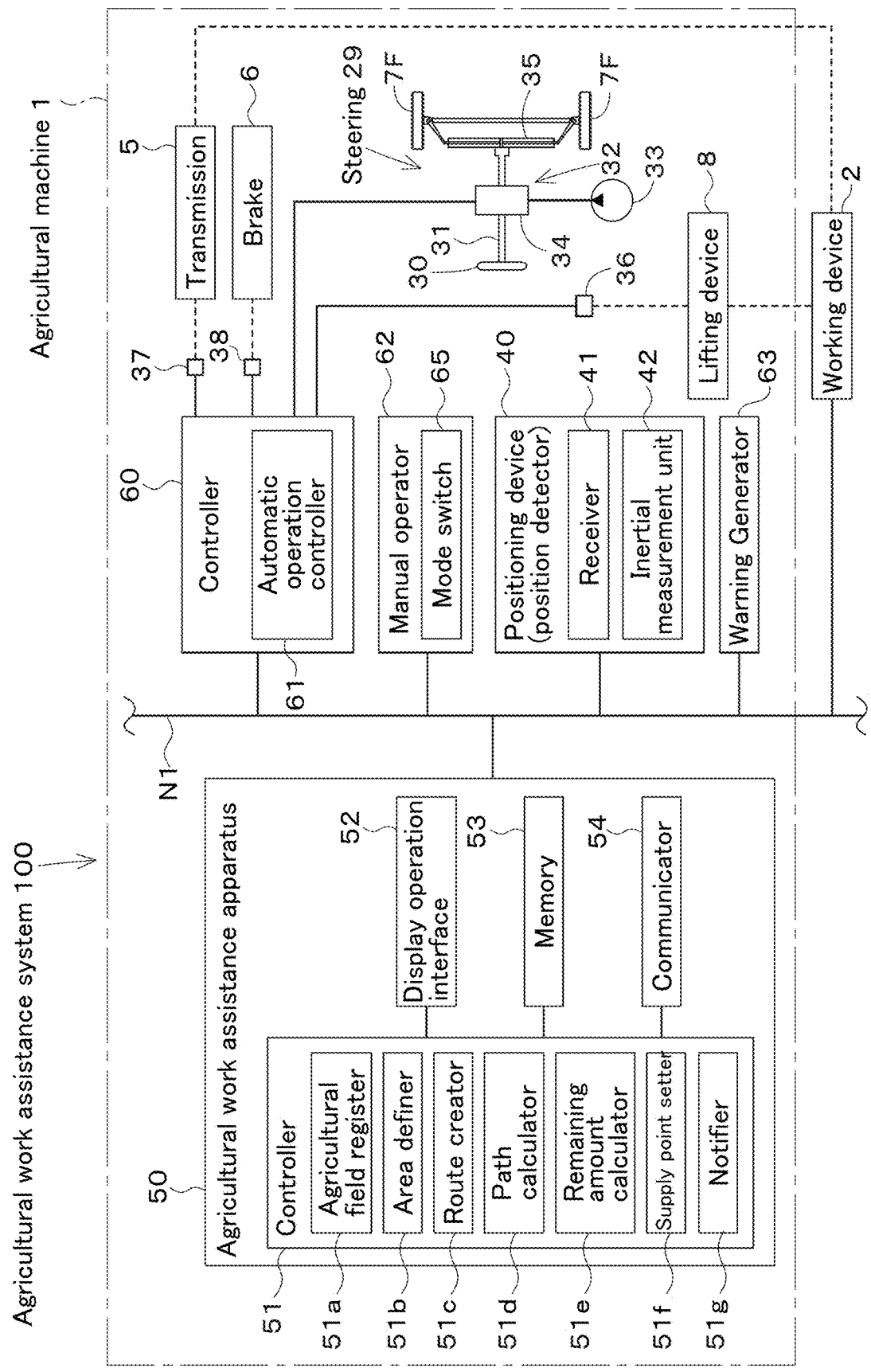
FIG. 1 is a block diagram of an agricultural work assistance system.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described below with reference to the drawings.

FIG. 24 is a general side view of an agricultural machine 1. The agricultural machine 1 of the present preferred embodiment is a tractor. Note that the agricultural machine 1 is not limited to a tractor, and may be another agricultural machine such as a rice transplanter or a combine, a working vehicle that performs agricultural work other than a tractor, or the like.

The agricultural machine 1 includes a traveling vehicle body 3, a prime mover 4, a transmission 5, and a traveling device 7. The traveling device 7 includes front wheels 7F and rear wheels 7R. The front wheels 7F may be in the form of tires or crawlers. The rear wheels 7R may also be in the form of tires or crawlers. The prime mover 4 includes a diesel engine, an electric motor, and/or the like. The transmission 5 can change a propelling force of the traveling device 7 by changing speed stages, and can also switch between forward traveling and backward traveling of the traveling device 7. A driving force from the prime mover 4 is transmitted to the traveling device 7 by the transmission 5 and drives the traveling device 7, so that the traveling vehicle body 3 travels forward or backward. The left side in FIG. 24 is the front of the traveling vehicle body 3, and the right side in FIG. 24 is the rear of the traveling vehicle body 3.

The traveling vehicle body 3 is provided with a cabin 9. An operator's seat 10 is provided inside the cabin 9. A lifting device 8 including a three-point linkage and/or the like is provided at a rear portion of the traveling vehicle body 3. The lifting device 8 is provided with connectors 8g and 8h to which a working device 2 for agricultural work is connectable. The working device 2 is connected to the connectors 8g and 8h, so that the working device 2 and the traveling vehicle body 3 are coupled to each other and the traveling vehicle body 3 can tow the working device 2.

The working device 2 performs ground work on an agricultural field. Examples of the working device 2 include a tiller (rotary tiller) that performs tillage of an agricultural field, a stubble cultivator that performs stubble cultivation, a harrow (drive harrow) that performs puddling, a spreader that spreads fertilizer, agricultural chemicals, or the like, a seeder that performs seeding, a transplanter that transplants seedlings, a harvester that performs harvesting, and the like.

FIG. 1 is a block diagram of an agricultural work assistance system 100.

The agricultural work assistance system 100 includes an agricultural work assistance apparatus 50. The agricultural work assistance system 100 and the agricultural work assistance apparatus 50 support agricultural work performed by the working device 2 while the traveling vehicle body 3 of the agricultural machine 1 travels in an agricultural field.

The agricultural machine 1 includes a controller 60, a manual operator 62, the transmission 5, a brake 6, a steering 29, the lifting device 8, a positioning device 40, and a warning generator 63. In the agricultural machine 1, an in-vehicle network N1 such as LAN and/or CAN is built. The controller 60, the manual operator 62, the positioning device 40, and the warning generator 63 are connected to the in-vehicle network N1. These elements 60, 62, 5, 6, 29, 8, 40, 63, and N1 of the agricultural machine 1 are included in the agricultural work assistance system 100.

The controller 60 includes electric circuit(s) and/or the like including a CPU and one or more memories. The controller 60 is configured or programmed to control operation of each element of the agricultural machine 1. The controller 60 includes an automatic operation controller 61 that controls operations of the traveling vehicle body 3 (FIG. 24) of the agricultural machine 1 and the working device 2. The manual operator 62 includes switch(es), lever(s), pedal(s), other key(s), and/or the like that are operable by a user such as an operator seated on the operator's seat 10 or a worker in the vicinity of the agricultural machine 1. The manual operator 62 includes a mode switch 65. The mode switch 65 is operated to switch the mode of the agricultural machine 1.

The transmission 5 is connected to a control valve 37. The control valve 37 is a solenoid valve that is actuated based on a control signal transmitted from the controller 60. The control valve 37 is supplied with hydraulic fluid delivered by a hydraulic pump 33. The control valve 37 is depicted as a single block in FIG. 1. However, an appropriate number of control valves 37 are provided depending on the number of hydraulic devices such as hydraulic clutch(es) and hydraulic cylinder(s) provided in the transmission 5.

The automatic operation controller 61 controls driving of the transmission 5 by electrically controlling the switching position and the degree of opening of the control valve 37. The transmission 5 transmits a driving force from the prime mover 4 to the traveling device 7, so that the traveling device 7 is actuated to cause the traveling vehicle body 3 to travel forward or backward. For example, in the case where the working device 2 is a ground implement or the like, the transmission 5 transmits the driving force from the prime mover 4 to the working device 2. This increases the operating force of the working device 2.

The automatic operation controller 61 communicates with the working device 2 via the in-vehicle network N1. Specifically, the working device 2 includes a controller and a communicator (not illustrated). The automatic operation controller 61 transmits a work command to the working device 2 via the in-vehicle network N1. Upon receiving the work command at the communicator, the controller of the working device 2 controls, based on the work command, the operation of element(s) of the working device 2 to perform agricultural work (ground work). The controller of the working device 2 also transmits, via the communicator, information and/or data indicating the manner in which work is performed and/or the like to the controller 60 over the in-vehicle network N1. The automatic operation controller 61 detects the manner in which work is performed by the working device 2 and/or the like, based on the information and/or data received from the working device 2 via the in-vehicle network N1.

The brake 6 is connected to a control valve 38. The control valve 38 is a solenoid valve that is actuated based on a control signal transmitted from the controller 60. The control valve 38 is supplied with hydraulic fluid delivered by the hydraulic pump 33. The automatic operation controller 61 actuates the brake 6 to brake the traveling vehicle body 3 by electrically controlling the switching position and the degree of opening of the control valve 38.

The steering 29 includes a steering handle (steering wheel) 30, a rotation shaft (steering shaft) 31, and an assist mechanism (power steering mechanism) 32. The steering handle 30 is provided inside the cabin 9 (FIG. 24). The rotation shaft 31 rotates with the rotation of the steering handle 30. The assist mechanism 32 assists in steering performed by the steering handle 30.

The assist mechanism 32 includes a control valve 34 and a steering cylinder 35. The control valve 34 is a solenoid valve that is actuated based on a control signal transmitted from the controller 60. Specifically, the control valve 34 is a three-way switching valve that is switchable by movement of a spool or the like. The control valve 34 is supplied with hydraulic fluid delivered by the hydraulic pump 33. The controller 60 adjusts hydraulic pressure supplied to the steering cylinder 35 to cause the steering cylinder 35 to extend or retract by electrically controlling the switching position and the degree of opening of the control valve 34. The steering cylinder 35 is connected to knuckle arms (not illustrated) that change the orientation of the front wheels 7F.

The control valve 34 can be switched also by steering using the steering shaft 31. Specifically, the steering handle 30 is operated, so that the steering shaft 31 rotates according to the manner in which the steering handle 30 is operated, and the switching position and the degree of opening of the control valve 34 are switched. The steering cylinder 35 extends or retracts leftward or rightward relative to the traveling vehicle body 3 according to the switching position and the degree of opening of the control valve 34. This extension or retraction of the steering cylinder 35 changes the steering direction of the front wheels 7F. Note that the steering 29 described above is an example, and the configuration described above does not imply any limitation.

The traveling vehicle body 3 of the agricultural machine 1 can be manually steered by manual operation of the steering handle 30 and automatically steered by the automatic operation controller 61. The transmission 5 and/or the brake 6 are driven according to the manner in which an accelerator member and/or a brake member (both of which are not illustrated) included in the manual operator 62 is/are manually operated, so that the traveling vehicle body 3 can travel and/or stop. Further, the traveling vehicle body 3 can automatically travel and stop according to the manner in which the transmission 5 and the brake 6 are controlled by the automatic operation controller 61.

Figure 2:
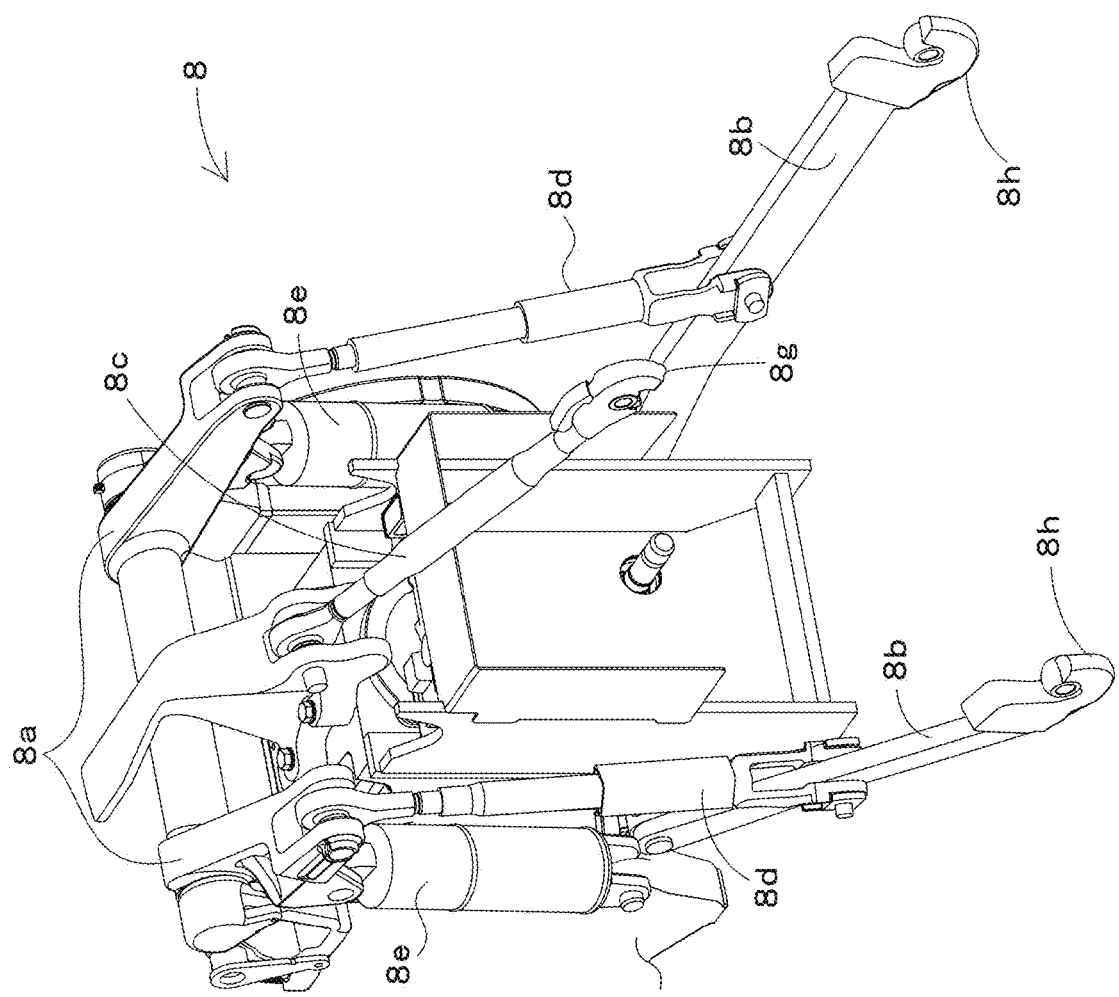
FIG. 2 is a perspective view of a lifting device.

FIG. 2 is a perspective view of the lifting device 8. The lifting device 8 includes lift arm(s) 8a, lower link(s) 8b, top link(s) 8c, lift rod(s) 8d, and lift cylinder(s) 8e. Front end portions of the lift arms 8a are supported by an upper rear portion of a case (transmission case) housing the transmission 5 (FIG. 24) such that the lift arms 8a are swingable upward and downward. The lift arms 8a are caused to swing (are raised/lowered) by driving the lift cylinders 8e. The lift cylinders 8e include respective hydraulic cylinders. The lift cylinders 8e are connected to a control valve 36 illustrated in FIG. 1. The control valve 36 is a solenoid valve that is actuated based on a control signal transmitted from the controller 60. The control valve 36 is supplied with hydraulic fluid delivered by the hydraulic pump 33.

Front end portions of the lower links 8b illustrated in FIG. 2 are supported by a lower rear portion of the transmission 5 (FIGS. 1 and 24) such that the lower links 8b are swingable upward and downward. A front end portion of the top link 8c is supported by a rear portion of the transmission 5 at a position higher than the lower links 8b such that the top link 8c is swingable upward and downward. The lift rods 8d connect the respective lift arms 8a and the respective lower links 8b. Rear end portions of the lower links 8b and the top link 8c are provided with the connectors 8g and 8h to which the working device 2 is connectable.

The automatic operation controller 61 illustrated in FIG. 1 adjusts hydraulic pressure supplied to the lift cylinders 8e illustrated in FIG. 2 to cause the lift cylinders 8e to extend or retract by electrically controlling the switching position and the degree of opening of the control valve 36. The extension or retraction of the lift cylinders 8e causes the lift arms 8a to be raised or lowered and cause the lower links 8b connected to the lift arms 8a via the lift rods 8d to be raised or lowered. With this, the working device 2 swings upward or downward (is raised or lowered) about the front portions of the lower links 8b (the opposite side of the lower links 8b from the connectors 8g and 8h).

The positioning device 40 illustrated in FIG. 1 includes a receiver 41 and an inertial measurement unit (IMU) 42. The receiver 41 receives satellite signal(s) (position(s) of positioning satellite(s), transmission time(s), correction information, and/or the like) transmitted from a satellite positioning system (positioning satellite(s)) such as D-GPS, GPS, GLONASS, BeiDou, Galileo, or Michibiki. The positioning device 40 detects the current position (for example, latitude and longitude) based on the satellite signals received by the receiver 41. That is, the positioning device 40 is a position detector to detect the position of the traveling vehicle body 3 of the agricultural machine 1. The inertial measurement unit 42 includes an acceleration sensor, a gyroscope sensor, and/or the like. The inertial measurement unit 42 detects the roll angle, the pitch angle, the yaw angle, and/or the like of the traveling vehicle body 3. The warning generator 63 includes a buzzer, a speaker, a warning lamp, and/or the like provided in or on the traveling vehicle body 3. The warning generator 63 issues a warning to people around the traveling vehicle body 3 via sound or light.

The agricultural work assistance apparatus 50 includes, for example, a portable tablet terminal device or the like. The agricultural work assistance apparatus 50 is provided, for example, inside the cabin 9 of the agricultural machine 1 and is removably attached to the agricultural machine 1. That is, the agricultural machine 1 includes the agricultural work assistance apparatus 50.

The agricultural work assistance apparatus 50 includes a controller 51, a display operation interface 52, a memory 53, and a communicator 54. The controller 51 includes a CPU and one or more memories, and controls elements of the agricultural work assistance apparatus 50. The controller 51 includes an agricultural field register 51a, an area definer 51b, a route creator 51c, a path calculator 51d, a remaining amount calculator 51e, a supply point setter 51f, and a notifier 51g. Each of these elements includes software program(s), but may include hardware.

The display operation interface 52 includes a touch pad, and displays various kinds of information on a screen. By performing predetermined operations on a display screen of the display operation interface 52, it is possible to make various inputs. The display operation interface 52 is a display and an input. The agricultural work assistance apparatus 50 may be provided with an independent display and an independent interface (input), instead of the display operation interface 52.

The memory 53 includes a nonvolatile memory and/or the like. The memory 53 is a read/write memory which stores information and data to support travel and work performed by the agricultural machine 1. The communicator 54 includes an interface for connection to the in-vehicle network N1. The controller 51 communicates with the controller 60, the manual operator 62, the positioning device 40, the warning generator 63, and the working device 2 over the in-vehicle network N1 via the communicator 54.

Figure 3:
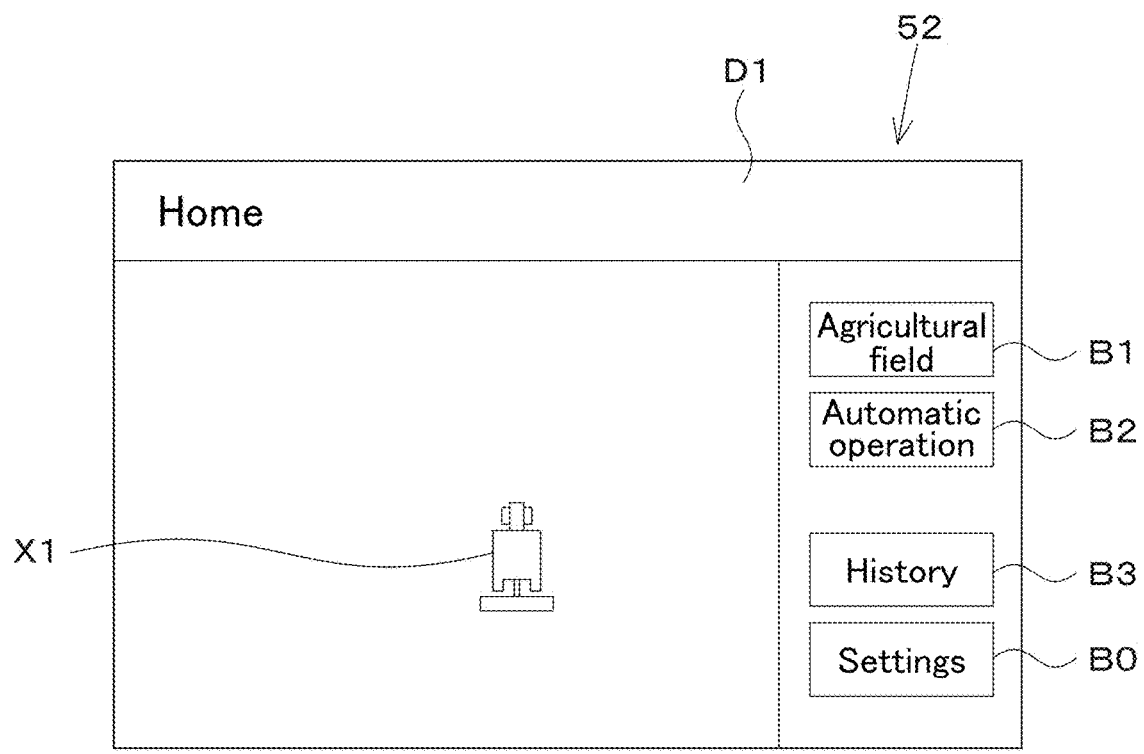
FIG. 3 illustrates an example of a home screen of an agricultural work assistance apparatus.

Upon startup of the agricultural work assistance apparatus 50, the controller 51 causes the display operation interface 52 to display a home screen D1 illustrated in FIG. 3. The memory 53 stores data of this home screen D1 and data of screens D2 to D9 described later. The controller 51 reads the data from the memory 53 when necessary and causes the display operation interface 52 to display a screen based on the data.

The home screen D1 displays an agricultural machine symbol X1, an agricultural field key B1, an automatic operation key B2, a history key B3, and a settings key B0. The settings key B0 is a key used to make various settings. By selecting (tapping) the settings key B0, predetermined item(s) can be set. Examples of the predetermined items include settings (registration) of the agricultural machine 1 provided with the agricultural work assistance apparatus 50 and those of the working device 2 connected to the agricultural machine 1, settings of the manner in which the display operation interface 52 performs display, and the like.

The agricultural field key B1 is a key used to register an agricultural field in which the agricultural machine 1 is to perform agricultural work. The automatic operation key B2 is a key used to perform settings and prediction related to an automatic traveling-and-working mode of the agricultural machine 1. The automatic traveling-and-working mode is a mode of causing the working device 2 to perform agricultural work (ground work) while causing the traveling vehicle body 3 of the agricultural machine 1 to travel by automatic operation. The automatic operation of the agricultural machine 1 refers to automatically changing the travel speed of the traveling vehicle body 3 and automatically steering the traveling vehicle body 3.

Note that the agricultural machine 1 can be caused to travel also by manual operation, and can perform ground work with the working device 2 during the traveling. The manual operation of the agricultural machine 1 refers to changing the traveling speed of the traveling vehicle body 3 by an operator of the agricultural machine 1 operating an accelerator member or a brake member of the manual operator 62 and steering the traveling vehicle body 3 by the operator operating the steering handle 30 (FIG. 1).

Figure 4:
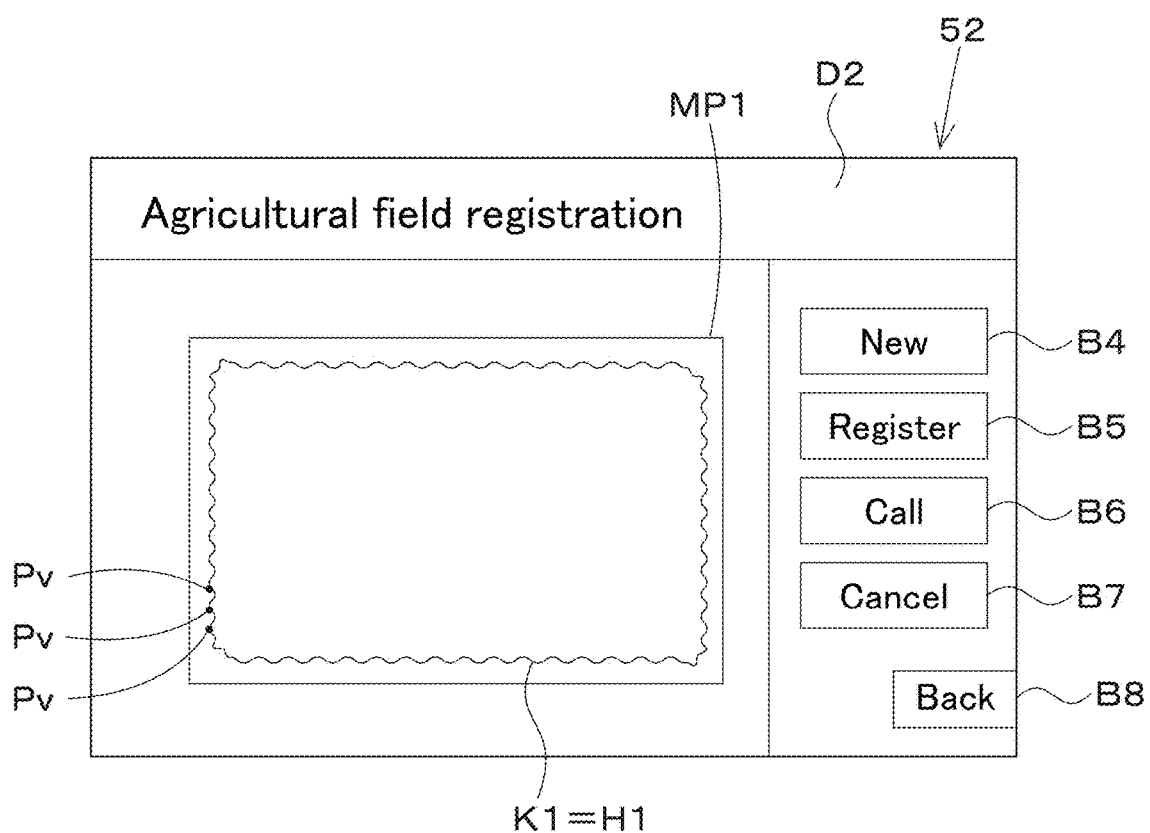
FIG. 4 illustrates an example of an agricultural field registration screen of the agricultural work assistance apparatus.

The history key B3 on the home screen D1 in FIG. 3 is a key used to display a work history of the agricultural machine 1. When a user selects the agricultural field key B1 on the home screen D1, the controller 51 causes the display operation interface 52 to display the agricultural field registration screen D2 as illustrated in FIG. 4. The agricultural field registration screen D2 displays a map MP1, position(s) Pv of the traveling vehicle body 3 of the agricultural machine 1, a new key B4, a register key B5, a call key B6, a cancel key B7, and a back key B8. The map MP1 displays an image depicting a map of an area around the agricultural machine 1 acquired from the positioning device 40. The map MP1 also displays an agricultural field in which the agricultural machine 1 performs agricultural work and which is associated with position information such as latitude and longitude. The user performs a predetermined operation on the map MP1, so that the map displayed in the map MP1 is zoomed in or out or a displayed portion of the map is moved.

Figure 5A:
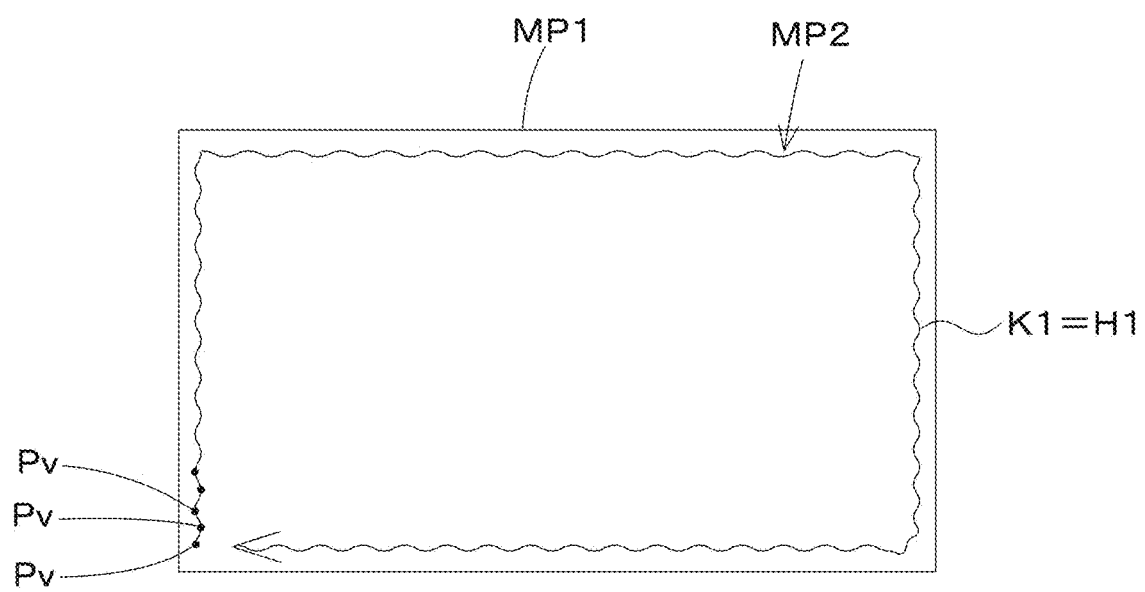
FIG. 5A describes a method of registering an agricultural field.

FIG. 5A illustrates a method of registering an agricultural field. For example, the user (operator of the agricultural machine 1) selects the new key B4 on the agricultural field registration screen D2 in FIG. 4, and causes the agricultural machine 1 to go around the agricultural field by manual operation. In so doing, the agricultural field register 51a (FIG. 1) acquires, at predetermined intervals using the communicator 54, the position Pv of the traveling vehicle body 3 detected by the positioning device 40 and continually records data of the position Pv. The controller 51 also causes such positions Pv of the traveling vehicle body 3 to be displayed on the map MP1 continually. In FIGS. 4 and 5A, only some of such positions Pv of the traveling vehicle body 3 are displayed for convenience.

After the agricultural machine 1 has gone around the agricultural field, the user selects the register key B5. Upon the selection, the agricultural field register 51*a* calculates a travel path K1 of the traveling vehicle body 3 based on the recorded positions Pv of the traveling vehicle body 3. The controller 51 also causes the travel path K1 of the traveling vehicle body 3 to be displayed on the map MP1 as illustrated in FIG. 5A. In the example of FIG. 5A, the line K1 passing through the positions Pv of the traveling vehicle body 3 in the detected order (acquired order) and then returning to the first detected position Pv is the travel path of the traveling vehicle body 3.

Next, the agricultural field register 51*a* defines the travel path K1 as a contour (outer shape) H1 of the agricultural field and registers (stores) an agricultural field map MP2 (data representing the contour of the agricultural field) indicated by the contour H1 in the memory 53. In so doing, the agricultural field register 51*a* also registers agricultural field identification information such as an agricultural field name and/or an agricultural field number in the memory 53 such that the agricultural field identification information is associated with the agricultural field map MP2. For example, the agricultural field identification information may be assigned by the agricultural field register 51*a*, may be input by the user operating the display operation interface 52, or may be stored in the memory 53 in advance. A plurality of the agricultural field maps MP2 and the like can be registered in the memory 53. After the agricultural field register 51*a* registers the agricultural field map MP2, the controller 51 causes the agricultural field map MP2 (the contour H1 of the agricultural field) to be displayed on the map MP1.

Figure 5B:
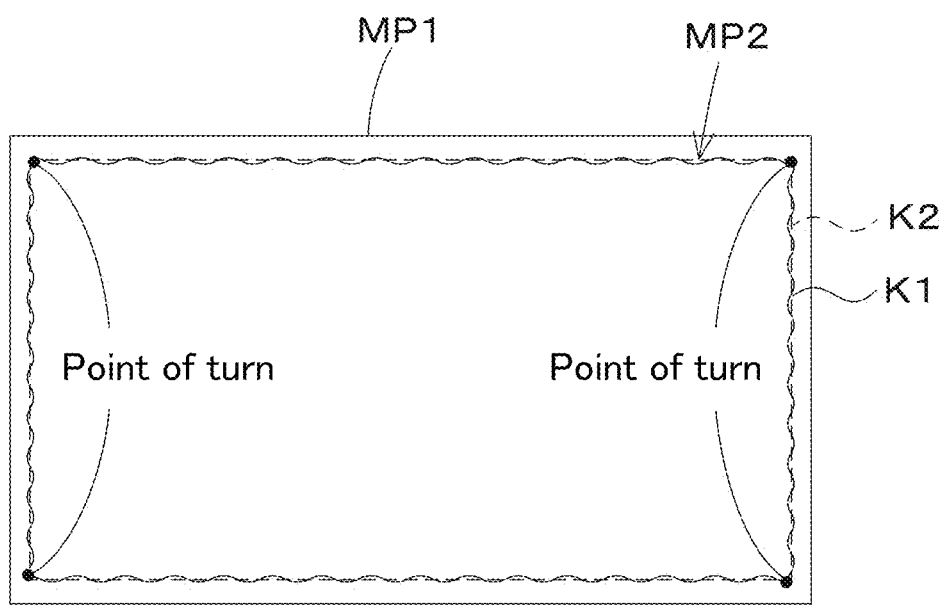
FIG. 5B describes another method of registering an agricultural field.
Figure 5C:
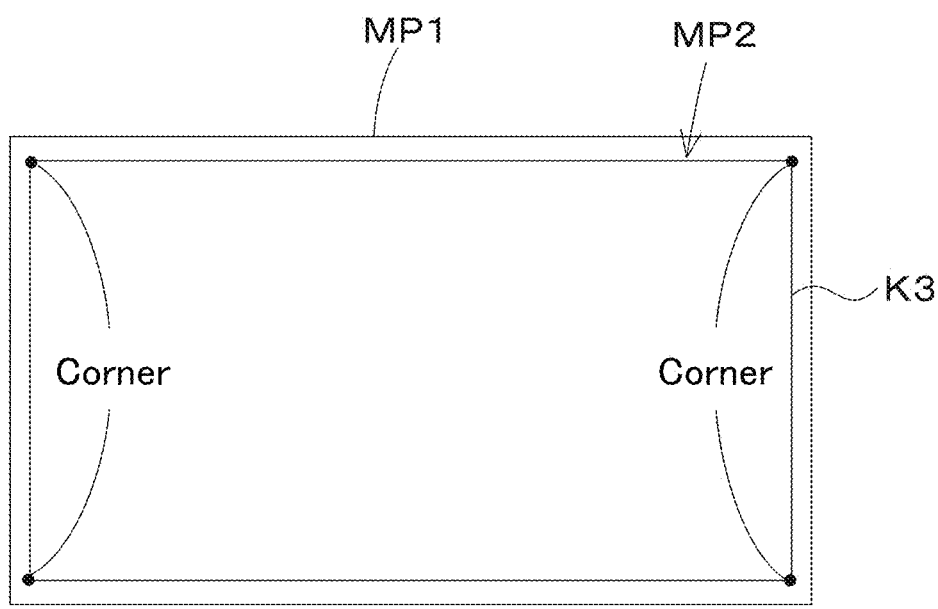
FIG. 5C describes another method of registering agricultural field.

The above-described method of registering agricultural fields is an example, and this does not imply any limitation. As another example, as illustrated in FIG. 5B, the agricultural field register 51*a* may calculate points of turn from the travel path K1 of the traveling vehicle body 3, define a line K2 passing through the points of turn as the contour H1 of the agricultural field and as the agricultural field map MP2, and register the agricultural field map MP2 in the memory 53. Alternatively, when the agricultural machine 1 goes around, the user may designate corners of the agricultural field as illustrated in FIG. 5C by operating a predetermined switch or the like included in the manual operator 62 of the agricultural machine 1. In this case, the agricultural field register 51*a* may also define a line K3 passing through the corners of the agricultural field in the designated order and then returning to the first designated corner as the contour H1 of the agricultural field and as the agricultural field map MP2, and register the agricultural field map MP2 in the memory 53. The contour H1 of the agricultural field and the agricultural field map MP2 may be, for example, data represented by positions (latitude and longitude), data represented by coordinates (X-axis, Y-axis), or data represented in some other manner.

Upon selection by the user of the call key B6 on the agricultural field registration screen D2 in FIG. 4, the controller 51 reads data of one of the agricultural field map(s) MP2 registered in the memory 53, and causes the agricultural field map MP2 to be displayed on the agricultural field registration screen D2 based on the data. Furthermore, upon selection by the user of the cancel key B7, the agricultural field register 51*a* causes the position(s) Pv of the traveling vehicle body 3 and the agricultural field map MP2 (the contour H1 of the agricultural field) displayed on the map MP1 here to disappear, and also deletes data thereof from the memory 53. That is, the registration of the contour H1 of the agricultural field and the agricultural field map MP2 is canceled.

When the agricultural field has been registered and the user selects the back key B8, the controller 51 causes the display operation interface 52 to display the home screen D1 in FIG. 3. That is, the back key B8 is a key used to return the screen displayed on the display operation interface 52 to the previous screen (the same applies to the screens D3 to D9 described below). When the user selects the automatic operation key B2 on the home screen D1, the controller 51 causes the display operation interface 52 to display the work selection screen D3 illustrated in FIG. 6.

Figure 6:
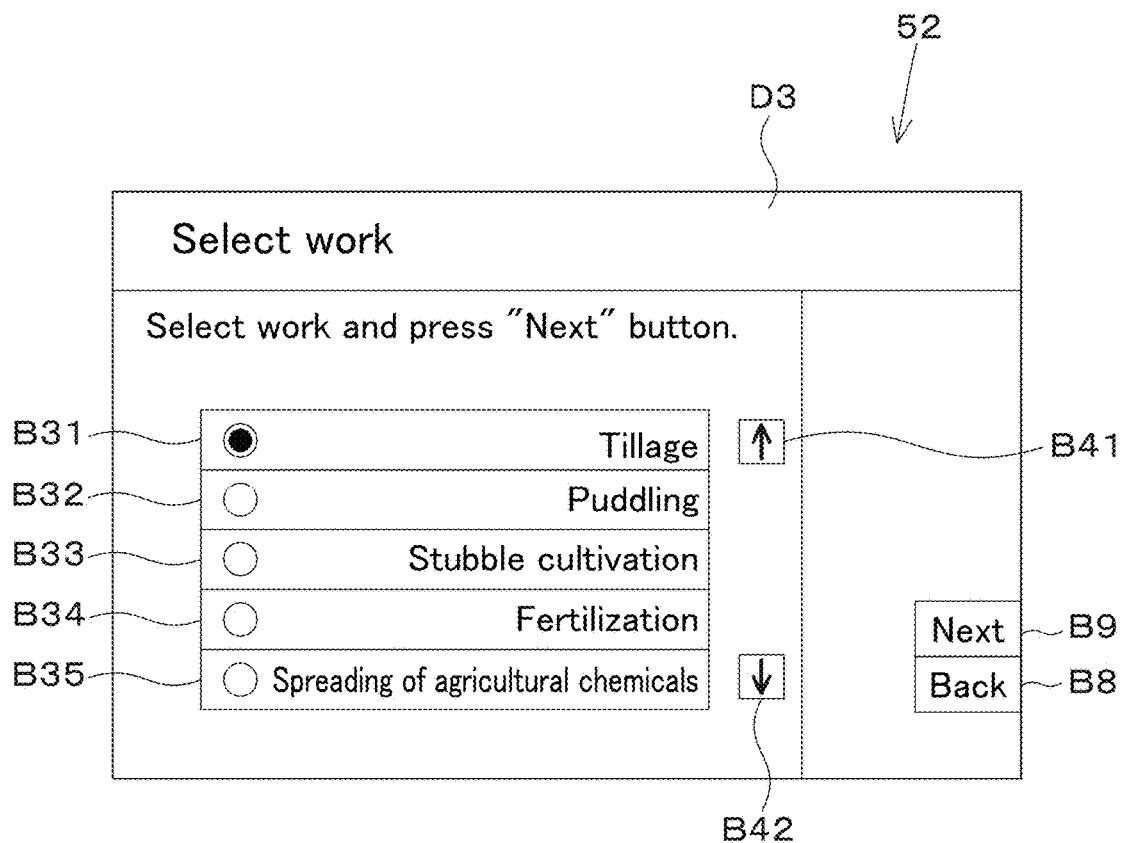
FIG. 6 illustrates an example of a work selection screen of the agricultural work assistance apparatus.

The work selection screen D3 displays a message indicating an input operation procedure. The work selection screen D3 also displays a plurality of work keys B31 to B35, an up arrow key B41, a down arrow key B42, a next key B9, and the back key B8. The work keys B31 to B35 indicate types of agricultural work that can be performed by the agricultural machine 1 and the working device 2 connected to the agricultural machine 1. FIG. 6 shows the five work keys B31, B32, B33, B34, and B35. However, when there are six or more types of agricultural works that can be performed by the agricultural machine 1 and the working device 2, the controller 51 causes work key(s) indicating other type(s) of work to be displayed on the work selection screen D3 in response to the user's selection of the up arrow key B41 or the down arrow key B42.

Upon selection by the user of one of the work keys B31 to B35, the controller 51 causes the selected work key to be displayed on the work selection screen D3 in a manner different from that of the other work keys. In the example of FIG. 6, only the selected work key B31 (tillage) is marked with a filled circle. Upon selection by the user of the next key B9 while one of the work keys B31, B32, B33, B34, and B35 is in a selected state, the controller 51 causes the display operation interface 52 to display the vehicle settings confirmation screen D4 illustrated in FIG. 7. That is, the next key B9 is a key used to switch the screen displayed on the display operation interface 52 to the next screen (the same applies to the screens D4 to D9 described below).

The vehicle settings confirmation screen D4 displays a message indicating an input operation procedure, the category of agricultural work, the type of the agricultural machine 1, and the working width of the working device 2. The user can set the type of the agricultural machine 1 and the working width of the working device 2 displayed on this vehicle settings confirmation screen D4 by, for example, selecting the settings key B0 on the home screen D1 in FIG. 3 and performing predetermined input operation(s). The user can also register types and specifications such as working widths of a plurality of agricultural machines and working devices in the agricultural work assistance apparatus 50 by selecting the settings key B0 and performing predetermined input operation(s). The working width of the working device 2 is a dimension, in a horizontal plane perpendicular to the direction of travel, of the working device 2 over which the working device 2 can perform work.

Figure 7:
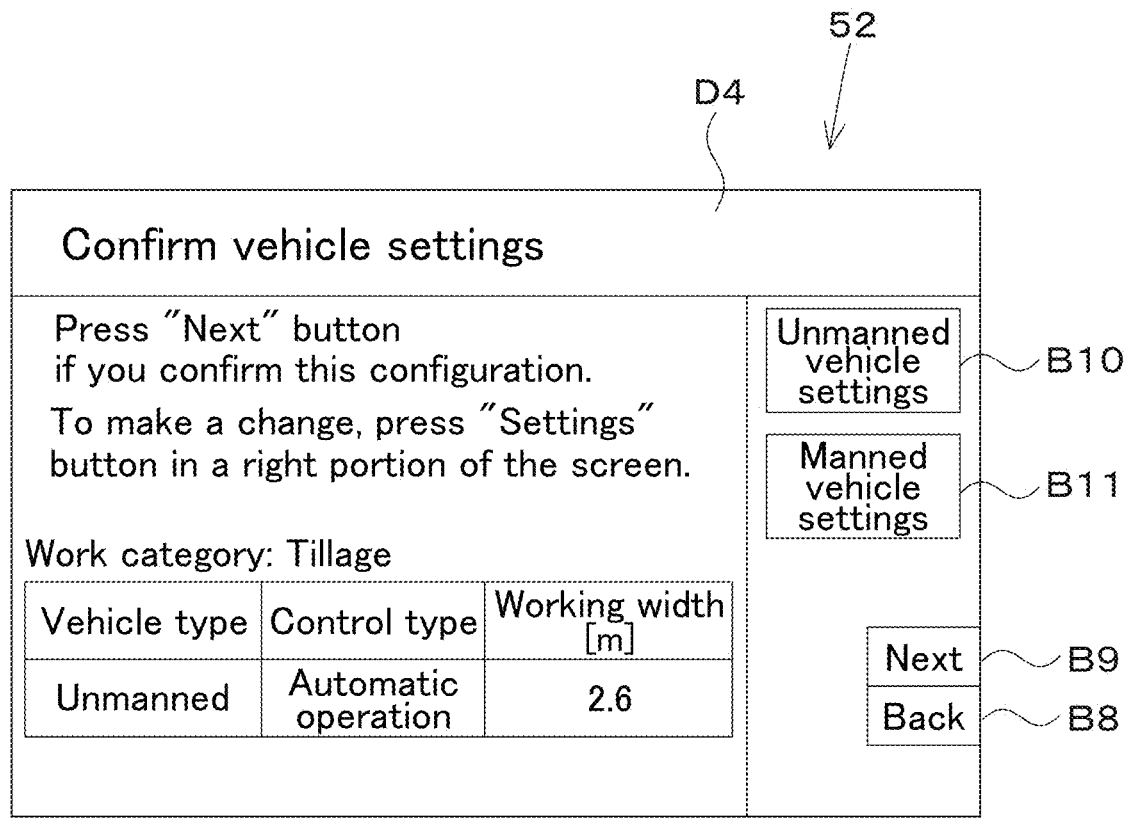
FIG. 7 illustrates an example of a vehicle settings confirmation screen of the agricultural work assistance apparatus.

The vehicle settings confirmation screen D4 in FIG. 7 displays an unmanned machine settings key B10, a manned machine settings key B11, the next key B9, and the back key B8. When the user desires to change the type of the agricultural machine 1 or the working width displayed on the vehicle settings confirmation screen D4, the user selects the unmanned machine settings key B10 or the manned machine settings key B11. Upon the selection, the controller 51 causes the display operation interface 52 to display another settings screen (not illustrated) on which the type of the agricultural machine 1 and/or the working width is changeable. When the user performs predetermined operation(s) after changing the type of the agricultural machine 1 and/or the working width in the other setting screen, the controller 51 causes the display operation interface 52 to display the vehicle settings confirmation screen D4 again.

Figure 8:
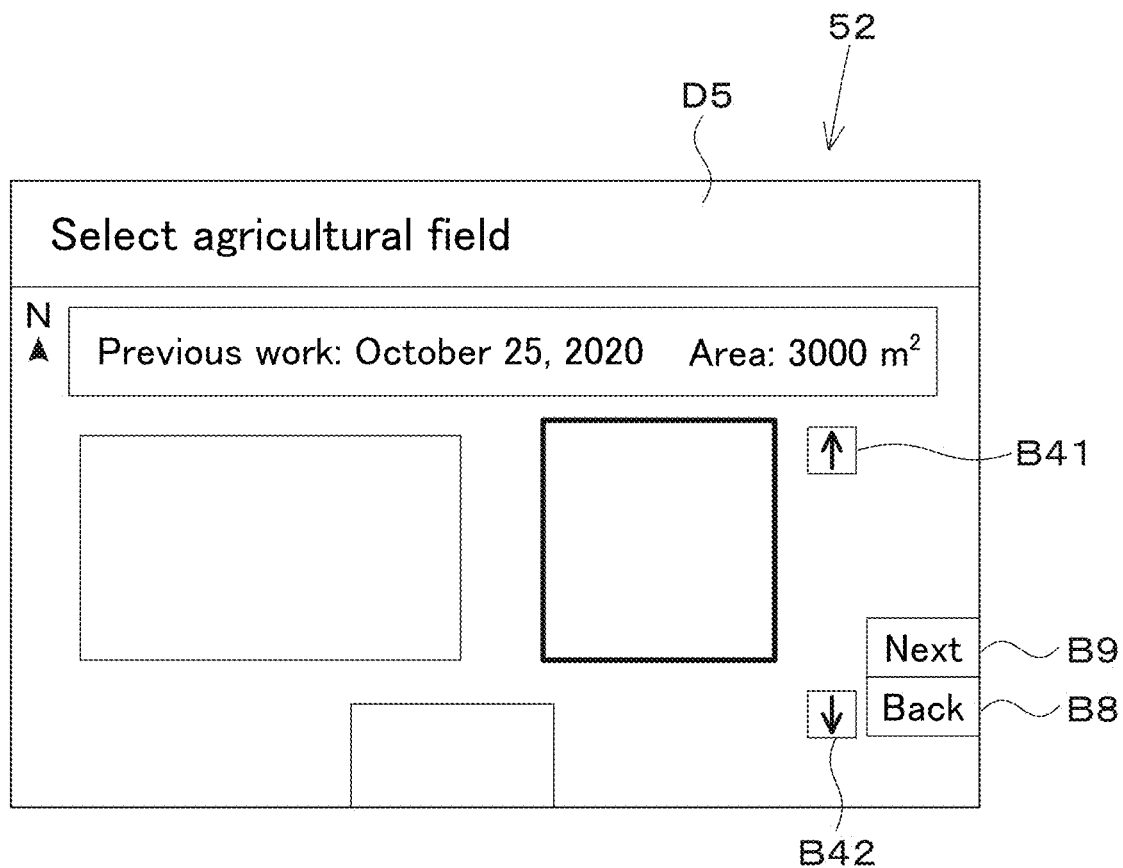
FIG. 8 illustrates an example of an agricultural field selection screen of the agricultural work assistance apparatus.

The user selects the next key B9 when there is no need to change the type of the agricultural machine 1 or the working width displayed on the vehicle settings confirmation screen D4. Upon the selection, the controller 51 causes the display operation interface 52 to display the agricultural field selection screen D5 as illustrated in FIG. 8. The agricultural field selection screen D5 displays one or more registered agricultural field maps MP2, the up arrow key B41, the down arrow key B42, the next key B9, and the back key B8. FIG. 8 displays three agricultural field maps MP2. However, when there are four or more registered agricultural field maps MP2, the controller 51 causes the other registered agricultural field map(s) MP2 to be displayed on the agricultural field selection screen D5 in response to the user's selection of the up arrow key B41 or the down arrow key B42.

Figure 9:
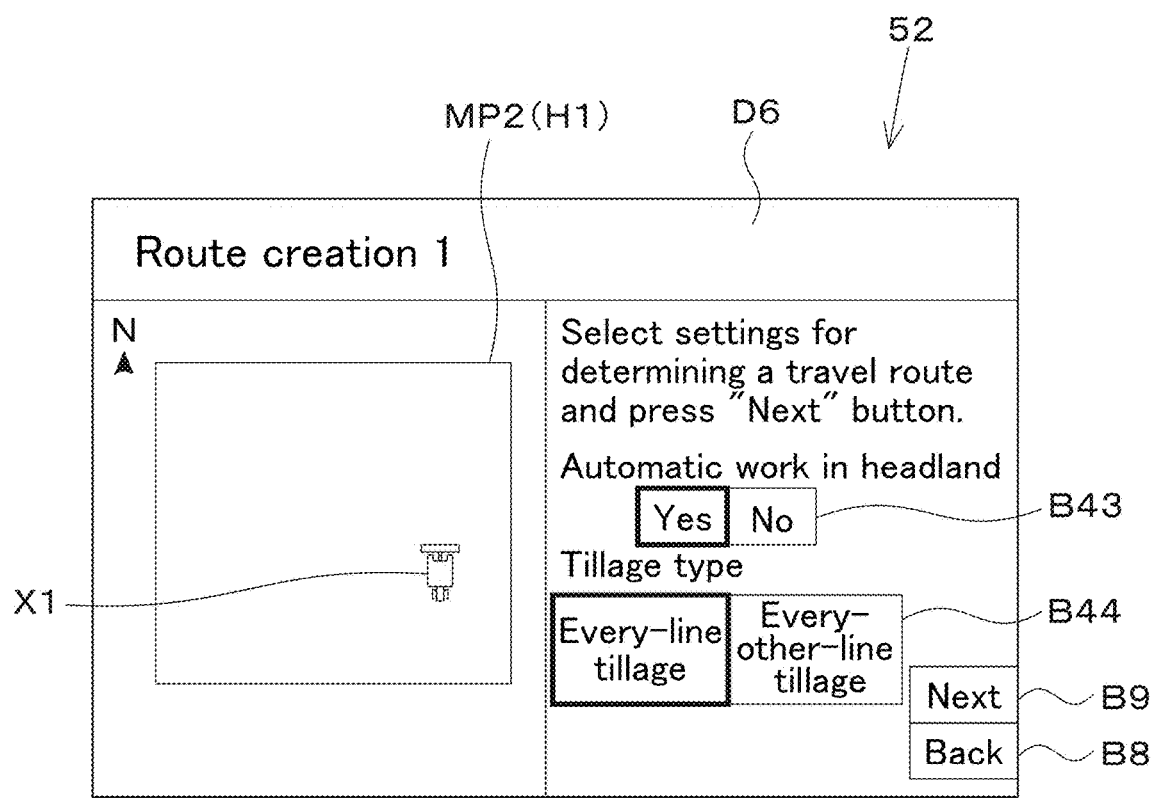
FIG. 9 illustrates an example of a "route creation 1" screen of the agricultural work assistance apparatus.

Upon selection by the user of one of the agricultural field maps MP2, the controller 51 causes the selected agricultural field map MP2 to be displayed in a manner different from that of the other agricultural field maps MP2. In FIG. 8, only the selected agricultural field map MP2 is enclosed by thick line. Furthermore, the controller 51 causes the date and time of the previous agricultural work performed in the selected agricultural field map MP2 and the area of the agricultural field in the map MP2 to be displayed on the agricultural field selection screen D5. When the user selects the next key B9 while one of the agricultural field maps MP2 is in a selected state, the controller 51 causes the display operation interface 52 to display the "route creation 1" screen D6 as illustrated in FIG. 9.

The "route creation 1" screen D6 displays the selected agricultural field map MP2 (the contour H1 of the agricultural field), the agricultural machine symbol X1, a message indicating an input operation procedure, an automatic-work-in-headland key B43, a work type key B44, the next key B9, and the back key B8. The automatic-work-in-headland key B43 is a key used to select whether or not to perform work with the working device 2 while causing the traveling vehicle body 3 of the agricultural machine 1 to travel by automatic operation in headland(s) set in the agricultural field map MP2 as described later.

The work type key B44 is a key used to select the manner in which work is performed by the working device 2. The present preferred embodiment assumes that the tillage work is selected in the work selection screen D3 in FIG. 6 for example, and therefore the work type key B44 in FIG. 9 is a key used to select whether the type of the tillage work is "every-line tillage" or "every-other-line tillage". When some other work is selected on the work selection screen D3 in FIG. 6, the work type key B44 in FIG. 9 is a key used to select the manner in which the other work is performed. When the user selects the next key B9 after selecting the manner in which work is performed using the automatic-work-in-headland key B43 and the work type key B44, the controller 51 causes the display operation interface 52 to display the "route creation 2" screen D7 as illustrated in FIG. 10A.

Figure 10A:
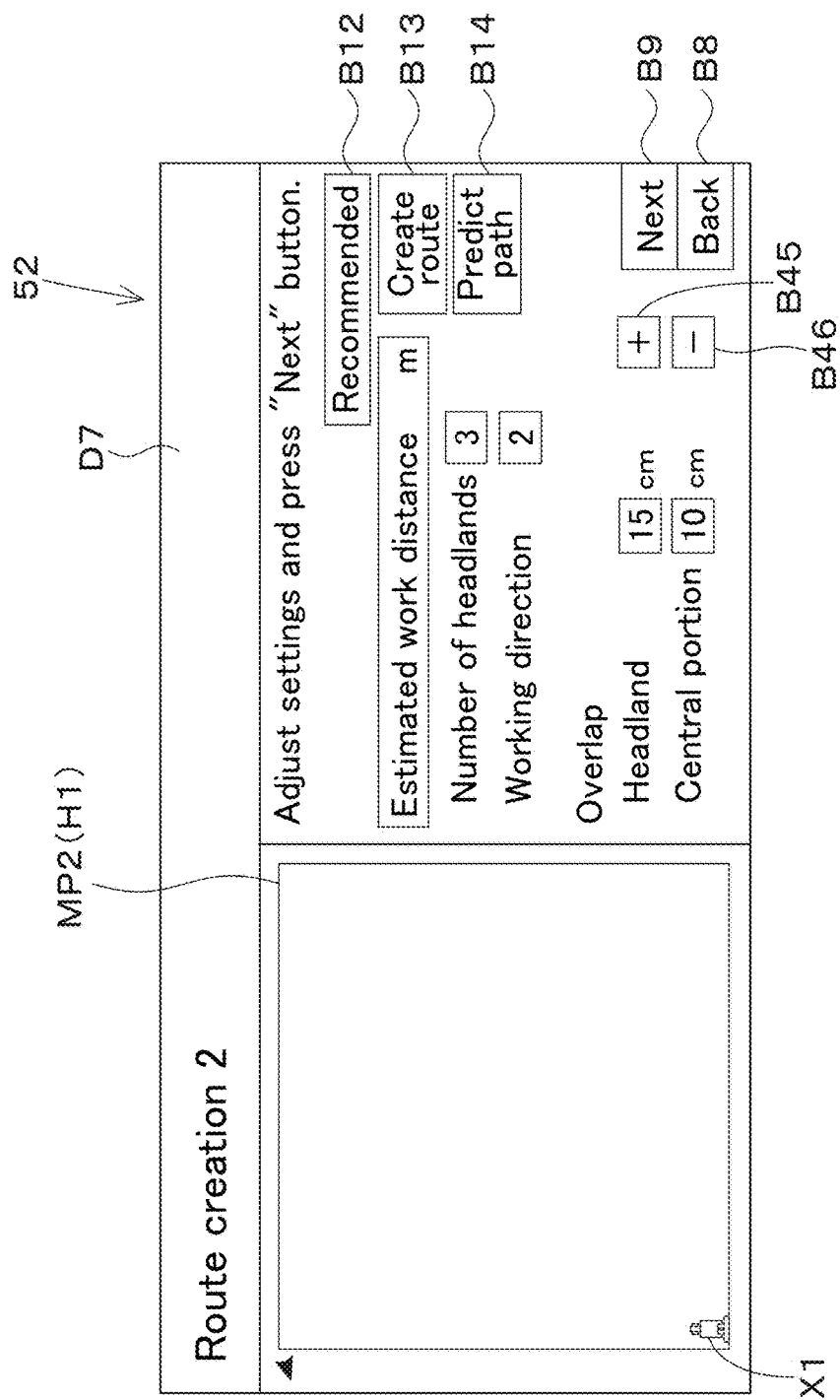
FIG. 10A illustrates an example of a "route creation 2" screen of the agricultural work assistance apparatus.

The "route creation 2" screen D7 in FIG. 10A displays the selected agricultural field map MP2, the agricultural machine symbol X1, a message indicating an input operation procedure, a plurality of setting items and numerical value input fields thereof, a recommendation key B12, a route creation key B13, a path prediction key B14, a plus key B45, a minus key B46, the next key B9, and the back key B8. While the "route creation 2" screen D7 is displayed, the controller 51 may acquire, via the communicator 54, the actual position of the traveling vehicle body 3 detected by the positioning device 40, and may display the agricultural machine symbol X1 at a position on the agricultural field map MP2 that corresponds to the position of the traveling vehicle body 3.

The plurality of setting items on the "route creation 2" screen D7 include estimated work distance, a headland count (the number of headlands), working direction, overlap-on-headland, and overlap-in-central-portion. It is possible to input values of the items except for the estimated work distance. The headland count is the number of headland(s) extending within and along the contour H1 of the registered agricultural field (the agricultural field map MP2). The working direction is a direction in which work is performed by the working device 2 while the traveling vehicle body 3 is caused to travel straight back and forth in a central portion inward of the headland(s) of the agricultural field. Upon input of a predetermined numerical value (such as "1" or "2", for example) in the numerical value input field of the working direction, a vertical direction or a horizontal direction on the "route creation 2" screen D7 that corresponds to the numerical value is set. The overlap-on-headland is an overlap of the working width of the working device 2 with a headland. The overlap-in-central-portion is an overlap between working widths when work is performed by the working device 2 while the traveling vehicle body 3 is caused to straight back and forth in the central portion of the agricultural field.

The user selects the numerical value input field of a setting item described above and operates the plus key B45 or the minus key B46, so that a numerical value is inputted into the numerical value input field. Additionally or alternatively, the user selects the recommendation key B12, so that the controller 51 reads a set value of the setting item that corresponds to the agricultural work selected on the work selection screen D3 (FIG. 6) among the set values stored in the memory 53 in advance and inputs (displays) the set value into the corresponding numerical value input field.

Figure 10B:
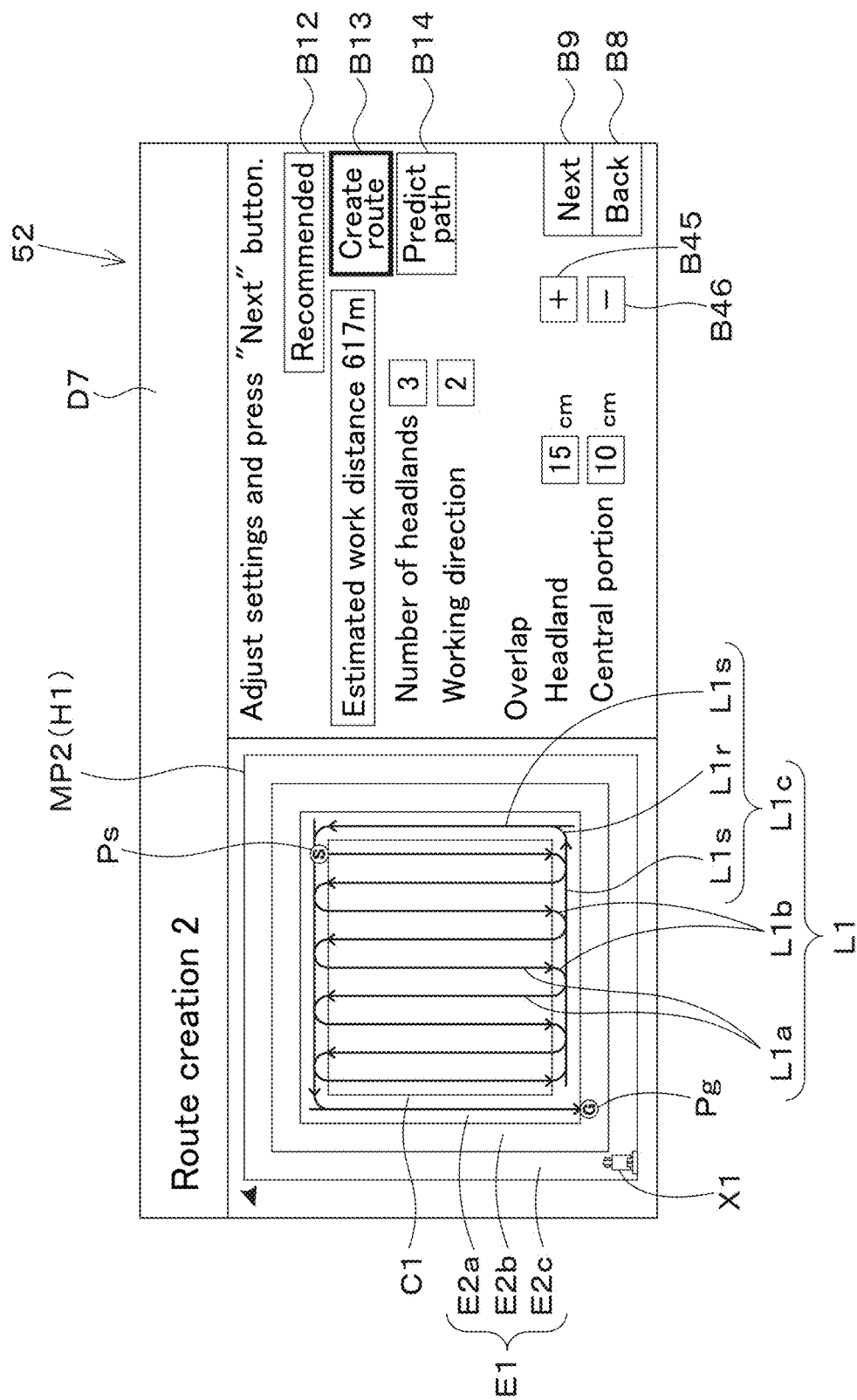
FIG. 10B illustrates an example of the "route creation 2" screen of the agricultural work assistance apparatus.

After the numerical value is inputted into each setting item, the user selects the route creation key B13. Upon the selection, as illustrated in FIG. 10B, the area definer 51b (FIG. 1) defines a central area (second area) C1 and a headland area (first area) E1 in the agricultural field map MP2. The route creator 51c (FIG. 1) creates a travel route (scheduled travel route) L1 in the agricultural field map MP2.

Figure 11A:
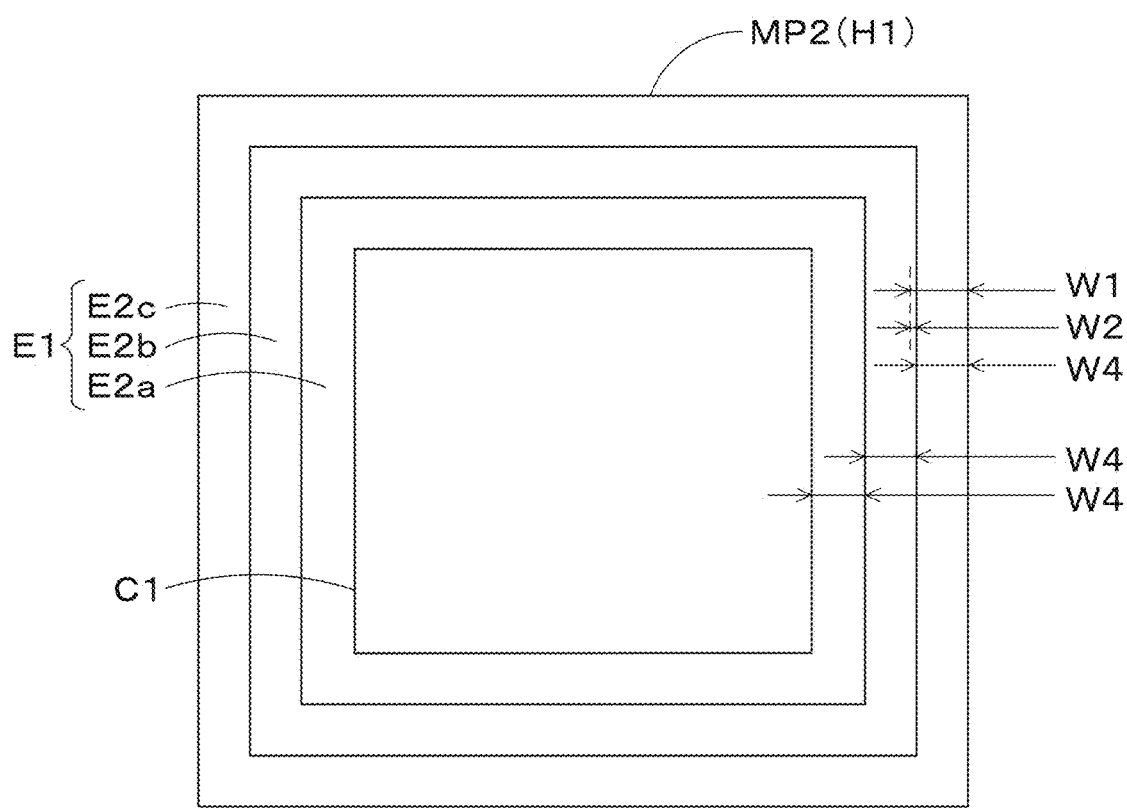
FIG. 11A describes a method of defining areas and a travel route.
Figure 11B:
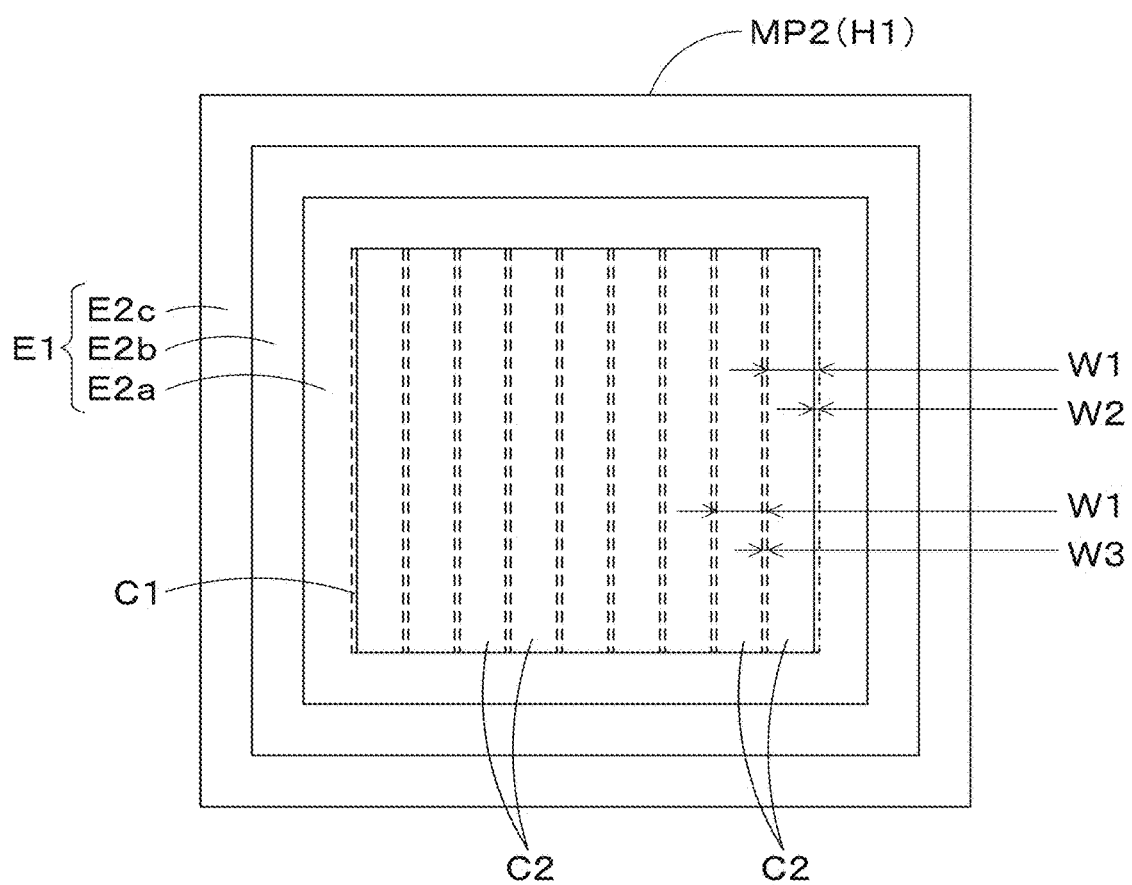
FIG. 11B describes the method of defining areas and a travel route.

FIGS. 11A to 11D illustrate a method of defining the areas C1 and E1 and the travel route L1. Upon selection of the route creation key B13 in the procedure described above, the area definer 51b first defines the central area C1 and the headland area E1, based on the contour H1 of the agricultural field, the working width of the working device 2, the input number of headlands, and/or the input overlap-on-headland. Specifically, for example, the area definer 51b calculates the contour C1 by displacing the contour H1 of the agricultural field inward by a width W4 (which is obtained by subtracting the overlap-on-headland W2 from the working width W1 of the working device 2) one or more times corresponding to the number of headlands, and defines, as the central area C1, an area (central portion) enclosed by the contour C1, as illustrated in FIG. 11A.

As another example, the area definer 51b may calculate a contour by displacing the contour H1 of the agricultural field inward by the working width of the working device 2 (or the total width of the working device 2) one or more times corresponding to the number of headlands, and define an area (central portion) enclosed by the contour C1 as the central area. Additionally or alternatively, the number of headlands, the overlap-on-headland, and/or the overlap-in-central-portion may be preset fixed value(s), the fixed value may be stored in the memory 53, and the area definer 51b may read the fixed value from the memory 53 as necessary.

After setting the central area C1 located inward of the contour H1 of the agricultural field as described above, the area definer 51b defines an area in the form of a frame (outer frame portion) located outward of the central area C1 as the headland area E1. The area definer 51b then causes the memory 53 to store data of, for example, the positions and/or the like indicating the areas C1 and E1.

The route creator 51c creates the travel route L1 based on the defined areas C1 and E1, the working width of the working device 2, the inputted working direction, the inputted overlap-on-headland, and/or the inputted overlap-in-central-portion. Specifically, the route creator 51c first creates a plurality of unit work sections C2 in the central area C1 from one of opposite edges (the right edge in the drawings such as FIG. 11B) of the central area C1 each extending parallel to the working direction (vertical direction in FIG. 11B) such that the unit work sections each have a width equal to the working width W of the working device 2 (see FIG. 11B). In so doing, the unit work section C2 created first by the route creator 51c has the working width W1 overlapping the headland area E1 by the overlap-on-headland W2. The unit work section C2 created second or later by the route creator 51c has the working width W1 overlapping the previous unit work section C2 by the overlap-in-central-portion W3.

Figure 11C:
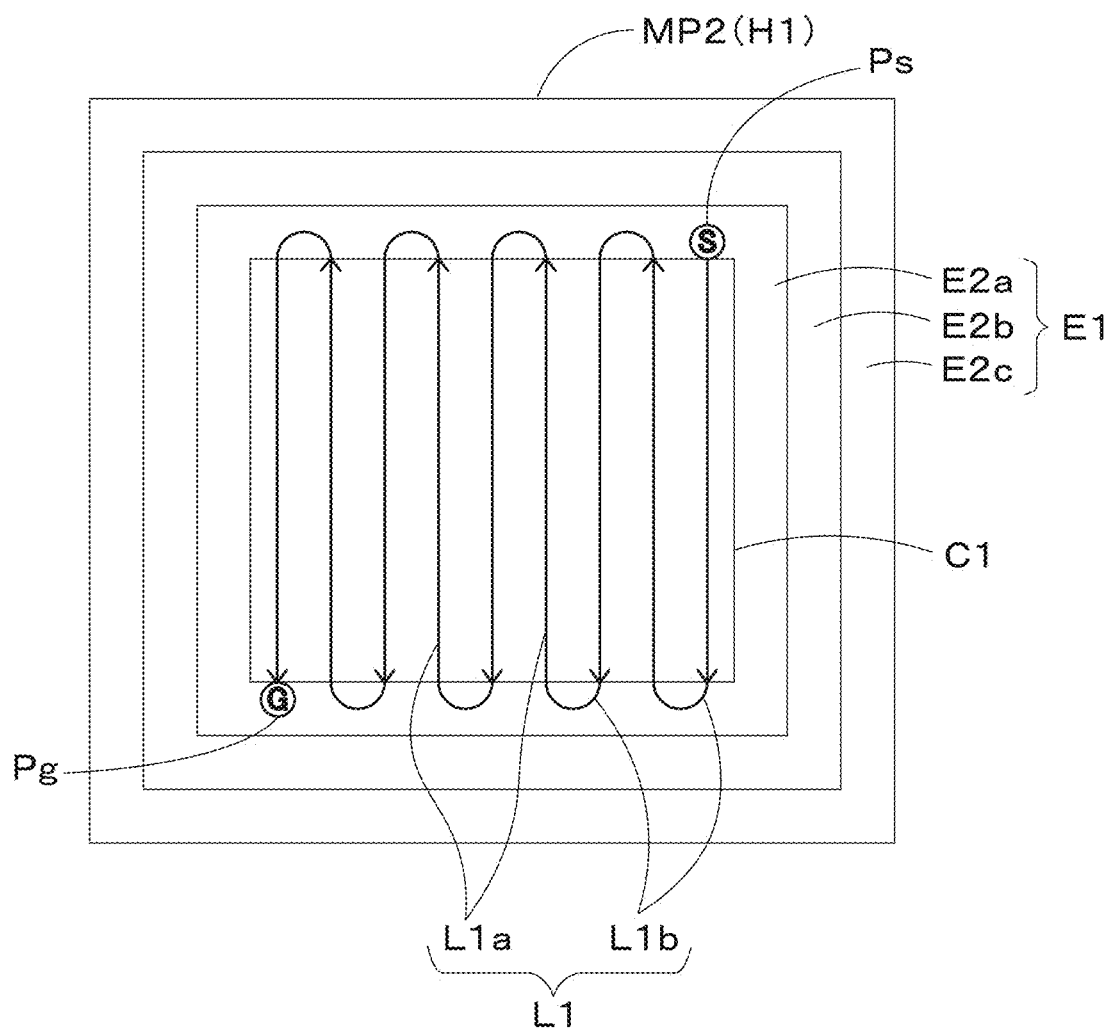
FIG. 11C describes the method of defining areas and a travel route.

Next, the route creator 51c creates a straight route portion L1a along which the traveling vehicle body 3 travels straight, for each unit work section C2 as illustrated in FIG. 11C. In so doing, the route creator 51c creates the straight route portion L1a that is a straight line connecting opposite ends of the unit work section C2 in a longitudinal direction on a widthwise (right-left direction in FIG. 11C) centerline of the unit work section C2. Note that in the unit work section C2 that is created last (the leftmost unit work section C2 in the central area C1 in FIG. 11B), if the straight route portion L1a created in the unit work section C2 is located outside the central area C1, the route creator 51c may exclude the straight route portion L1a from the travel route L1.

Next, the route creator 51c creates a route portion L1b connecting adjacent straight route portions L1a to each other in the headland area E1. The route portion L1b is a turn route portion along which the traveling vehicle body 3 turns from one of two adjacent straight route portions L1a to the other. Note that although FIG. 11C and the like illustrate turn route portions L1b having a simple semi-circular shape, this shape is intended for convenience of description, such as for ease of displaying the turn route portions L1b on the display screen D7 (and the display screen D8 described later) on the display operation interface 52 or for easy visual recognition of the travel route L1 on the display screen. When the traveling vehicle body 3 actually travels based on one of the straight route portions L1a and then turns toward the other of the straight route portions L1a, the traveling vehicle body 3 makes a turn while traveling forward or rearward, forming a path of a more complex shape than the turn route portion L1b. The route creator 51c may create the turn route portions L1b in the form different from a semicircle. The same applies to other turn route portions described later and turn portions included in other routes.

The controller 60 (FIG. 1) of the agricultural machine 1 causes the lifting device 8 (FIG. 2) to lower the working device 2 and causes the working device 2 to perform ground work while causing the traveling vehicle body 3 to travel based on the straight route portion(s) L1a. The controller 60 causes the lifting device 8 to raise the working device 2 and stops the ground work performed by the working device 2 while causing the traveling vehicle body 3 to travel based on the turn route portion(s) L1b.

That is, the straight route portions L1a are work route portions on which ground work is performed by the working device 2 while the traveling vehicle body 3 of the agricultural machine 1 is caused to travel in automatic operation. The central area C1 in which the straight route portions L1a are created is a work area in which ground work is performed by the working device 2 while the traveling vehicle body 3 is caused to travel straight back and forth in automatic operation. Note that the work route portions are not limited to those in the form of a straight line such as the straight route portions L1a, and may be curved route portions. It is only necessary that one or more work route portions in the form of a straight line and/or one or more work route portions in the form of a curve be created in the work area.

When not performing work in the headland(s) is selected using the automatic-work-in-headland key B43 on the "route creation 1" screen D6 in FIG. 9, the route creator 51c creates the travel route L1 including the straight route portion(s) L1a and the turn route portion(s) L1b as illustrated in FIG. 11C, and causes the memory 53 to store data of, for example, the positions and/or the like indicating the travel route L1. The route creator 51c sets a starting point Ps at the end of one of the endmost strait route portion L1a located at opposite sides of the central area C1 (the upper end of the rightmost straight route portion L1a in FIG. 11C) that is not connected to any turn route portions L1b, and sets a goal point Pg at the end of the other of the endmost strait route portions L1a in the central area C1 (at the lower end of the leftmost straight route portion L1a in FIG. 11C). The route creator 51c then causes the memory 53 to store data indicating the points Ps and Pg.

The route creator 51c also calculates the estimated work distance over which ground work is performed by the working device 2 while the traveling vehicle body 3 is caused to travel based on all the straight route portions L1a, and causes the memory 53 to store the calculation result. Further, the route creator 51c sets a vehicle speed (moving speed) at which the traveling vehicle body 3 is caused to travel by automatic operation to the straight route portions L1a and the turn route portions L1b, and causes the memory 53 to store such vehicle speed(s) in association with data of the route portions L1a and L1b. In so doing, for example, the route creator 51c sets lower vehicle speeds for portion of the route portions L1a and L1b with larger curvatures. Alternatively, for example, an input field for input of the vehicle speed for each of the route portions L1a and L1b may be provided on the "route creation 2" screen D7, and the route creator 51c may set the vehicle speed inputted to the input fields to the corresponding one of the route portions L1a and L1b.

After the settings and the creation have been completed as described above, the controller 51 causes the "route creation 2" screen D7 to display the areas C1 and E1, the travel route L1, the starting point Ps, the goal point Pg, and the estimated work distance. In so doing, the areas C1 and E1, the travel route L1, the starting point Ps, and the goal point Pg are displayed on the "route creation 2" screen D7 as illustrated in FIG. 11C. The travel route L1 includes the straight route portion(s) L1a and the turn route portion(s) L1b.

Figure 11D:
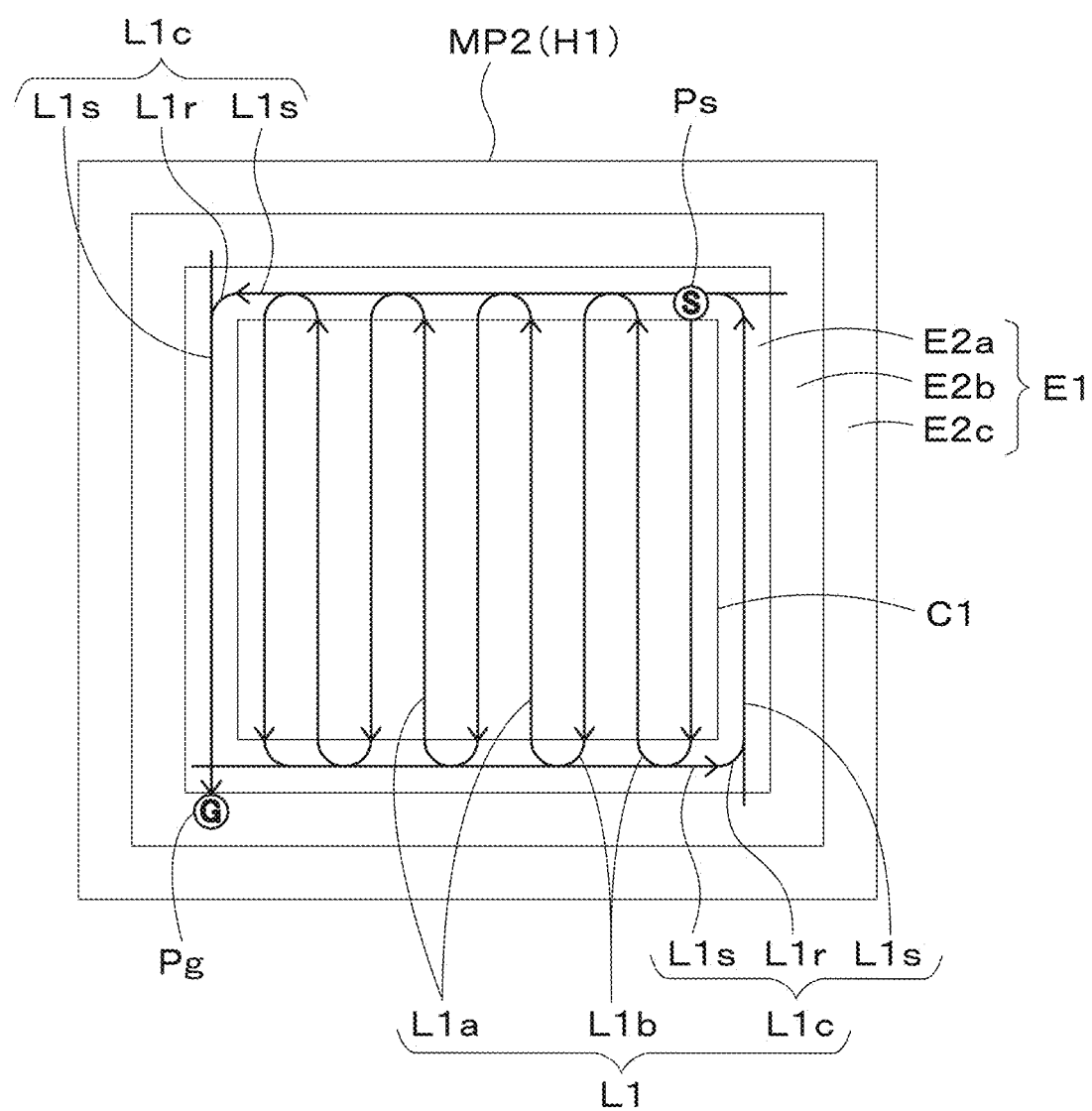
FIG. 11D describes the method of defining areas and a travel route.

On the contrary, when performing work in the headland(s) is selected using the automatic-work-in-headland key B43 on the "route creation F" screen D6 in FIG. 9, the route creator 51c creates, in the headland area E1, a go-around route portion L1c which extends outside the central area C1 as illustrated in FIG. 11D in addition to the straight route portions L1a and the turn route portions L1b. In so doing, for example, the route creator 51c creates the go-around route portion L1c in a headland E2a that is nearest the central area C1 of the headland(s) E2a, E2b, and/or E2c defined outside the central area C1 by the area definer 51b.

The route creator 51c sets the starting point Ps at the end not connected to any turn route portion L1b (the upper end of the rightmost straight route portion L1a in FIG. 11D) of one of endmost straight route portions L1a (the leftmost and rightmost straight route portions L1a in FIG. 11D) in the central area C1, and connects the go-around route portion L1c to an end of the other of the endmost straight route portions L1a (to the lower end of the leftmost straight route portion L1a in FIG. 11D). The route creator 51c sets the goal point Pg at the end of the go-around route portion L1c that is not connected to any straight route portion L1a.

The go-around route portion L1c is a work route portion along which ground work is performed by the working device 2 while the traveling vehicle body 3 is caused to travel by automatic operation. The go-around route portion L1c includes a plurality of straight portions L1s that are substantially straight and a plurality of turn portions L1r that are curved with a predetermined curvature or greater. The straight portions L1s are provided on the widthwise centerline of the headland E2a. The turn portions L1r are each a route portion which connects adjacent ones of the plurality of continuous straight portions L1s extending in different directions and in which the traveling vehicle body 3 turns from one of the adjacent straight portions L1s toward the other.

The go-around route portion L1c may also include slightly curved portion(s) with a curvature less than the predetermined curvature (curved route portion(s), not illustrated) in addition to the straight portions L1s and the turn portions L1r, depending on the shape of the contour H1 of the agricultural field (for example, when the contour H1 of the agricultural field has an irregular shape). While the traveling vehicle body 3 is traveling in automatic operation based on the straight portions L1s and the slightly curved portion(s) of the go-around route portion L1c, the working device 2 performs ground work. While the traveling vehicle body 3 is traveling in automatic operation based on the turn portions L1r, the working device 2 does not perform ground work.

The headland E2a in which the go-around route portion L1c is created as described above is a work area where ground work is performed by the working device 2 while the traveling vehicle body 3 is going around outside the central area C1. As another example, the route creator 51c may create go-around route portion(s) also in the other headland(s) E2b and/or E2c located outward of the headland E2a. A key used to input the number of headlands in which a go-around route portion is created may be provided on the "route creation 2" screen D7.

Further, the route creator 51c may create a go-around route portion that goes through at least one of the headlands E2a, E2b, and E2c two or more times or may create a go-around route portion that passes through each of adjacent headlands. That is, the route creator 51c may create, in the headland area E1, a go-around route portion that goes around outside the central area C1 one or more times equal to or more than the number of headlands.

As described above, after creating the travel route L1 including the straight route portions L1a, the turn route portions L1b, and the go-around route portion L1c, the route creator 51c causes the memory 53 to store data of the position and/or the like indicating the travel route L1. The route creator 51c also sets the starting point Ps and the goal point Pg of the travel route L1, and causes the memory 53 to store data indicating the points Ps and Pg. The route creator 51c also calculates an estimated work distance over which ground work is performed by the working device 2 while the traveling vehicle body 3 is caused to travel based on all the straight route portions L1a and the go-around route portion L1c, and causes the memory 53 to store the calculated result. The route creator 51c further sets vehicle speed(s) at which the traveling vehicle body 3 is caused to travel by automatic operation to the straight route portions L1a, the turn route portions L1b, and the go-around route portion L1c, and causes the memory 53 to store such vehicle speed(s) in association with data of the respective route portions L1a, L1b, and L1c.

After the settings and the creation have been completed as described above, the controller 51 causes the areas C1 and E1, the travel route L1, the starting point Ps, the goal point Pg, and the estimated work distance to be displayed on the "route creation 2" screen D7 as illustrated in FIG. 10B. The travel route L1 displayed here includes the straight route portions L1a, the turn route portions L1b, and the go-around route portion L1c.

After the travel route L1 is displayed on the "route creation 2" screen D7, the user selects the path prediction key B14. Upon the selection, the path calculator 51d (FIG. 1) calculates a predicted work portion where ground work is predicted to be performed by the working device 2 while the traveling vehicle body 3 is caused to travel by automatic operation based on the travel route L1, that is, a predicted work path J1 of the working device 2.

Specifically, the path calculator 51d calculates the predicted work path J1 based on the travel route L1 and the working width of the working device 2. For example, the path calculator 51d determines, as the predicted work path J1, a portion (area) through which the working width of the working device 2 passes when the traveling vehicle body 3 and the working device 2 move (move forward or backward) along a work route portion (the straight route portions L1a and the straight portions L1s of the go-around route portion L1c in FIG. 10C) of the travel route L1 where ground work is performed by the working device 2. In so doing, the widthwise center of the traveling vehicle body 3 and the widthwise center of the working device 2 are set on the work route portion.

Figure 10C:
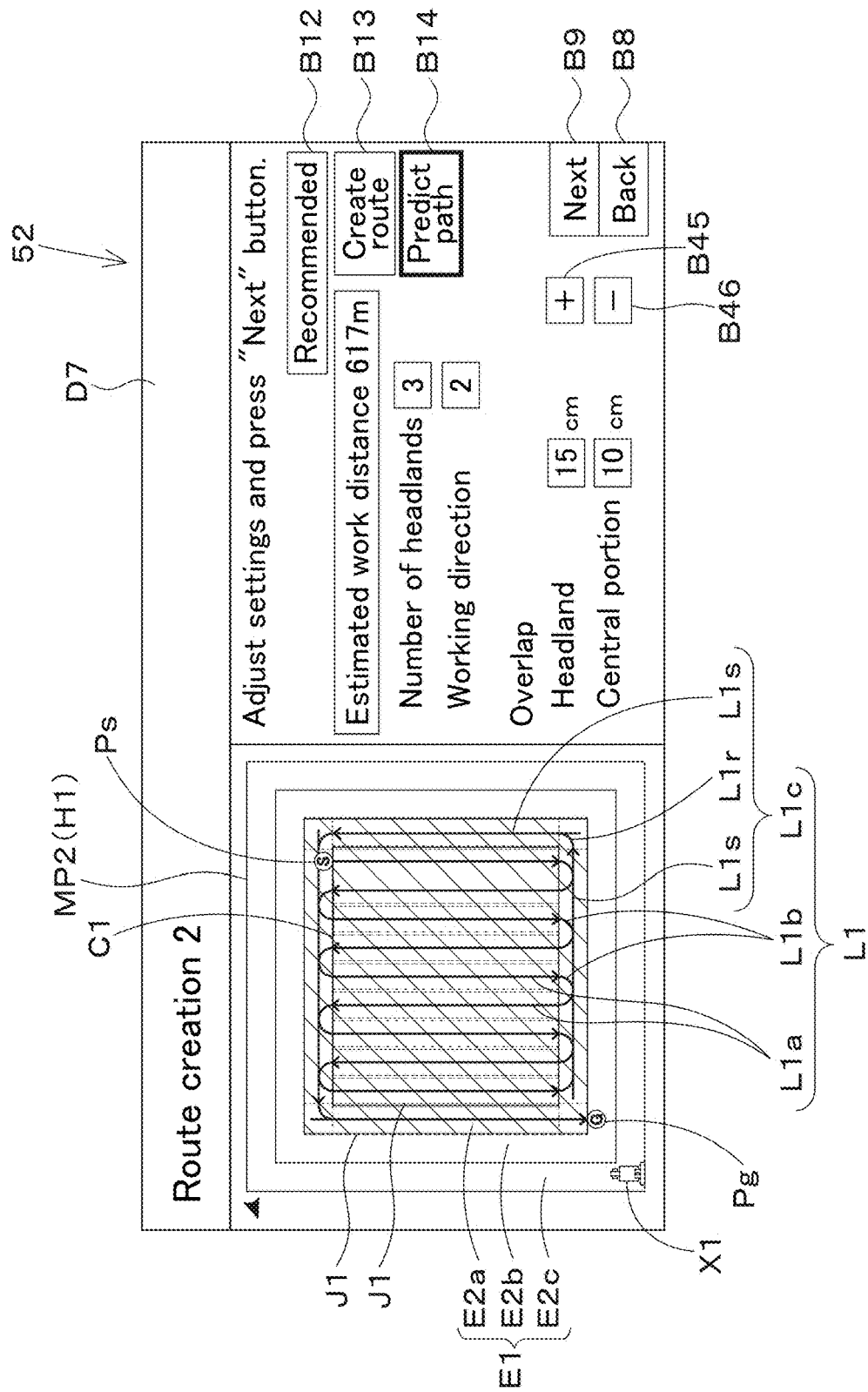
FIG. 10C illustrates an example of the "route creation 2" screen of the agricultural work assistance apparatus.

Next, the path calculator 51d causes the memory 53 to store data of the predicted work path J1. As illustrated in FIG. 10C, the controller 51 causes the predicted work path J1 (hatched portion) to be displayed over the travel route L1 in the agricultural field map MP2 on the "route creation 2" screen D7 in a superimposed manner.

Note that the path calculator 51d may, upon creation of the travel route L1 by the route creator 51c, immediately calculate the predicted work path J1 and cause the memory 53 to store data of the predicted work path J1. The controller 51 may, when the user selects the path prediction key B14, read the data of the predicted work path J1 from the memory 53 and cause the predicted work path J1 to be displayed on the "route creation 2" screen D7 based on the data. The path calculator 51d may determine, as the predicted work path J1, a portion through which the working width of the working device 2 passes when the working device 2 moves along not only the straight-line work route portion but also a curved work route portion of the travel route L1.

In FIG. 10C, since the work route portions L1a and L1c (the straight route portions L1a and the go-around route portion L1c) where ground work is performed by the working device 2 while the traveling vehicle body 3 is caused to travel by automatic operation are created in the central area C1 and the headland E2a, the predicted work path J1 is displayed along the work route portions L1a and L1c.

On the contrary, when not performing work in the headland is selected using the automatic-work-in-headland key B43 on the "route creation F" screen D6 in FIG. 9 and the work route portion(s) L1a is/are created only in the central area C1 as illustrated in FIG. 11C, the predicted work path J1 is displayed along the work route portion(s) L1a.

For example, assume that the user, after looking at the travel route L1 and/or the predicted work path J1 displayed on the "route creation 2" screen D7, re-inputs numerical value(s) for one or more of the setting items, and then selects the route creation key B13. In this case, the area definer 51b defines the areas C1 and E1 again and the route creator 51c creates the travel route L1 again according to the procedure described above, and the areas C1 and E1, the travel route L1, and the like displayed on the "route creation 2" screen D7 are updated.

Assume that the user selects the starting point Ps or the goal point Pg, moves the point Ps or Pg to a desired position on the agricultural field map MP2, and then selects the route creation key B13. Upon the selection, the area definer 51b defines the areas C1 and E1 again and the route creator 51c creates the travel route L1 again according to the procedure described above, and the areas C1 and E1, the travel route L1, and the like displayed on the "route creation 2" screen D7 are updated.

Assume that, after the update of the areas C1 and E1 and the travel route L1 described above, the user selects the path prediction key B14. Upon the selection, the path calculator 51d calculates the predicted work path J1 again according to the procedure described above, and the predicted work path J1 displayed on the "route creation 2" screen D7 is updated.

Figure 12:
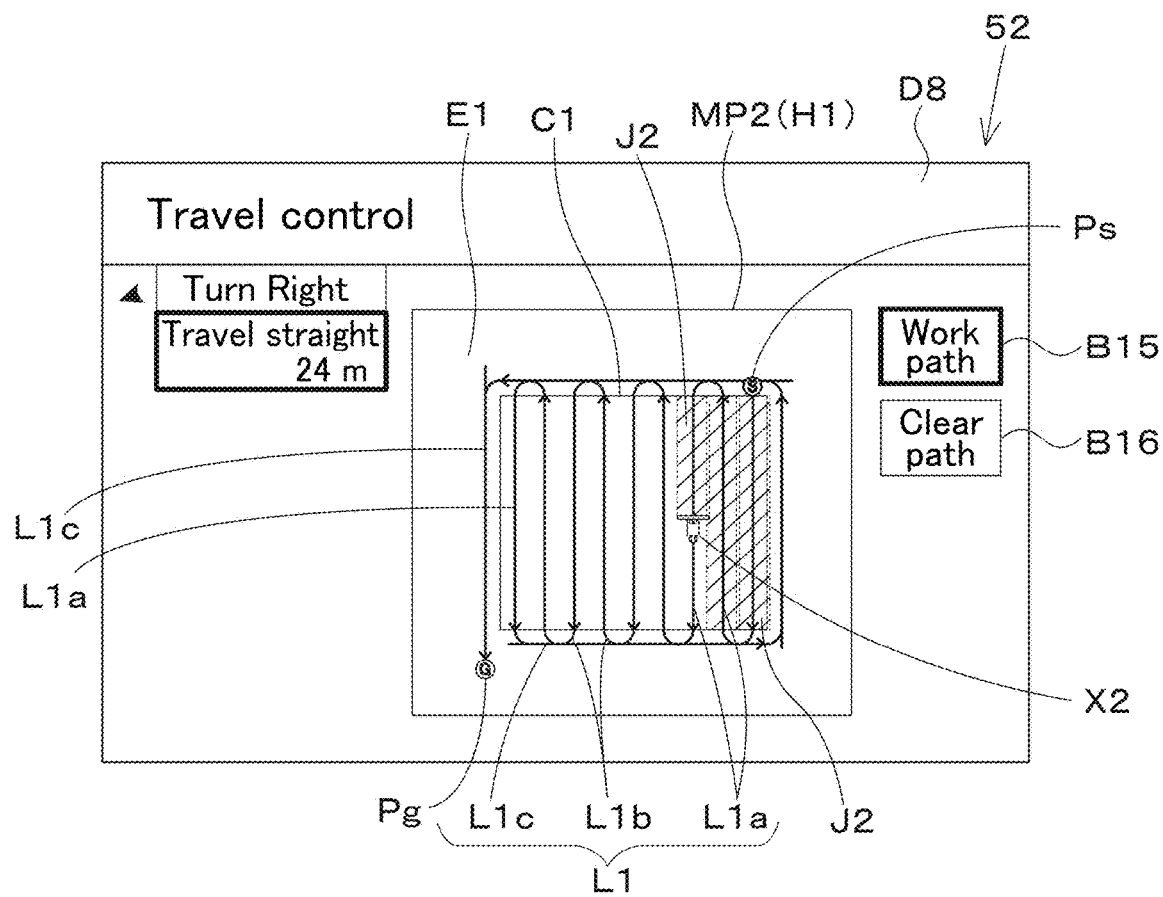
FIG. 12 illustrates an example of a travel control screen of the agricultural work assistance apparatus.

Assume that, after the travel route L1 is displayed on the "route creation 2" screen D7, the user selects the next key B9. Upon the selection, the controller 51 causes the communicator 54 to transmit data of the agricultural field map MP2, the areas C1 and E1, and the travel route L1 displayed on the screen D7 to the controller 60 (FIG. 1) via the in-vehicle network N1. The controller 51 also causes the display operation interface 52 to display the travel control screen D8 as illustrated in FIG. 12.

The travel control screen D8 is a screen to display the manner in which the agricultural machine 1 travels and the manner in which work is performed in the automatic traveling-and-working mode. Note that the travel control screen D8 in FIG. 12 displays, for example, the manner in which the agricultural machine 1 travels and the manner in which work is performed, after a certain period from the start of the automatic traveling-and-working mode. The travel control screen D8 displays the agricultural field map MP2, the travel route L1, the starting point Ps, the goal point Pg, an agricultural machine symbol X2, the manner in which the agricultural machine 1 travels, a work path key B15, and a path clear key B16.

The controller 51 acquires, via the communicator 54, the actual position of the traveling vehicle body 3 detected by the positioning device 40 at predetermined intervals, and causes the agricultural machine symbol X2 to be always displayed at the point on the agricultural field map MP2 that corresponds to the actual position of the traveling vehicle body 3. That is, the agricultural machine symbol X2 on the travel control screen D8 indicates the actual position of the traveling vehicle body 3 of the agricultural machine 1.

The user manually operates the agricultural machine 1 to move to the starting point Ps while looking at the travel control screen D8, and then performs a predetermined operation using the mode switch 65 (FIG. 1) to place the agricultural machine 1 in the automatic traveling-and-working mode. With this, the automatic operation controller 61 (FIG. 1) is brought into the automatic traveling-and-working mode, and causes the working device 2 to perform ground work while causing the traveling vehicle body 3 to travel by automatic operation based on the travel route L1 received (acquired) from the agricultural work assistance apparatus 50 and the position of the traveling vehicle body 3 detected by the positioning device 40.

Specifically, the automatic operation controller 61 first causes the working device 2 to perform ground work while causing the traveling vehicle body 3 to travel by automatic operation from the starting point Ps based on the straight route portions La1 and the turn route portions L1b. In so doing, the automatic operation controller 61 causes the working device 2 to perform ground work when causing the traveling vehicle body 3 to travel by automatic operation based on a straight route portion L1a, and stops the ground work performed by the working device 2 when causing the traveling vehicle body 3 to travel (turn) by automatic operation based on a turn route portion L1b. When the traveling vehicle body 3 is caused to start travelling by automatic operation based on an adjacent straight route portion L1a, ground work performed by the working device 2 is resumed. With this, the traveling vehicle body 3 travels straight back and forth in the central area C1 by automatic operation, and the ground work is performed by the working device 2 in the central area C1.

After that, the automatic operation controller 61 causes the working device 2 to perform ground work while causing the traveling vehicle body 3 to travel by automatic operation based on the go-around route portion L1c and the position of the traveling vehicle body 3. With this, the traveling vehicle body 3 goes around outside the central area C1 by automatic operation, and ground work is performed by the working device 2 in the headland E2a (see FIG. 11D and the like) surrounding the central area C1.

FIGS. 13A to 13D illustrate automatic steering of the agricultural machine 1. In the automatic traveling-and-working mode, the automatic operation controller 61 calculates the deviation of the position of the traveling vehicle body 3 detected by the positioning device 40 from the travel route L1 while causing the traveling vehicle body 3 to travel automatically. If the deviation is less than a threshold (for example, FIG. 13A), the automatic operation controller 61 maintains the angle of rotation of the steering shaft 31 (FIG. 1). If the deviation of the position of the traveling vehicle body 3 from the travel route L1 is equal to or more than the threshold and the traveling vehicle body 3 is positioned leftward of the travel route L1 (for example, FIG. 13B), the automatic operation controller 61 rotates the steering shaft 31 so that the traveling vehicle body 3 is steered right. If the deviation of the position of the traveling vehicle body 3 from the travel route L1 is equal to or more than the threshold and the traveling vehicle body 3 is positioned rightward of the travel route L1 (for example, FIG. 13C), the automatic operation controller 61 rotates the steering shaft 31 so that the traveling vehicle body 3 is steered left.

Figure 13A:
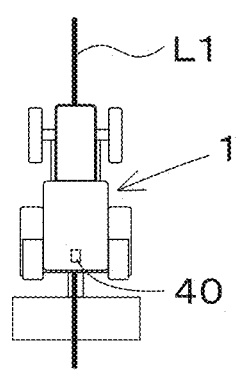
FIG. 13A describes automatic operation of an agricultural machine.
Figure 13B:
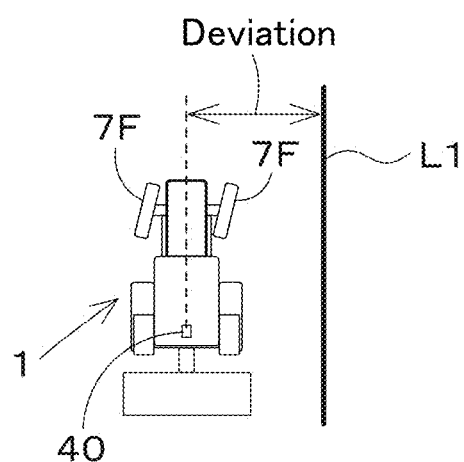
FIG. 13B describes the automatic operation of the agricultural machine.
Figure 13C:
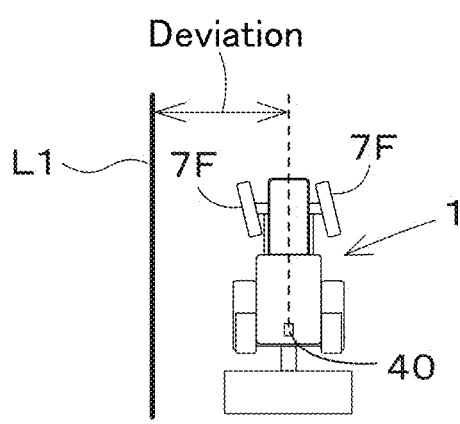
FIG. 13C describes the automatic operation of the agricultural machine.
Figure 13D:
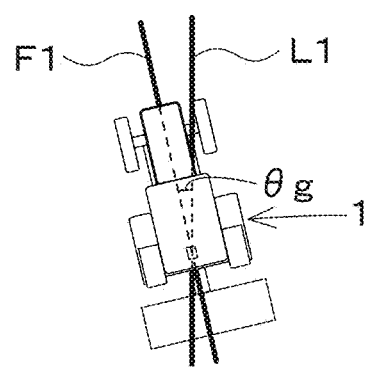
FIG. 13D describes the automatic operation of the agricultural machine.

The steering angle of (the steering angle achieved by) the steering 29 is changed based on the deviation of the position of the traveling vehicle body 3 from the travel route L1 in the above example. Note, however, that, for another example, the steering angle of the steering 29 may be changed based on the angle θg of the direction-of-travel F1 of the traveling vehicle body 3 to the travel route L1 as illustrated in FIG. 13D. In such a case, for example, the automatic operation controller 61 calculates the direction-of-travel F1 of the traveling vehicle body 3 from changes in position of the traveling vehicle body 3, and calculates the angle θg of the direction-of-travel F1 to the travel route L1. If the angle θg is equal to or greater than a threshold, the automatic operation controller 61 rotates the steering shaft 31 so that the direction-of-travel F1 of the traveling vehicle body 3 matches the direction of the travel route L1 (i.e., so that the angle θg is zero degrees).

For another example, the automatic operation controller 61 may calculate a first steering angle based on the deviation of the position of the traveling vehicle body 3 from the travel route L1 and calculate a second steering angle based on the travel route L1 and the direction-of-travel F1 of the traveling vehicle body 3. The automatic operation controller 61 may then calculate a third steering angle based on the first steering angle and the second steering angle and rotate the steering shaft 31 based on the third steering angle.

The automatic operation controller 61 calculates the actual vehicle speed of the traveling vehicle body 3 based on changes in position of the traveling vehicle body 3 while the automatic operation controller 61 is causing the traveling vehicle body 3 to travel automatically based on the travel route L1. The automatic operation controller 61 then controls the driving of the transmission 5, the brake 6, and the prime mover 4 so that the actual vehicle speed matches the vehicle speed associated with a corresponding one of the straight route portions L1a, the turn route portions L1b, and the go-around route portion L1c.

As has been discussed, when the agricultural machine 1 is in the automatic traveling-and-working mode, the automatic operation controller 61 of the agricultural machine 1 automatically steers the traveling vehicle body 3 while automatically changing the travel speed of the traveling vehicle body 3 based on the travel route L1 and the position of the traveling vehicle body 3. The automatic operation controller 61 also automatically causes the working device 2 to perform agricultural work (ground work) and stop the agricultural work.

On the travel control screen D8 illustrated in FIG. 12, the user selects the work path key B15. Upon the selection, the path calculator 51d calculates an actual work path J2 along which the working device 2 has performed ground work, based on the position(s) of the traveling vehicle body 3 detected by the positioning device 40 and the working width of the working device 2. The path calculator 51d also causes the memory 53 to store data of the actual work path J2. Then, as illustrated in FIG. 12, the controller 51 causes the actual work path J2 (hatched portion) to be displayed over the straight route portion(s) L1a in the agricultural field map MP2 in a superimposed manner. When the user selects the path clear key B16, the controller 51 causes the displayed actual work path J2 to disappear.

When the work path key B15 is selected during the automatic traveling-and-working mode, the path calculator 51d calculates the actual work path J2 from the start of the automatic traveling-and-working mode to the present, and causes the memory 53 to store data of the work path J2. Then, the controller 51 causes the actual work path J2 to be displayed on the agricultural field map MP2. Note that if the selection of the work path key B15 is continued, the actual work path J2 is calculated and displayed and the data is stored at predetermined intervals. With this, on the travel control screen D8, the position at which the agricultural machine symbol X2 indicating the position of the traveling vehicle body 3 is displayed is continually updated and the actual work path J2 extends.

Note that, after entering the automatic traveling-and-working mode, the path calculator 51d may calculate the actual work path J2 at predetermined intervals and may cause the memory 53 to store the data of the work path J2. When the user selects the work path key B15, the controller 51 may read the data of the actual work path J2 from the memory 53 and cause the actual work path J2 to be displayed on the travel control screen D8 based on the data.

Figure 14A:
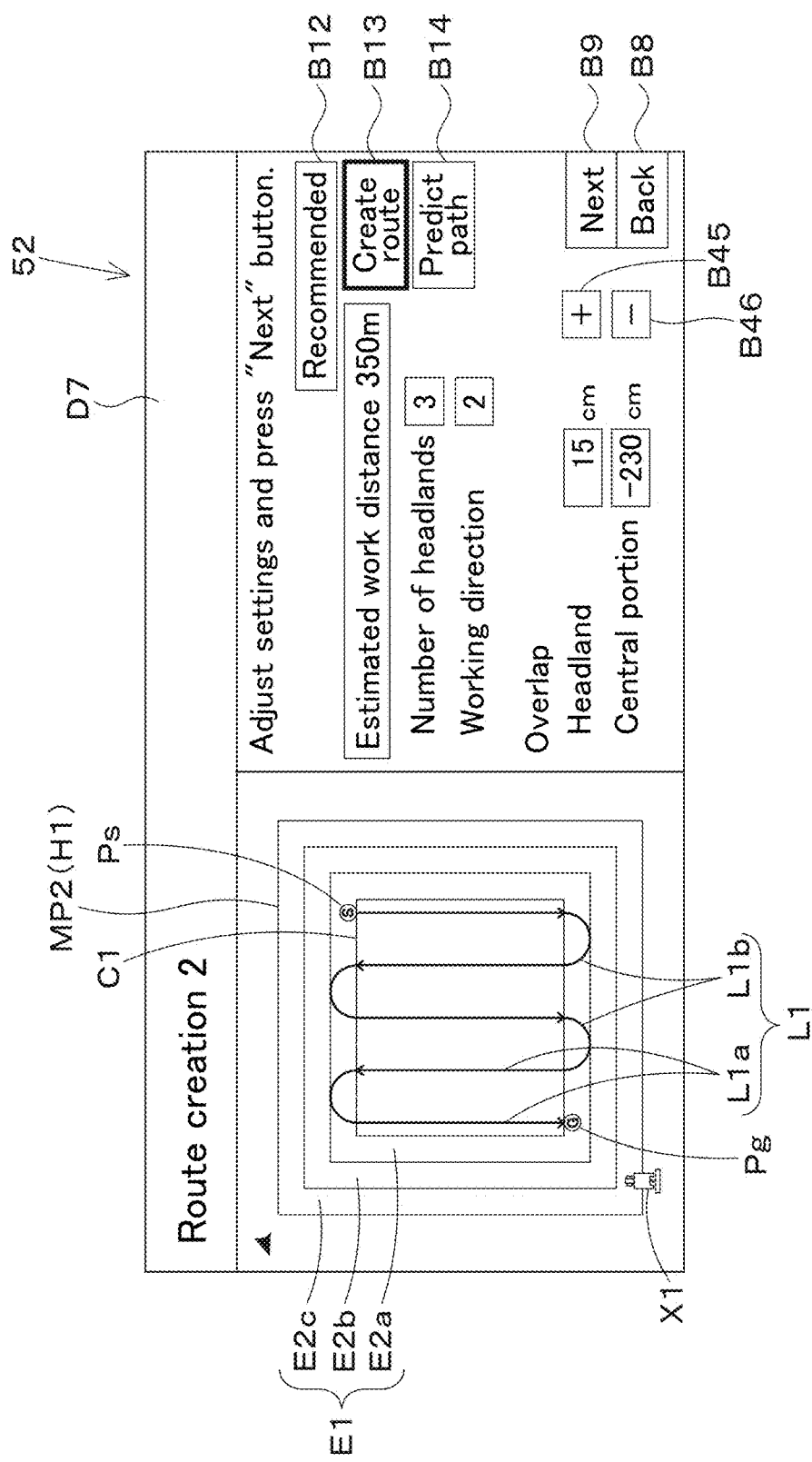
FIG. 14A illustrates another example of the "route creation 2" screen of the agricultural work assistance apparatus.
Figure 14B:
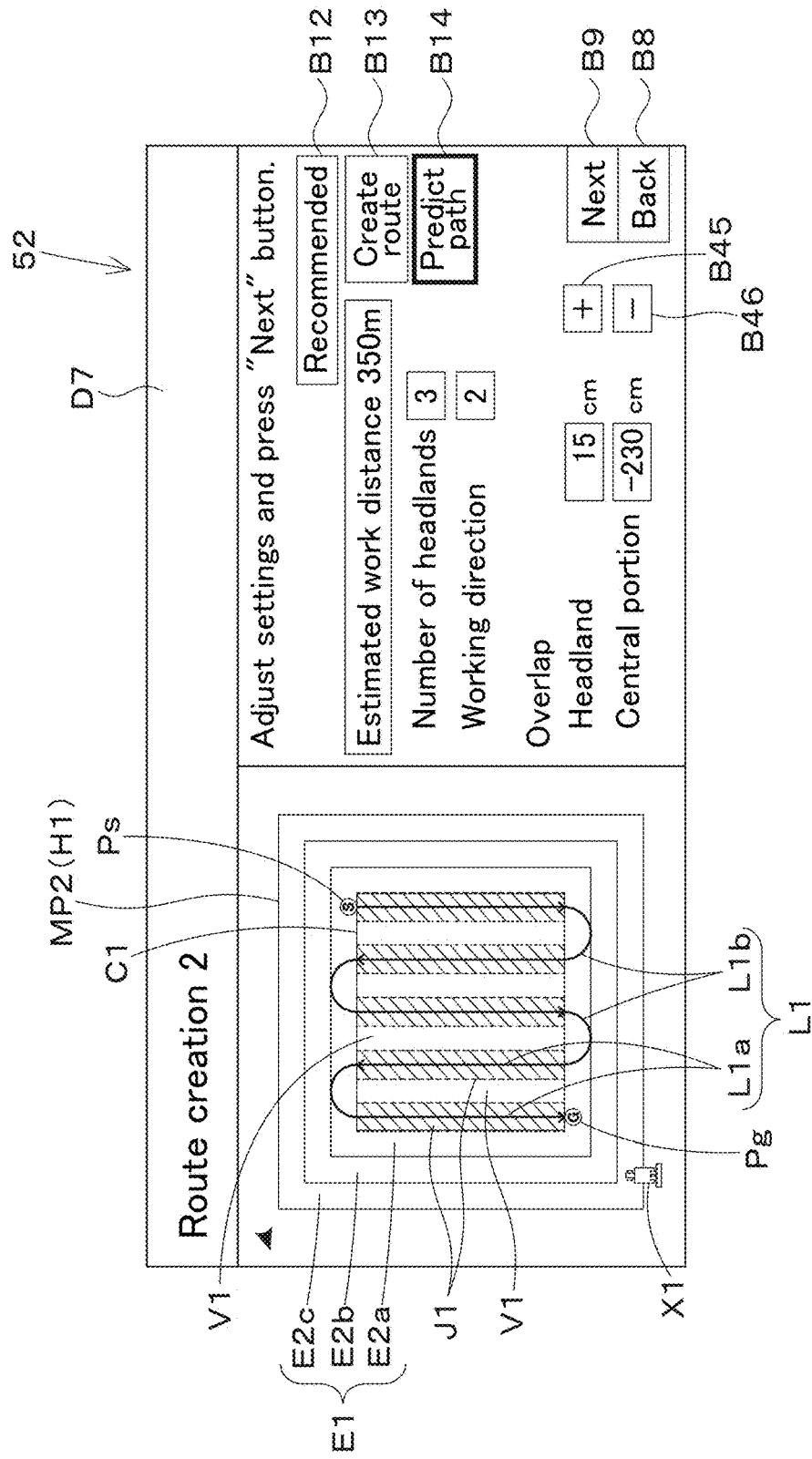
FIG. 14B illustrates another example of the "route creation 2" screen of the agricultural work assistance apparatus.

The above preferred embodiments discussed example cases in which ground work is performed on substantially the entire central area C1 in the automatic traveling-and-working mode of the agricultural machine 1 as illustrated in FIG. 10C. However, for example, ground work may be performed on a portion of the central area C1 in the automatic traveling-and-working mode of the agricultural machine 1, and then ground work may be performed on the rest of the central area C1 with the same or a different agricultural machine. FIGS. 14A and 14B illustrate an example of such a case.

FIGS. 14A and 14B illustrate another example of the "route creation 2" screen D7.

For example, as illustrated in FIG. 14A, the user inputs a negative numerical value in the input field for the overlap-in-central-portion on the "route creation 2" screen D7, inputs appropriate numerical values in the other input fields, and selects the route creation key B13. With this, the areas C1 and E1 defined by the area definer 51b, the travel route L1 created by the route creator 51c, and/or the like are displayed on the agricultural field map MP2.

FIGS. 14A and 14B illustrate the travel route L1 including the straight route portions L1a and the turn route portions L1b for convenience. However, the travel route L1 may include go-around route portion(s) L1c as illustrated in FIG. 10B. (The same applies to preferred embodiments illustrated in FIGS. 15 to 17 described later.)

The number of straight route portions L1a of the travel route L1 illustrated in FIG. 14A is less than the number of straight route portions L1a illustrated in FIG. 10B. Furthermore, the interval between adjacent ones of the straight route portions L1a illustrated in FIG. 14A is wider than the interval between adjacent ones of the straight route portions L1a illustrated in FIG. 10B. Thus, when the user selects the path prediction key B14, the predicted work paths J1 (hatched portions) calculated by the path calculator 51d are displayed with spaces between them in the central area C1 as illustrated in FIG. 14B.

Portions V1 (non-hatched portions in the central area C1 in FIG. 14B) between the predicted work paths J1 extending back and forth in the central area C1 are predicted non-work portions where ground work is predicted not to be performed in the automatic traveling-and-working mode of the agricultural machine 1. That is, in FIG. 14B, the travel route L1, the predicted work paths (work portions where ground work is to be performed) J1, and the predicted non-work portions V1 are displayed together in different manners on the agricultural field map MP2. The predicted work paths J1 are displayed in an emphasized manner compared to the predicted non-work portions V1. In the present example, the predicted work paths J1 and the predicted non-work portions V1 are indicated with different hatchings. However, when the display operation interface 52 supports color display, the predicted work paths J1 and the predicted non-work portions V1 may be filled with different colors, or densities of the colors may be different from each other. (The same applies to the actual work paths J2 and actual non-work portions V2 described later.)

In FIG. 14B, each predicted non-work portion V1 is a portion defined by a portion of the contour of one of two adjacent predicted work paths J1 in the central area C1, a portion of the contour of the other of the two adjacent predicted work paths J1, and portions of the contour of the central area C1. However, depending on the manner in which the work route portion(s) included in the travel route L1 is/are created, the predicted non-work portion V1 may also include a portion of the central area C1 that is defined by a portion of the contour of one predicted work path J1 and a portion of the contour of the central area C1. The predicted non-work portion V1 may include the entirety or a portion of the headland area E1 where ground work is not performed by the working device 2.

That is, each predicted non-work portion V1 is a portion that differs from portions as the predicted work paths J1 in the agricultural field map MP2 and that is defined by portions of the contours of respective two or more of the predicted work path(s) J1, the central area C1, the headland area E1, and the headlands E2a, E2b, and E2c at least including the predicted work path J1. The path calculator 51d may calculate not only the predicted work path(s) J1 but also the predicted non-work portion(s) V1.

Figure 15:
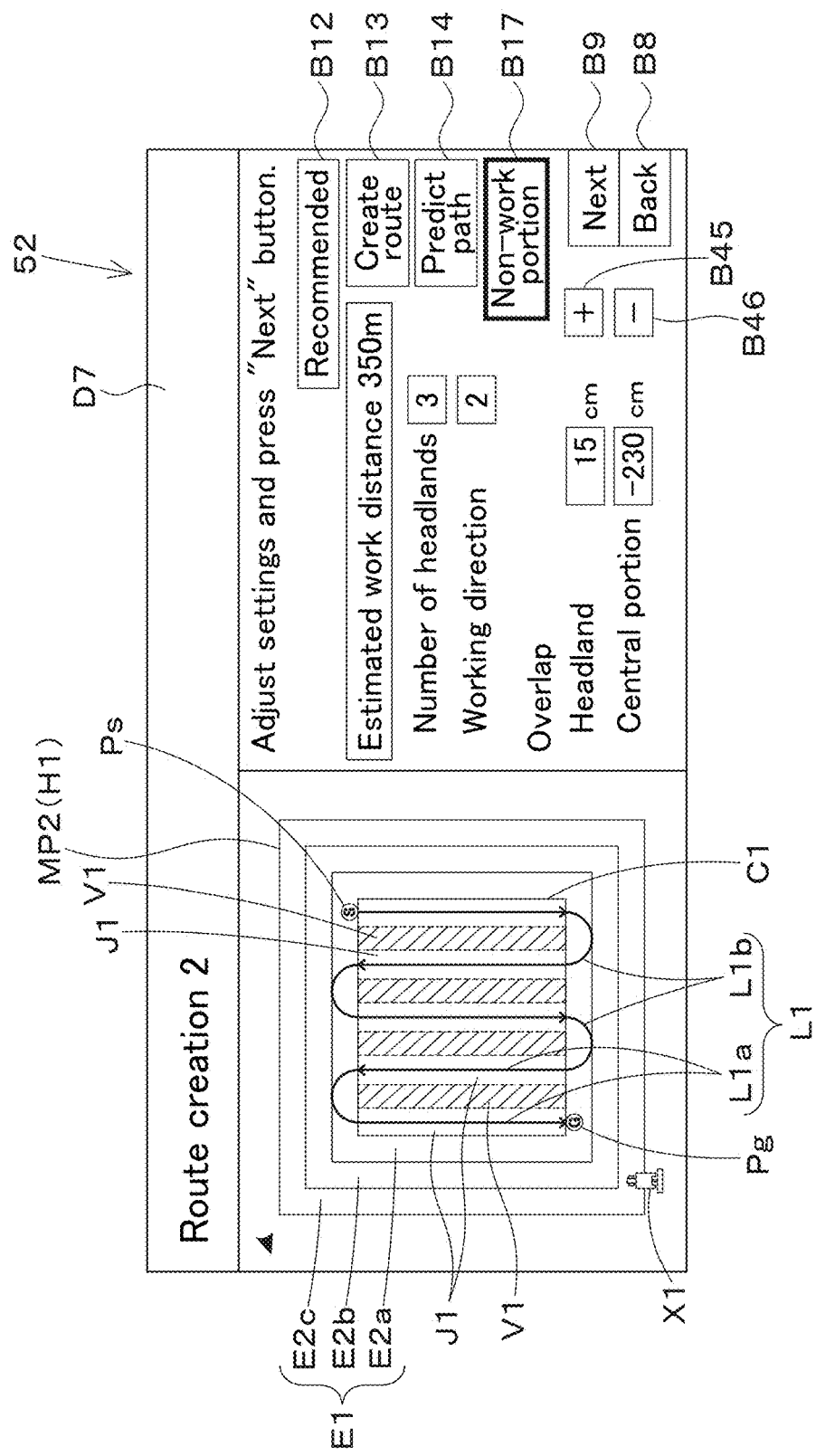
FIG. 15 illustrates another example of the "route creation 2" screen of the agricultural work assistance apparatus.

In the case where the travel route L1 is created and the predicted non-work portion(s) V1 and the like are calculated as illustrated in FIGS. 14A and 14B, a non-work portion key B17 may be provided on the "route creation 2" screen D7 as illustrated in FIG. 15, for example. When the user selects this non-work portion key B17, the controller 51 causes the predicted non-work portion(s) V1 (hatched portions) in an emphasized manner compared to the predicted work paths J1, based on the predicted work paths J1 calculated by the path calculator 51d. On the contrary, when the user selects the path prediction key B14, the predicted work paths J1 are displayed in an emphasized manner compared to the predicted non-work portions V1 as illustrated in FIG. 14B. That is, the manner in which the predicted work paths J1 and the predicted non-work portions V1 are displayed is changed by selecting either the path prediction key B14 or the non-work portion key B17.

With this, for example, when the user performs the automatic traveling-and-working mode of the agricultural machine 1 in the agricultural field corresponding to the agricultural field map MP2, the user can know that ground work is performed by the agricultural machine 1 on the predicted work paths J1 displayed on the "route creation 2" screen D7. Then, the user can also know that ground work needs to be performed on the predicted non-work portions V1 with the same or a different agricultural machine after performing the automatic traveling-and-working mode of the agricultural machine 1.

As illustrated in FIGS. 16A to 16D, the non-work portion key B17 may also be provided on the travel control screen D8. In this case, when the user selects the work path key B15 or the non-work portion key B17, the path calculator 51d calculates the actual work path(s) J2 where the working device 2 has performed ground work in the automatic traveling-and-working mode of the agricultural machine 1. Specifically, for example, the path calculator 51d determines, as the actual work path J2, a portion (area) through which the working width has passed during the ground work performed by the working device 2 based on the work route portion (one or more straight route portions L1a in FIGS. 16A to 16D) included in the travel route L1 from the starting point Ps to the current position of the traveling vehicle body 3. Also in such a case, the widthwise center of the traveling vehicle body 3 and the widthwise center of the working device 2 are set on the work route portions.

The path calculator 51d may calculate not only the actual work path J2 but also actual non-work portion(s) V2 where the working device 2 has not performed work in the automatic traveling-and-working mode of the agricultural machine 1. The actual non-work portion V2 is a portion that is different from a portion as the actual work path J2 in the agricultural field map MP2 and that is defined by portions of two or more of the actual work path J2, the central area C1, the headland area E1, and the headlands E2a, E2b, and Ec at least including actual work path J2.

Figure 16A:
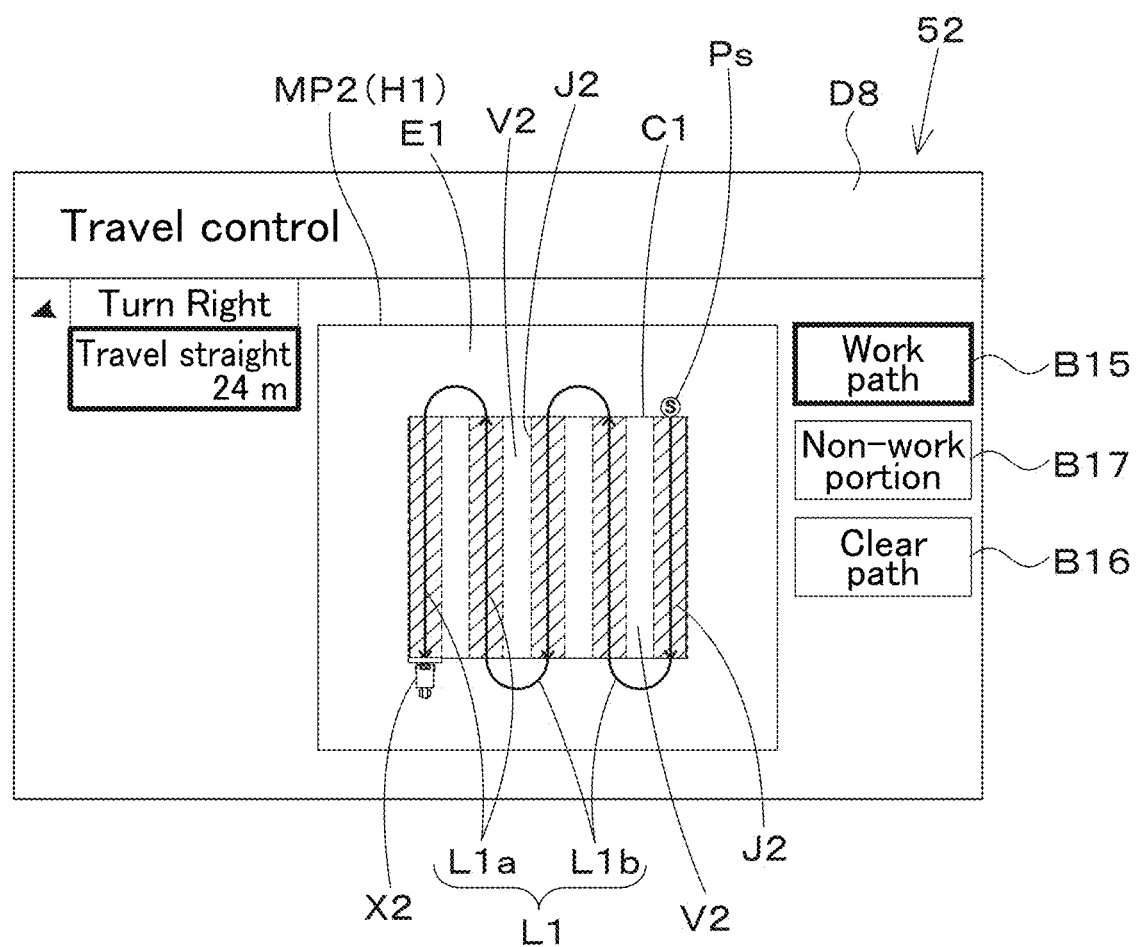
FIG. 16A illustrates another example of the travel control screen of the agricultural work assistance apparatus.
Figure 16B:
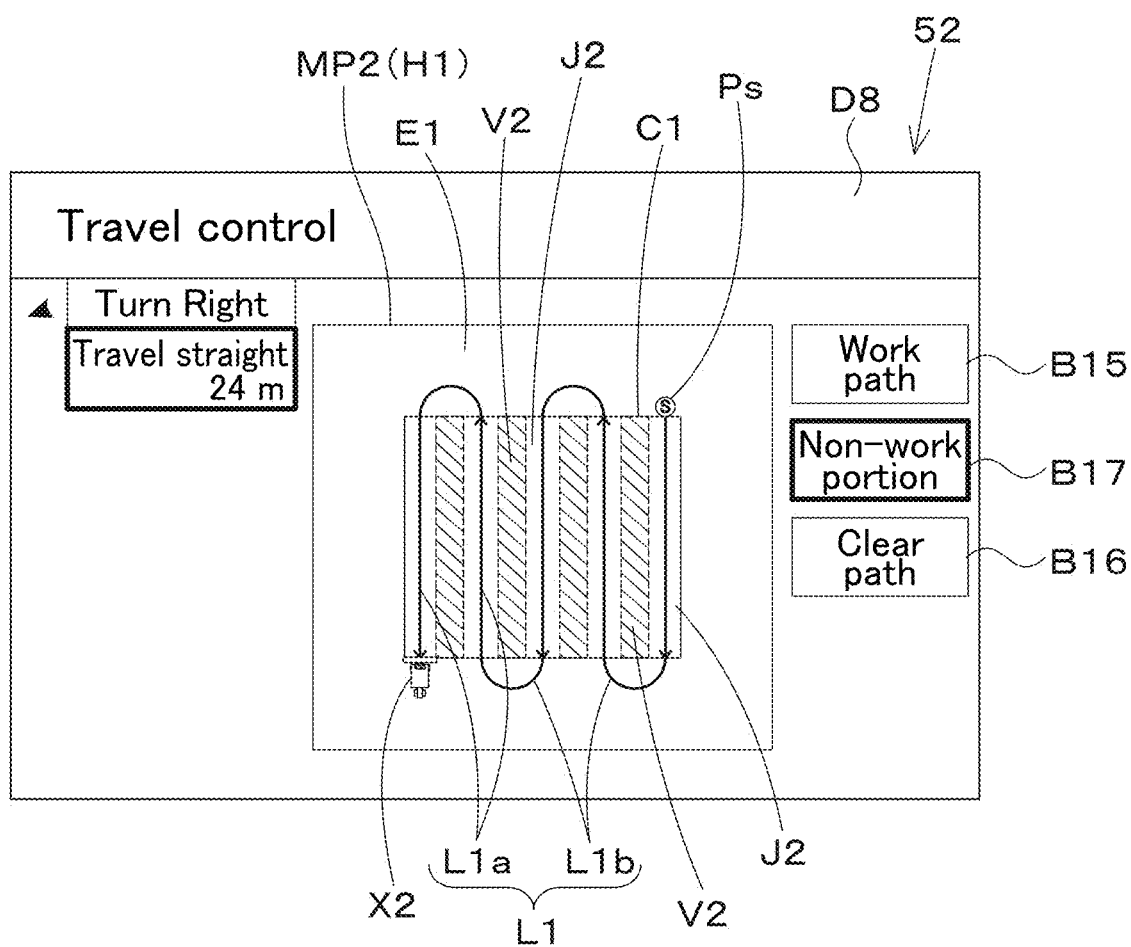
FIG. 16B illustrates another example of the travel control screen of the agricultural work assistance apparatus.

When the work path key B15 is selected after the calculation of the actual work path(s) J2 and/or the like, the controller 51 causes the actual work paths J2 to be displayed in an emphasized manner compared to the actual non-work portions V2 on the agricultural field map MP2 as illustrated in FIG. 16A. When the non-work portion key B17 is selected, the controller 51 causes the actual non-work portions V2 to be displayed in an emphasized manner compared to the actual work paths J2 as illustrated in FIG. 16B. That is, the actual work paths J2 and the actual non-work portions V2 are displayed together on the travel control screen D8 in different manners.

Figure 16C:
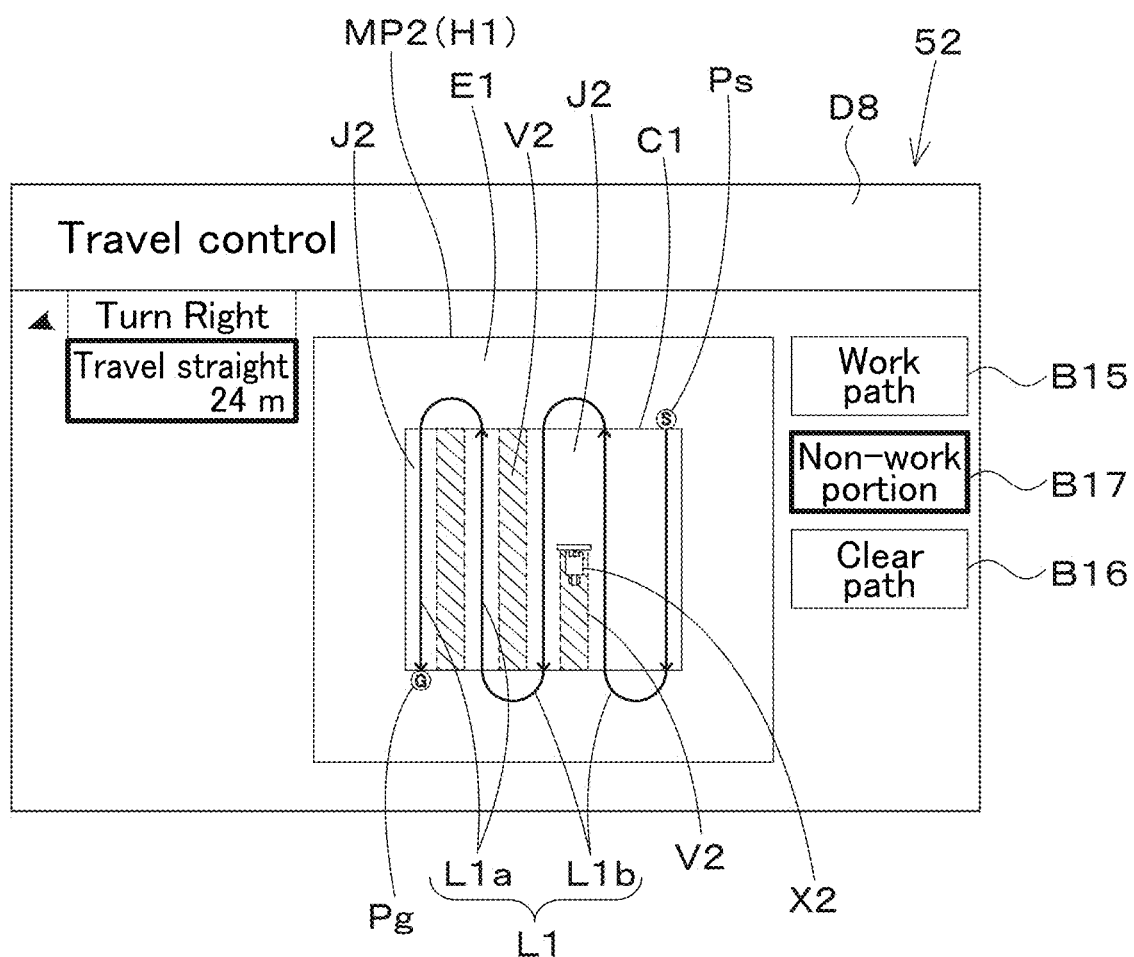
FIG. 16C illustrates another example of the travel control screen of the agricultural work assistance apparatus.

For example, when the user selects the non-work portion key B17 on the travel control screen D8 after temporarily performing the automatic traveling-and-working mode of the agricultural machine 1 in the agricultural field corresponding to the agricultural field map MP2, the controller 51 causes the actual non-work portions V2 to be displayed in an emphasized manner. Assume here that the user performs ground work with the same or a different agricultural machine based on the actual non-work portions V2. In this case, the controller 51 keeps the travel control screen D8 displayed as illustrated in FIG. 16C, and causes the portion of the displayed non-work portions V2 where ground work has been done by the agricultural machine (agricultural machine symbol X2) to disappear.

Figure 16D:
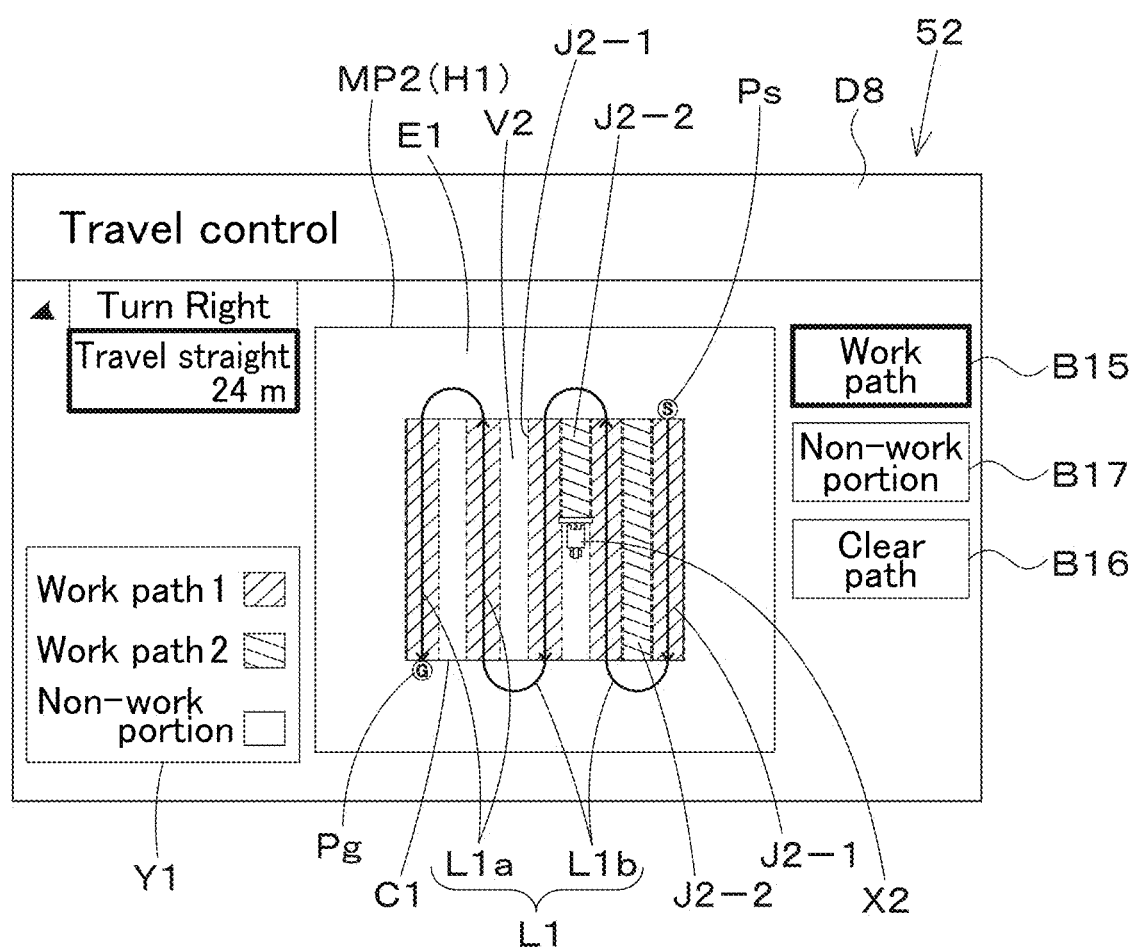
FIG. 16D illustrates another example of the travel control screen of the agricultural work assistance apparatus.

For example, when the user selects the work path key B15 on the travel control screen D8 after performing the automatic traveling-and-working mode of the agricultural machine 1 in the agricultural field corresponding to the agricultural field map MP2, the controller 51 causes the actual work paths J2 of the agricultural machine 1 to be displayed in an emphasized manner. Assume here that the user performs ground work with the same or a different agricultural machine based on the actual non-work portions V2. With this, the controller 51 keeps the travel control screen D8 displayed as illustrated in FIG. 16D, and causes an actual work path J2-2 where ground work has been performed by the agricultural machine (agricultural machine symbol X2) to be displayed in a different manner from actual work paths J2-1 where ground work has been performed by the agricultural machine 1 earlier and from the actual non-work portions V2. In this case, the travel control screen D8 preferably displays a legend Y1 indicating respective manners in which the actual work paths J2-1 and J2-2 and the actual non-work portion V2 are displayed.

As described above, a plurality of pieces of data of predicted work paths J1 and actual work paths J2 calculated by the path calculator 51d may be stored and saved in the memory 53. In this case, the controller 51 may read two or more of the plurality of pieces of data stored in the memory 53 and cause the display operation interface 52 to display the predicted work paths J1 and the actual work paths J2 and/or the like together based on the pieces of data in different manners as illustrated in FIG. 17.

Figure 17:
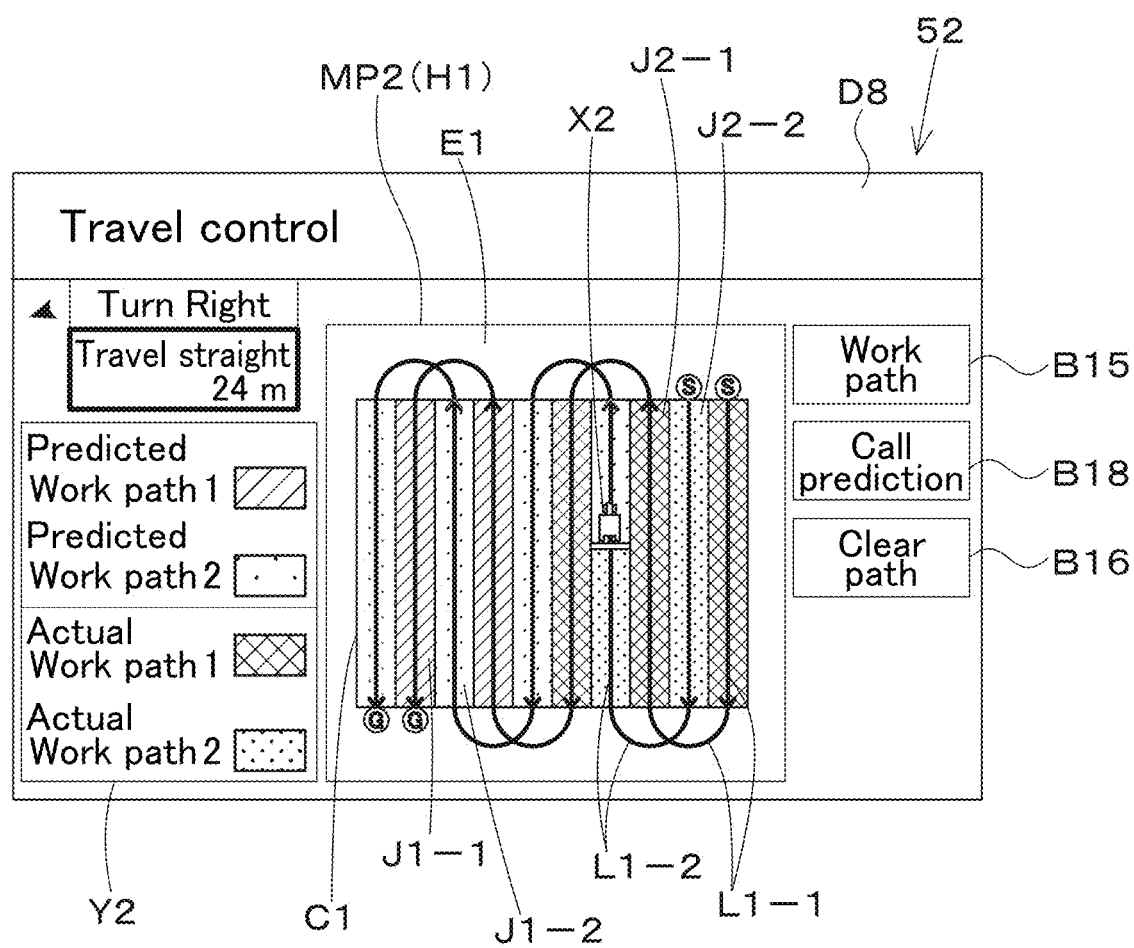
FIG. 17 illustrates another example of the travel control screen of the agricultural work assistance apparatus.

The travel control screen D8 in FIG. 17 displays a prediction call key B18 and a legend Y2 in addition to the features of the travel control screen D8 illustrated in FIG. 12. When the user selects the prediction call key B18, the controller 51 causes the display operation interface 52 to display a list of pieces of identification information of the plurality of predicted work paths J1 stored in the memory 53 (not illustrated). When the user selects one or more of the pieces of identification information, the controller 51 reads the data of the predicted work path(s) J1 corresponding to the one or more pieces of identification information from the memory 53, and causes the predicted work path(s) J1 to be displayed on the agricultural field map MP2 based on the data. In the example of FIG. 17, the predicted work path J1-1 (predicted work path 1) based on one type of travel route L1-1 and a predicted work path J1-2 (predicted work path 2) based on another type of travel route L1-2 are displayed.

The user selects the work path key B15 while the predicted work paths J1-1 and J1-2 are displayed as described above. With this, the controller 51 causes the actual work path J2-1 where ground work has been performed by the agricultural machine 1 and the actual work path J2-2 where ground work has been performed by the same or a different agricultural machine (agricultural machine symbol X2) to be also displayed on the agricultural field map MP2 as illustrated in FIG. 17. In the example of FIG. 17, the actual work path J2-1 (actual work path 1) where ground work has been performed earlier and the actual work path J2-2 (actual work path 2) where ground work has been performed later are displayed. The controller 51 also causes the travel control screen D8 to display the legend Y2 indicating the manners in which the predicted work paths J1-1 and J1-2 and the actual work paths J2-1 and J2-2 are displayed. With this, the user can visually recognize the plurality of predicted work paths J1 and the plurality of actual work paths J2 when performing work with the agricultural machine 1 in the agricultural field corresponding to the agricultural field map MP2.

Ground work performed by the agricultural machine 1 with the working device 2 includes work performed using materials. Specific examples of such work include fertilization, spreading agricultural chemicals, seeding, seedling transplanting, and the like performed using materials such as fertilizers, agricultural chemicals, seeds, and seedlings. In such cases, the working device 2 includes a spreader, a seeder, a transplanter, or the like, and is connected to the traveling vehicle body 3 of the agricultural machine 1. A controller included in the working device 2 controls the operation of a supply mechanism provided in the working device 2 to adjust the amount of a material to be supplied to the agricultural field and the points in time at which the material is supplied to the agricultural field. The controller of the working device 2 also transmits, via a communicator, a signal indicating the start or end of the supply of the material to the agricultural field to the controller 60 (FIG. 1) of the agricultural machine 1 via the in-vehicle network N1.

The ground work described above is performed by the agricultural machine 1 and the material is supplied to the agricultural field, so that the material on the working device 2 (or the agricultural machine 1) is consumed. Furthermore, when the agricultural field is large, the material runs short during the ground work on the agricultural field. In view of this, as described later, when the agricultural machine 1 performs ground work in the agricultural field in the automatic traveling-and-working mode, the remaining amount of the material is calculated and supply point(s) where supply of additional material is to be received is set. Furthermore, the automatic traveling-and-working mode is temporarily stopped in the agricultural machine 1, and a material-supply-receiving mode is performed in which the traveling vehicle body 3 is caused to move to the supply point by automatic operation.

For example, when the user selects work to be performed using a material such as fertilizing or spreading of agricultural chemicals and then further selects the next key B9 on the work selection screen D3 in FIG. 6, the controller 51 causes the display operation interface 52 to display a material information input screen D9 as illustrated in FIG. 18. The material information input screen D9 displays a message indicating an input operation procedure to input information about a material supplied (introduced) to the working device 2, a plurality of setting items and numerical value input fields thereof, a remaining amount reset key B19, the plus key B45, the minus key B46, the next key B9, and the back key B8.

The plurality of setting items include a theoretical remaining amount, the amount of material introduced, the amount of material consumption per unit, and the remaining amount for entering the material-supply-receiving mode. Numerical values (parameters) can be inputted for such items except for the theoretical remaining amount. The theoretical remaining amount indicates the remaining amount of the material (unit: kg) calculated by the remaining amount calculator 51e (FIG. 1). The data indicating this remaining amount of the material is stored in the memory 53 and can be updated. When the user selects the remaining amount reset key B19, the numerical value displayed in the numerical value display field of the theoretical remaining amount is reset (deleted), and data of the theoretical remaining amount stored in the memory 53 is reset to an initial value (for example, "0 kg").

The amount of material introduced indicates the amount (unit: kg) of the material introduced into a material holder such as a hopper provided in or on the working device 2 (or the agricultural machine 1). The amount of material consumption per unit indicates the amount (unit: kg/10a (10a=1,000 m$^2$)) of the material consumed per unit area when ground work is performed by the working device 2. The remaining amount for entering the material-supply-receiving mode indicates the remaining amount of the material (unit: %) at which the agricultural machine 1 enters the material-supply-receiving mode during ground work performed in the automatic traveling-and-working mode. As the remaining amount for entering the material-supply-receiving mode, a value of 0% or greater can be inputted. However, a value greater than 0% is preferably inputted.

The user selects the numerical value input field of each setting item on the material information input screen D9 and operates the plus key B45 or the minus key B46, so that a numerical value is inputted into the numerical value input field. As another example, a recommended value of the amount of material consumption per unit may be set for each working device 2 in advance, the recommended value may be stored in the memory 53, and a recommendation key may be provided on the material information input screen D9, for example. In this case, the controller 51 may, when the user selects the recommendation key, read the recommended value corresponding to the working device 2 from the memory 53 and cause the recommended value to be displayed in the corresponding numerical value input field on the material information input screen D9.

When the user selects the next key B9 after inputting the numerical values for the setting items on the material information input screen D9, the controller 51 causes the memory 53 to store the numerical values inputted for the respective setting items. The controller 51 also causes the display operation interface 52 to display the vehicle settings confirmation screen D4 as illustrated in FIG. 7.

Figure 19:
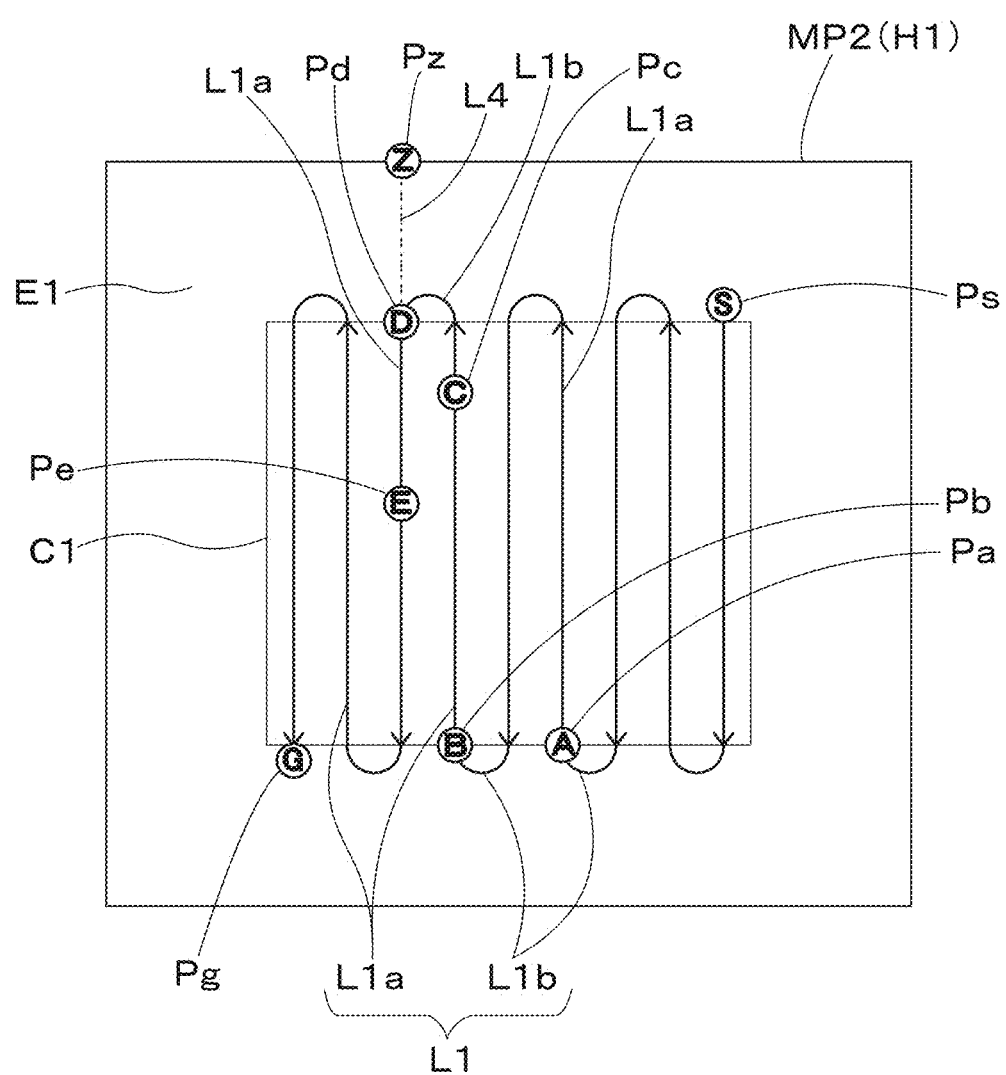
FIG. 19 illustrates an example of a material supply point and notification points.

Next, as described earlier, the user makes various settings on the vehicle settings confirmation screen D4 in FIG. 7, the agricultural field selection screen D5 in FIG. 8, and the "route creation 1" screen D6 in FIG. 9, and then inputs numerical values for the setting items on the "route creation 2" screen D7 in FIG. 10A and select the route creation key B13. Then, the area definer 51b and the route creator 51c define the areas C1 and E1, the travel route L1, the starting point Ps, and the goal point Pg as illustrated in FIG. 19, for example. The remaining amount calculator 51e also calculates the remaining amount of the material, the supply point setter 51f (FIG. 1) sets material supply point(s), and the notifier 51g (FIG. 1) sets notification point(s).

FIG. 19 illustrates an example of material supply point(s) and notification point(s). FIG. 19 does not illustrate the go-around route portion L1c for convenience of description. As described earlier, the user selects the route creation key B13 before the automatic traveling-and-working mode is performed in the agricultural machine 1 (before the traveling vehicle body 3 is caused to travel by automatic operation and before ground work is performed by the working device 2). The remaining amount calculator 51e adds the amount of material introduced to the theoretical remaining amount stored in the memory 53, and subtracts the amount of material consumption from the sum to determine a theoretical remaining amount. Before the automatic traveling-and-working mode is performed, the material is regarded as not having been consumed and the amount of material consumption is "0 kg". Therefore, the value obtained by adding the amount of material introduced to the theoretical remaining amount stored in the memory 53 is the new theoretical remaining amount. After determining the new theoretical remaining amount in this manner, the remaining amount calculator 51e overwrites the theoretical remaining amount stored in the memory 53 with the new theoretical remaining amount. With this, the theoretical remaining amount is updated.

Next, assume a case where the automatic operation controller 61 of the agricultural machine 1 performs the automatic traveling-and-working mode and causes the working device 2 to perform ground work while causing the traveling vehicle body 3 to travel from the starting point Ps by automatic operation based on the travel route L1 and the position of the traveling vehicle body 3. In this case, for example, the remaining amount calculator 51e determines a total work area by multiplying the foregoing estimated work distance (estimated distance over which ground work is performed by the working device 2 while the traveling vehicle body 3 of the agricultural machine 1 is caused to travel by automatic operation based on all the work route portions L1a and L1c) by the working width of the working device 2.

Next, the remaining amount calculator 51e determines a total amount of material consumption by multiplying the amount of material consumption per unit by the total work area. Since the working width of the working device 2 and the amount of material consumption per unit are constant, the work distance of the working device 2, the work area and the amount of material consumption are proportional to each other. As the work distance of the working device 2 increases, the working area and the amount of material consumption increase at a constant rate. Based on this relationship, the remaining amount calculator 51e determines the amount of material consumption (amount of material consumed since the start of ground work performed by the working device 2 at the starting point Ps) at each of predetermined points (at each work distance from the starting point Ps) on the work route portions L1a and L1c. It is noted here that, for example, the remaining amount calculator 51e sets end points of the respective work route portions L1a and L1c as the predetermined points, and determines the amount of material consumption at each of the predetermined points.

Next, the remaining amount calculator 51e subtracts the amount of material consumption at each predetermined point from the theoretical remaining amount (the remaining amount of the material at the starting point Ps) stored in the memory 53 to determine a theoretical remaining amount at that predetermined point. The remaining amount calculator 51e also converts the theoretical remaining amount at each predetermined point into a percentage equivalent, and sets the equivalent as the remaining amount of the material (unit: %) at that predetermined point. The above-described method of calculating the theoretical remaining amount and the remaining amount of the material is an example, and this does not imply any limitation. As another example, for example, the remaining amount calculator 51e may determine the amount of material consumption by multiplying the amount of material supplied to the agricultural field per unit time by the time over which the agricultural machine 1 has traveled straight along the straight route portion L1a, and determine the theoretical remaining amount and the remaining amount of the material at each predetermined point on the work route portions L1a and L1c by subtracting the amount of material consumption from the amount of material introduced. The theoretical remaining amount and the remaining amount of the material may be determined using another method.

The theoretical remaining amount and the remaining amount of the material decrease with the increase in the work distance of the working device 2 and the amount of material consumption described above. Based on this relationship and the above-described remaining amount(s) of the material at the predetermined position(s), the supply point setter 51f predicts (calculates) a below-threshold point Pe (FIG. 19) at which the remaining amount of the material falls below a predetermined threshold. In so doing, the supply point setter 51f sets, as the predetermined threshold, the remaining amount for entering the material-supply-receiving mode stored in the memory 53, and then predicts the below-threshold point Pe. The display operation interface 52 to which the remaining amount for entering the material-supply-receiving mode can be inputted is a threshold changer to change the threshold used to predict the below-threshold point Pe.

Next, as illustrated in FIG. 19, the supply point setter 51*f* sets a material supply point Pz in the vicinity of a footpath on an extension L4 of the straight route portion (work route portion) L1*a* including the below-threshold point Pe that extends in a direction opposite to the direction of travel. That is, the supply point Pz is set at a location that is off the travel route L1 and in the vicinity of the footpath in the agricultural field. Furthermore, the supply point setter 51*f* causes the memory 53 to store pieces of data indicating the below-threshold point Pe and the supply point Pz and also transmits, via the communicator 54, the pieces of data to the controller over the in-vehicle network N1.

Note that the above-described method of setting the supply point is an example, and this does not imply any limitation. As another example, for example, the supply point setter 51*f* may, if the input value of the remaining amount for entering the material-supply-receiving mode is greater than a predetermined value, set a material supply point in the vicinity of a footpath on an extension of the straight route portion L1*a* including the below-threshold point Pe that extends in the direction of travel. Additionally or alternatively, for example, the supply point setter 51*f* may, if the input value of the remaining amount for entering the material-supply-receiving mode is smaller than the predetermined value, set a material supply point in the vicinity of a footpath on an extension of the straight route portion L1*a* immediately preceding the straight route portion L1*a* including the below-threshold point Pe (one of the straight route portions L1*a* adjacent to the current route portion L1*a* that is closer to the starting point Ps (to the left in FIG. 19)) that extends in a direction opposite to the direction of travel. Additionally or alternatively, the supply point may be set using another method.

The notifier 51*g* sets a plurality of notification points Pa, Pb, and Pc on the travel route L1 based on the below-threshold point Pe and the supply point Pz. Specifically, for example, the notifier 51*g* sets, as a first notification point, the starting point Pa of three lines before the straight route portion L1*a* that is closest to the supply point Pz (the straight route portion L1*a* that includes the below-threshold point Pe) (i.e., the starting point Pa of the third straight route portion L1*a* from the straight route portion L1*a* that includes the below-threshold point Pe in the direction toward the starting point Ps (rightward in FIG. 19)). The straight route portion L1*a* on which the first notification point Pa is set is a route that is closer to the starting point Ps than the below-threshold point Pe and the supply point Pz are and that extends toward the footpath where the supply point Pz is set.

The notifier 51*g* also sets, as a second notification point, the starting point Pb of the straight route portion L1*a* immediately preceding the straight route portion L1*a* that is closest to the supply point Pz (i.e., the starting point Pb of the adjacent straight route portion L1*a* on the same side of the straight route portion L1*a* including the below-threshold point Pe as the starting point Ps (on the right side in FIG. 19)). The notifier 51*g* further sets, as a third notification point, a point Pc which is on the straight route portion L1*a* immediately preceding the straight route portion L1*a* closest to the supply point Pz and which is displaced from the end point toward the starting point of this straight route portion L1*a*. The starting point and the end point of the straight route portion L1*a* are also points of connection with turn route portions L1*b*. The notifier 51*g* causes the memory 53 to store data indicating the notification points Pa, Pb, and Pc described above.

Note that the above-described method of setting the notification points is an example, and this does not imply any limitation. As another example, for example, the notifier 51*g* may set a notification point at a point located between the starting point and the end point of a straight route portion L1*a* preceding the straight route portion L1*a* including the below-threshold point Pe or a point on a turn route portion L1*b* preceding the straight route portion L1*a* including the below-threshold point Pe. Additionally or alternatively, notification points may be set using another method. Furthermore, the number of notification points is not limited to three, and may be one, two, or four or more. That is, the notifier 51*g* need only set notification point(s) on straight route portion(s) L1*a* and/or turn route portion(s) L1*b* where the traveling vehicle body 3 travels in the automatic traveling-and-working mode before the straight route portion L1*a* including the below-threshold point Pe.

After the automatic traveling-and-working mode of the agricultural machine 1 is started, the automatic operation controller 61 causes the working device 2 to perform ground work while causing the traveling vehicle body 3 to travel by automatic operation based on the travel route L1 and the position of the traveling vehicle body 3 detected by the positioning device 40. Next, when the position of the traveling vehicle body 3, after passing through the turn route portion L1*b* immediately preceding the supply point Pz, reaches a connection point Pd of the turn route portion L1*b* and the straight route portion L1*a* including the below-threshold point Pe, the automatic operation controller 61 temporarily stops the automatic traveling-and-working mode and then enters the material-supply-receiving mode. The connection point Pd is a predetermined point at which a transition occurs from one of the automatic traveling-and-working mode and the material-supply-receiving mode to the other.

Figure 20A:
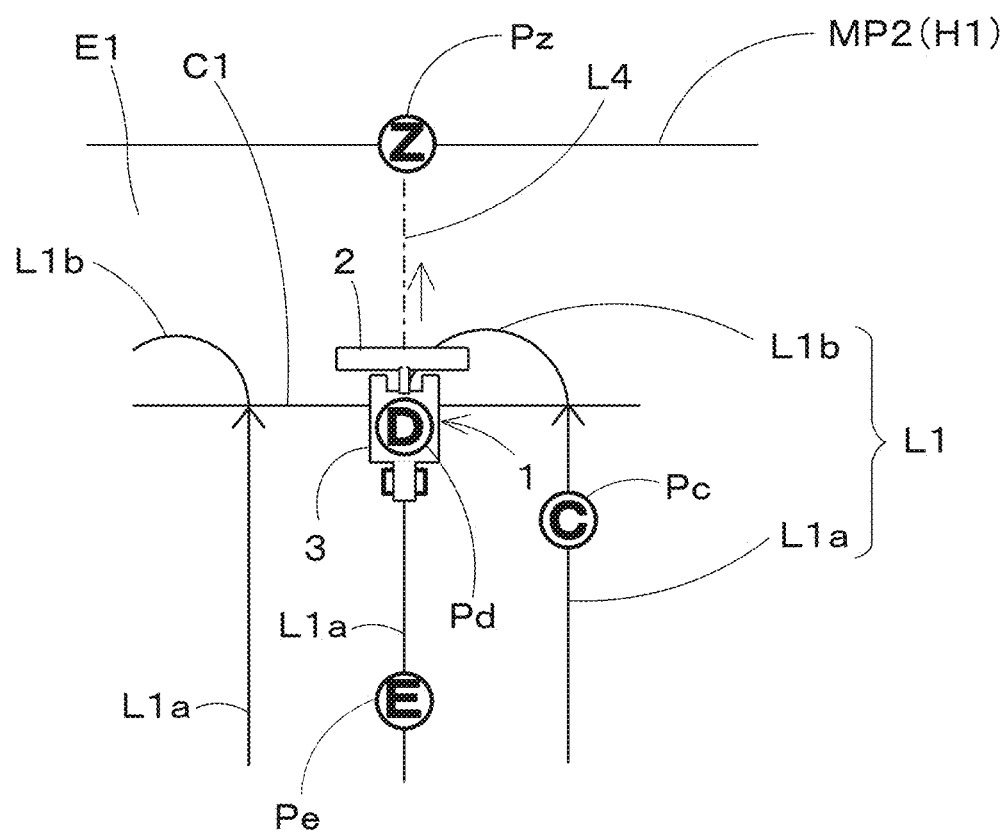
FIG. 20A describes a material-supply-receiving mode of the agricultural machine.
Figure 20B:
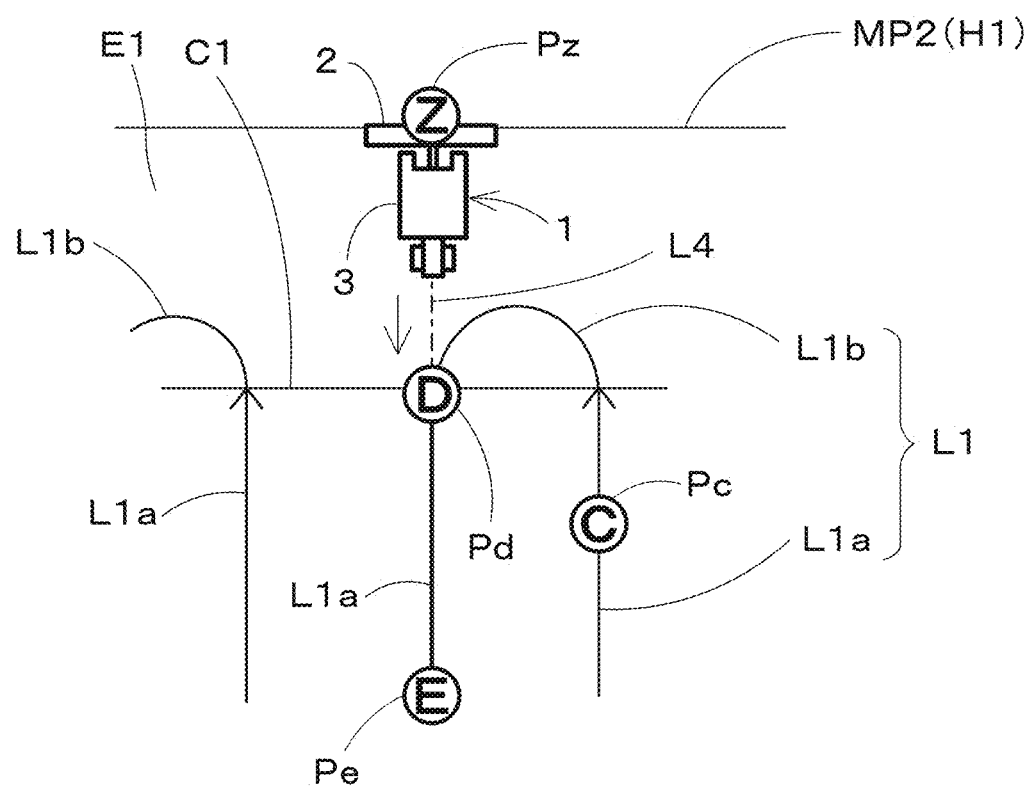
FIG. 20B describes the material-supply-receiving mode of the agricultural machine.

In the material-supply-receiving mode, based on the supply point Pz and the position of the traveling vehicle body 3, the automatic operation controller 61 causes the traveling vehicle body 3 to move (move backward) from the predetermined point Pd that is just before the supply point Pz (FIG. 20A) to the supply point Pz along the extension L4 by automatic operation (FIG. 20B). In so doing, the automatic operation controller 61 also causes the lifting device 8 to raise the working device 2, and stops ground work performed by the working device 2.

Figure 21:
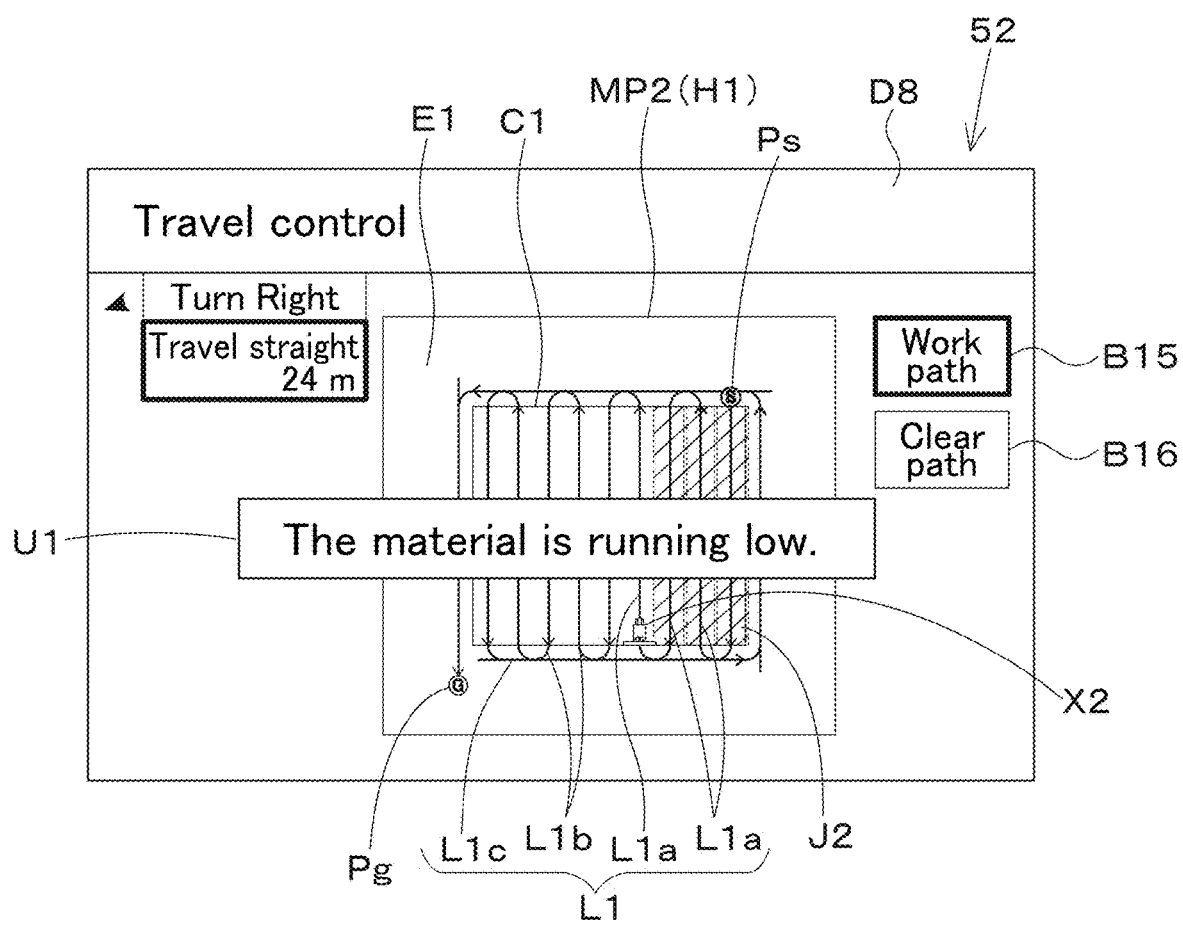
FIG. 21 illustrates an example of a first notification of the agricultural work assistance apparatus.

The notifier 51*g* of the agricultural work assistance apparatus 50 provides notifications U1, U2, and U3 suggesting receiving supply of material, when the traveling vehicle body 3 passes the notification points Pa, Pb, and Pc, respectively, in the automatic traveling-and-working mode before entering the material-supply-receiving mode. Specifically, when the position of the traveling vehicle body 3 detected by the positioning device 40 passes the first notification point Pa (FIG. 19), the notifier 51*g* displays the first notification U1 including the message "The material is running low." in a central portion of the travel control screen D8 displayed on the display operation interface 52 for a certain period as illustrated in FIG. 21. That is, the notifier 51*g* and the display operation interface 52 provide a notification indicating that the remaining amount (theoretical remaining amount) of the material is small. This first notification U1 is displayed in an emphasized manner over other indications such as the travel route L1 and the work path J2 on the travel control screen D8. Note that pieces of data representing the content of the first notification U1 and other notifications described later provided by the notifier 51g are stored in the memory 53 in advance.

Figure 22:
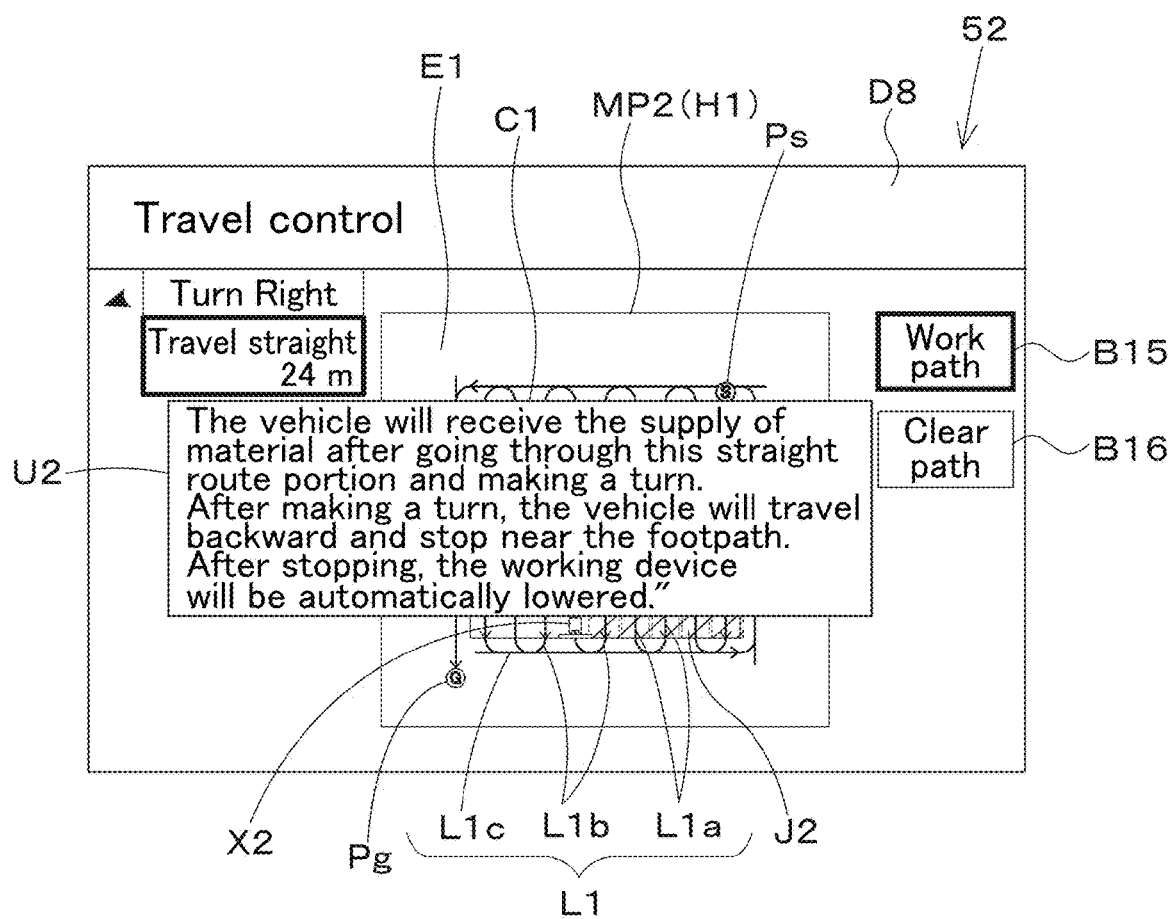
FIG. 22 illustrates an example of a second notification of the agricultural work assistance apparatus.

Next, when the traveling vehicle body 3 passes the second notification point Pb (FIG. 19), the notifier 51g displays the second notification U2 including the message "The vehicle will receive the supply of material after going through this straight route portion and making a turn.", the message "After making a turn, the vehicle will travel backward and stop near the footpath.", and the message "After stopping, the working device will be automatically lowered." in the central portion of the travel control screen D8 for a certain period as illustrated in FIG. 22. That is, the notifier 51g and the display operation interface 52 provide a notification about when the supply of material is received, where the supply of material is received, and the behaviors of the traveling vehicle body 3 and the working device 2 for receiving the supply. This second notification U2 is also displayed in an emphasized manner on top of the other indications on the travel control screen D8.

Figure 23:
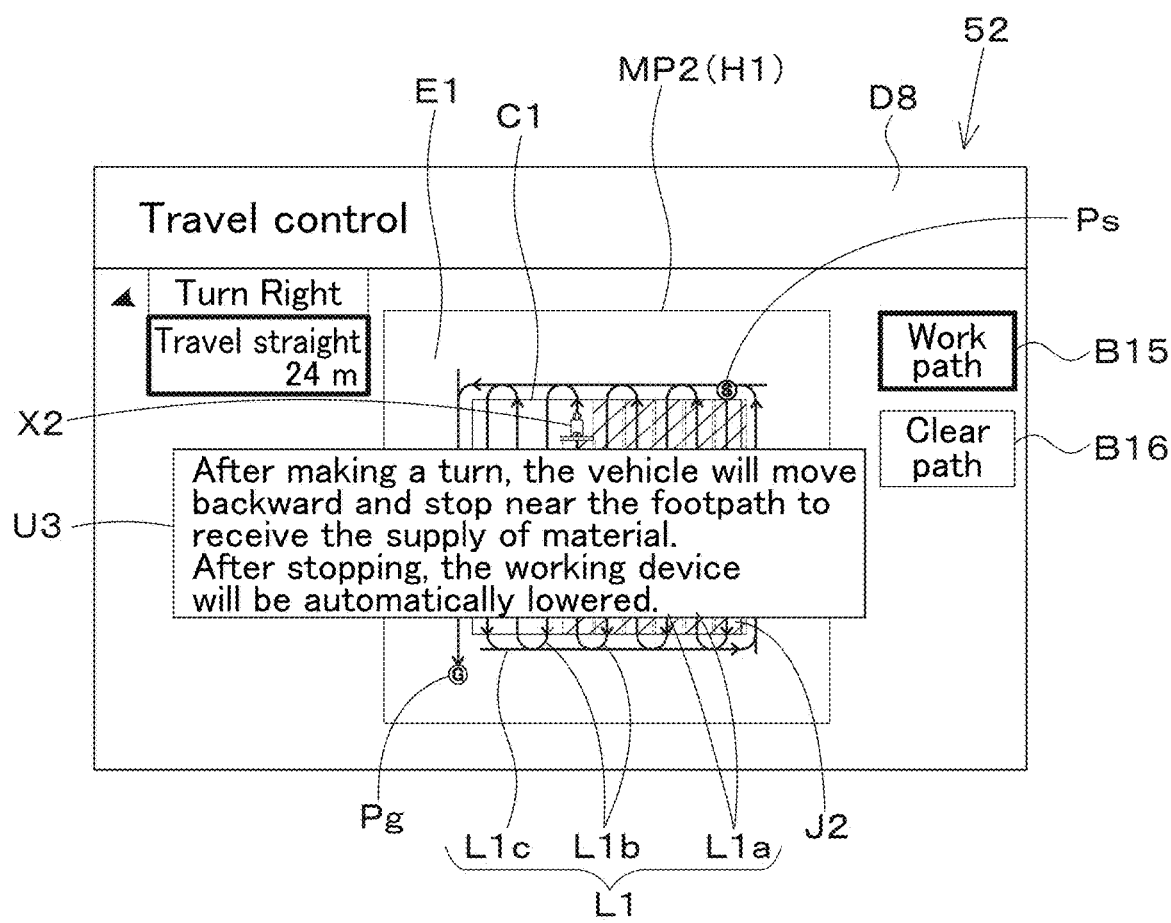
FIG. 23 illustrates an example of a third notification of the agricultural work assistance apparatus.

Next, when the traveling vehicle body 3 passes the third notification point Pc (FIG. 19), the notifier 51g displays the third notification U3 including the message "After making a turn, the vehicle will move backward and stop near the footpath to receive the supply of material." and the message "After stopping, the working device will be automatically lowered." in the central portion of the travel control screen D8 for a certain period as illustrated in FIG. 23. That is, the notifier 51g and the display operation interface 52 provide a notification about when the supply of material is receive, where the supply of material is received, and the behaviors of the traveling vehicle body 3 and the working device 2 for receiving the supply. This third notification U3 is also displayed in an emphasized manner over the other indications on the travel control screen D8.

As described above, before the traveling vehicle body 3 starts moving toward the supply point Pz in the automatic traveling-and-working mode, the notifier 51g provides the notification U1 indicating that the material is running low and the notifications U2 and U3 indicating that the traveling vehicle body 3 will move toward the supply point Pz (provide a plurality of notifications) at intervals, based on the position of the traveling vehicle body 3 detected by the positioning device 40 and the supply point Pz. The notifier 51g provides the notification U2, U3 suggesting that the traveling vehicle body 3 is closer to the supply point Pz and the supply time when the traveling vehicle body 3 is closer to the supply point Pz, among the notification points Pa, Pb, and Pc (the third point Pc is the closest to the supply point Pz, and the first point Pa is the farthest from the supply point Pz). The notifier 51g provides the first notification U1 indicating that the material is running low at the first notification point Pa, and provides, at the second notification point Pb and the third notification point Pc, the second notification U2 and the third notification U3 indicating the supply point Pz and indicating the behavior of the traveling vehicle body 3 and/or the working device 2 in the material-supply-receiving mode. Note that, at the first notification point Pa, the notifier 51g may provide, instead of the first notification U1 described above, a notification indicating when and where the supply of material is received, or the behavior of the traveling vehicle body 3 and/or the working device 2 for receiving the supply.

When the traveling vehicle body 3 passes the notification points Pa, Pb, and Pc in the automatic traveling-and-working mode before entering the material-supply-receiving mode, the notifier 51g may provide notification(s) suggesting receiving the supply of material to people around the traveling vehicle body 3 using the warning generator 63 (FIG. 1). Specifically, for example, a voice message and/or a signal sound including information indicating that the material is running low, the supply point, or the behavior of the traveling vehicle body 3 and/or the working device 2 in the material-supply-receiving mode is/are outputted by a speaker or a buzzer included in the warning generator 63, or the information is transmitted to people around the traveling vehicle body 3 by turning on, turning off, or blinking a warning lamp included in the warning generator 63. Other notifications to be displayed on the display operation interface 52 (described later) may be similarly provided by the warning generator 63.

When the automatic operation controller 61 causes the traveling vehicle body 3 to stop at the supply point Pz in the material-supply-receiving mode of the agricultural machine 1 as illustrated in FIG. 20B, the controller 51 of the agricultural work assistance apparatus 50 causes the display operation interface 52 to display the material information input screen D9 as illustrated in FIG. 18. After supplying material to the working device 2 or the like at the supply point Pz, the user inputs the amount of material introduced, the amount of material consumption per unit, and the remaining amount for entering the material-supply-receiving mode on the material information input screen D9 and selects the next key B9. With this, the controller 51 causes the display operation interface 52 to display the travel control screen D8 again. The remaining amount calculator 51e calculates the remaining amount of the material (the theoretical remaining amount and the remaining amount of the material), the supply point setter 51f sets the below-threshold point Pe, the supply point Pz, and the like, and the notifier 51g sets the notification point(s) Pa, Pb, and/or Pc according to the foregoing procedure.

For example, the user performs a predetermined operation to resume the automatic traveling-and-working mode using the mode switch 65 (FIG. 1). With this, the automatic operation controller 61 causes the traveling vehicle body 3 to move to the starting point Pd of the next straight route portion L1a by automatic operation based on the travel route L1 and the position of the traveling vehicle body 3 as illustrated in FIG. 19, FIG. 20A, and the like, and resumes the automatic traveling-and-working mode. That is, the automatic operation controller 61 causes the working device 2 to perform ground work (resumes work) while causing the traveling vehicle body 3 to travel by automatic operation from the starting point Pd of the next straight route portion L1a based on the travel route L1 and the position of the traveling vehicle body 3.

The preferred embodiments described above discussed an example in which parameters (the amount of material introduced, the amount of material consumption per unit, and the remaining amount for entering the material-supply-receiving mode) used to calculate the remaining amount of the material are inputted on the material information input screen D9 displayed on the display operation interface 52 of the agricultural work assistance apparatus 50, but this does not imply any limitation. For example, the working device 2 may be provided with an input to receive input of the parameters, and the controller 51 of the agricultural work assistance apparatus 50 may acquire, via the communicator 54, the parameters inputted via the input from the working device 2 over the in-vehicle network N1. Additionally or alternatively, for example, the remaining amount for entering the material-supply-receiving mode (threshold used to set the points related to the supply of the material) may be set as a preset fixed value, the fixed value may be stored in the memory 53, and the controller 51 or the supply point setter 51f may read the fixed value from the memory 53 as necessary.

The preferred embodiments described above discussed an example in which, when the amount of material introduced, the amount of material consumption per unit, and the remaining amount for entering the material-supply-receiving mode are inputted via the display operation interface 52 before the automatic traveling-and-working mode is performed or when the automatic traveling-and-working mode is temporarily stopped (when the material is supplied), the remaining amount calculator 51e calculates the remaining amount of the material (theoretical remaining amount and the remaining amount of the material), the supply point setter 51f sets the supply point Pz, and the notifier 51g sets the notification point(s) Pa, Pb, and/or Pc. Alternatively or additionally, for example, during the automatic traveling-and-working mode, the remaining amount calculator 51e may calculate the remaining amount of the material at predetermined interval(s) based on the amount of material introduced, the amount of material consumption per unit, and the states of the traveling vehicle body 3 and the working device 2. Additionally or alternatively, each time the remaining amount calculator 51e calculates the remaining amount of the material in this manner, the supply point setter 51f may set the supply point Pz and the like again and the notifier 51g may set the notification point(s) Pa, Pb, and/or Pc again.

The preferred embodiments described above discussed an example in which fertilizer, chemical agents, seedlings, seeds, or the like is/are supplied to the agricultural field as the material which is used during ground work performed by the working device 2 and the supply of which is received at the supply point Pz. Additionally or alternatively, for example, supply of a material such as fuel or electric power for driving the prime mover 4 of the agricultural machine 1 may be received at the supply point Pz. That is, the material to be additionally supplied to the agricultural machine 1 need only be a vehicle-mounted object that is necessary and decreases as ground work is performed by the working device 2 while the traveling vehicle body 3 is caused to travel.

The agricultural work assistance system 100, the agricultural work assistance apparatus 50, and the agricultural machine 1 of the preferred embodiments described above achieve the following effects.

An agricultural work assistance apparatus 50 of one or more preferred embodiments includes a route creator 51c to create a travel route L1 along which an agricultural machine 1 is to travel in a registered agricultural field (agricultural field map) MP2, and a display (display operation interface) 52 to display a predicted work portion (predicted work path) J1 where the agricultural machine 1 is predicted to perform agricultural work with a working device 2 connected thereto while traveling based on the travel route L1 and/or a predicted non-work portion V1 where the agricultural machine 1 is predicted not to perform agricultural work with the working device 2. With this configuration, before agricultural work is performed by the agricultural machine 1 in the agricultural field, the predicted work portion J1 and/or the predicted non-work portion V1 are displayed on the display 52 and visually recognizable, thus improving convenience and work efficiency during agricultural work.

In one or more preferred embodiments, the display 52 may be operable to display a predicted work portion J1 where the agricultural machine 1 is predicted to perform agricultural work with the working device 2 while traveling by automatic operation based on the travel route L1 and/or a predicted non-work portion V1 where the agricultural machine 1 is predicted not to perform agricultural work with the working device 2. With this, before agricultural work is performed by the working device 2 while the agricultural machine 1 is caused to travel by automatic operation in the agricultural field, the predicted work portion J1 where agricultural work is predicted to be performed by automatic operation and/or the predicted non-work portion V1 is/are displayed on the display 52 and visually recognizable, thus improving convenience and work efficiency during agricultural work.

In one or more preferred embodiments, the display 52 may be operable to display the predicted work portion J1 and the predicted non-work portion V1 in different manners. With this, before agricultural work is performed by the agricultural machine 1 in the agricultural field, the predicted work portion J1 and the non-work portion V1 are visually recognizable and easily distinguished from each other, thus further improving convenience and work efficiency during agricultural work.

In one or more preferred embodiments, the display 52 may be operable to display an actual work portion (actual work path) J2 where the agricultural machine 1 has performed agricultural work with the working device 2 while traveling based on the travel route L1 and/or an actual non-work portion V2 where the agricultural machine 1 has not performed agricultural work with the working device 2. With this, during agricultural work performed by the agricultural machine 1 in the agricultural field and/or after the agricultural work, the actual work portion J2 and/or the actual non-work portion V2 is/are displayed on the display 52 and visually recognizable, thus further improving convenience and work efficiency of agricultural work.

In one or more preferred embodiments, the display 52 may be operable to display an actual work portion J2 where the agricultural machine 1 has performed agricultural work with the working device 2 while traveling by automatic operation based on the travel route L1 and/or an actual non-work portion V2 where the agricultural machine 1 has not performed agricultural work with the working device 2. With this, during agricultural work performed by the working device 2 while the agricultural machine 1 is caused to travel by automatic operation in the agricultural field and/or after the agricultural work, the actual work portion J2 where agricultural work has been performed by automatic operation and/or the actual non-work portion V2 is/are displayed on the display 52 and visually recognizable, thus further improving convenience and the work efficiency of agricultural work.

In one or more preferred embodiments, the display 52 may be operable to display the actual work portion J2 and the actual non-work portion V2 in different manners. With this, during agricultural work performed by the agricultural machine 1 in the agricultural field and/or after the agricultural work performed by the agricultural machine 1, the actual work portion J2 and the actual non-work portion V2 are visually recognizable and easily distinguished from each other, thus further improving convenience and the work efficiency of agricultural work.

In one or more preferred embodiments, the agricultural work assistance apparatus may further include a path calculator 51d to calculate a predicted work path of the working device 2 based on a working width of the working device 2 and the travel route L1, the predicted work path being the predicted work portion J1. The display 52 may be operable to display the predicted work path J1 together with the agricultural field MP2 and the travel route L1. With this, the predicted work path J1 along which agricultural work is to be performed by the working device 2 is visually recognizable together with the agricultural field MP2 and the travel route L1, thus further improving convenience and work efficiency when agricultural work is performed by the agricultural machine 1.

In one or more preferred embodiments, the agricultural work assistance apparatus may further include an input (display operation interface) 52 to receive input of an overlap between working widths of the working device 2 and/or a headland count indicating the number of one or more headlands E2a, E2b, and/or E2c set along a contour H1 of the agricultural field MP2 in the agricultural field MP2, and an area definer 51b to define a first area (headland area) E1 including the one or more headlands E2a, E2b, and/or E2c and a second area (central area) C1 located inward of the first area E1, based on the working width, the overlap, and/or the headland count. The route creator 51c may create the travel route L1 in the first area E1 and the second area C1, and the path calculator 51d calculates the predicted work path J1, based at least on a portion of the travel route (straight route portion) L1a that is created in the second area C1.

With the above configuration, the predicted work path J1 calculated based on the portion of the travel route (straight route portion) L1a that is created in the second area C1 is visually recognizable, thus further improving convenience and work efficiency when agricultural work is performed by the agricultural machine 1 in the second area C1. Furthermore, when a predicted work path J1 calculated based on a travel route (go-around route) L1c created in the first area E1 is displayed on the display 52 and is visually recognizable, the convenience and work efficiency are further improved when agricultural work is performed by the agricultural machine 1 in the first area E1.

In one or more preferred embodiments, the travel route L1, the predicted work path J1, and content displayed by the display 52 may be updated according to changes in content inputted via the input 52. With this, it is possible to reenter the values of the working width of the working device 2, the overlap, and/or the headland count via the input 52 and to visually recognize changes in the travel route L1 and the predicted work path J1, making it possible to further improve convenience and work efficiency when agricultural work is performed by the agricultural machine 1.

In one or more preferred embodiments, the path calculator 51d may calculate an actual work path J2, based on the working width and one or more positions of the agricultural machine 1 obtained when the agricultural machine 1 performs agricultural work with the working device 2 while traveling based on the travel route L1. The display 52 may be operable to display a position of the agricultural machine 1 and the actual work path J2 together with the agricultural field MP2 and the travel route L1. With this, during agricultural work performed by the agricultural machine 1 in the agricultural field and/or after the agricultural work, the actual work path J2 is displayed on the display 52 and visually recognizable, thus improving convenience and the work efficiency of agricultural work.

In one or more preferred embodiments, the agricultural work assistance apparatus may further include a memory 53 to store a plurality of the predicted work paths J1 and a plurality of the actual work paths J2. The display 52 displays, in different manners, two or more of the plurality of predicted work paths J1 and two or more of the plurality of actual work paths J2 stored in the memory 53. With this, the plurality of predicted work paths J1 and the plurality of actual work paths J2 when agricultural work is performed by the agricultural machine 1 in the agricultural field are displayed on the display 52 and easily visually recognizable, thus further improving convenience and the work efficiency of agricultural work.

An agricultural work assistance system 100 of one or more preferred embodiments includes the agricultural work assistance apparatus 50 and an agricultural machine 1 which is configured to travel and to which a working device 2 for agricultural work is connectable. With this configuration, before agricultural work is performed by the agricultural machine 1 in the agricultural field, the predicted work portion J1 and/or the predicted non-work portion V1 is/are displayed on the display 52 of the agricultural work assistance apparatus 50 and visually recognizable. Furthermore, during agricultural work performed by the agricultural machine 1 in the agricultural field or after the agricultural work, the actual work path J2 and/or the actual non-work portion V2 is/are displayed on the display 52 and visually recognizable. This makes it possible to improve convenience and work efficiency when agricultural work is performed by the agricultural machine 1 in the agricultural field.

In one or more preferred embodiments, the agricultural work assistance system 100 may further include a position detector (positioning device) 40 to detect a position of the agricultural machine 1, and an automatic operation controller 61 to perform an automatic traveling-and-working mode in which the automatic operation controller 61 causes the working device 2 connected to the agricultural machine 1 to perform agricultural work while causing the agricultural machine 1 to travel by automatic operation. The agricultural machine 1 may include the agricultural work assistance apparatus 50, the position detector 40, and the automatic operation controller 61. The automatic operation controller 61 may perform the automatic traveling-and-working mode, based on a travel route L1 created by the route creator 51c included in the agricultural work assistance apparatus 50 and the position of the agricultural machine 1 detected by the position detector 40.

With the above configuration, before agricultural work is performed by the agricultural machine 1 in the agricultural field in the automatic traveling-and-working mode, the predicted work portion J1 where agricultural work is predicted to be performed by the working device 2 while the agricultural machine 1 is caused to travel by automatic operation and/or the predicted non-work portion V1 is/are displayed on the display 52 of the agricultural work assistance apparatus 50 and visually recognizable. Furthermore, during agricultural work performed by the agricultural machine 1 in the agricultural field in the automatic traveling-and-working mode and/or after the agricultural work, the agricultural field (agricultural field map) MP2, the travel route L1, the position of the agricultural machine 1, the actual work path J2 where agricultural work has been performed by automatic operation of the agricultural machine 1, and/or the actual non-work portion V2 is/are displayed on the display 52 and visually recognizable. This further improves convenience and work efficiency when agricultural work is performed by the agricultural machine 1 in the agricultural field.

An agricultural machine 1 of one or more preferred embodiments includes the agricultural work assistance apparatus 50, a traveling vehicle body 3 to travel, a connector 8g or 8h to connect a working device 2 for agricultural work to the traveling vehicle body 3, and a position detector 40 to detect a position of the traveling vehicle body 3. With this, before agricultural work is performed by the agricultural machine 1 in the agricultural field, the predicted work portion J1 and/or the predicted non-work portion V1 is/are displayed on the display 52 of the agricultural work assistance apparatus 50 of the agricultural machine 1 and visually recognizable. Furthermore, during agricultural work performed by the agricultural machine 1 in the agricultural field and/or after the agricultural work, the actual work path J2 and/or the actual non-work portion V2 is/are displayed on the display 52 and visually recognizable. This improves convenience and work efficiency when agricultural work is performed by the agricultural machine 1 in the agricultural field.

In one or more preferred embodiments, the agricultural machine 1 may further include an automatic operation controller 61 to perform an automatic traveling-and-working mode in which the automatic operation controller 61 causes the working device 2 to perform agricultural work while causing the traveling vehicle body 3 to travel by automatic operation. With this, before the automatic traveling-and-working mode is performed by the agricultural machine 1 in the agricultural field, the predicted work portion J1 where agricultural work is predicted to be performed by automatic operation of the agricultural machine 1 and/or the predicted non-work portion is/are displayed on the display 52 of the agricultural work assistance apparatus 50 and visually recognizable. Furthermore, during agricultural work performed by the agricultural machine 1 in the agricultural field in the automatic traveling-and-working mode and/or after the agricultural work, the agricultural field MP2, the travel route L1, the position of the agricultural machine 1, the actual work path J2 where agricultural work has been performed by automatic operation of the agricultural machine 1, and/or the actual non-work portion V2 is/are displayed on the display 52 and visually recognizable. This improves convenience and work efficiency when agricultural work is performed in the automatic traveling-and-working mode of the agricultural machine 1 in the agricultural field.

An agricultural machine 1 according to one or more preferred embodiments includes a traveling vehicle body 3 to travel, a connector 8g, 8h to connect a working device 2 for agricultural work to the traveling vehicle body 3, a route creator 51c to create a travel route L1 along which the traveling vehicle body 3 is to travel by automatic operation, a supply point setter 51f to set, at a location that is off the travel route L1, a supply point Pz at which supply of a material used during agricultural work performed by the working device 2 is to be received, a position detector (positioning device) 40 to detect a position of the traveling vehicle body 3, an automatic operation controller 61 to cause the traveling vehicle body 3 to travel by automatic operation based on the position of the traveling vehicle body 3 and the travel route L1 and cause the traveling vehicle body 3 to move to the supply point Pz, and a notifier 51g to provide a notification indicating that the traveling vehicle body 3 is about to move toward the supply point Pz, while the automatic operation controller 61 causes the traveling vehicle body 3 to travel by automatic operation.

With the above configuration, a notification indicating that the traveling vehicle body 3 is about to move toward the supply point Pz is provided in advance while the traveling vehicle body 3 of the agricultural machine 1 is caused to travel by automatic operation. This makes it possible to eliminate or reduce the likelihood that, when the traveling vehicle body 3 has started moving toward the supply point Pz, a user who has looked at the behavior of the traveling vehicle body 3 will misunderstand that the user is in danger. Thus, it is possible to reduce the likelihood that the user will stop the agricultural machine 1 immediately because of such misunderstanding, making it possible to supply the agricultural machine 1 with material efficiently. It follows that the work efficiency of agricultural work performed by the agricultural machine 1 can be improved.

In one or more preferred embodiments, the notifier 51g may provide a plurality of the notifications each indicating that the traveling vehicle body 3 is about to move toward the supply point Pz at one or more predetermined intervals, before the traveling vehicle body 3 moves toward the supply point Pz. With this configuration, it is possible to further reduce the likelihood that, when the traveling vehicle body 3 of the agricultural machine 1 traveling by automatic operation has started moving toward the supply point Pz, the user will misunderstand that the user is in danger and immediately stop the agricultural machine 1 because of such misunderstanding.

In one or more preferred embodiments, the automatic operation controller 61 may perform an automatic traveling-and-working mode in which the automatic operation controller 61 causes the working device 2 to perform agricultural work while causing the traveling vehicle body 3 to travel by automatic operation based on the position of the traveling vehicle body 3 and the travel route L1, and perform a material-supply-receiving mode in which the automatic operation controller 61 causes the traveling vehicle body 3 to move to the supply point Pz by automatic operation upon the traveling vehicle body 3 reaching a predetermined point Pd on the travel route L1 that is just before the supply point Pz during the automatic traveling-and-working mode. The notifier 51g may provide, during the automatic traveling-and-working mode, a plurality of the notifications indicating that the traveling vehicle body 3 is about to move toward the supply point Pz at one or more predetermined intervals, based on the position of the traveling vehicle body 3 and the supply point Pz.

With the above configuration, the material-supply-receiving mode in which the traveling vehicle body 3 is caused to move to the supply point Pz by automatic operation is started during the automatic traveling-and-working mode of the agricultural machine 1. This makes it possible to supply the agricultural machine 1 with material more efficiently. Furthermore, since a notification indicating that the traveling vehicle body 3 is about to move toward the supply point Pz is provided in advance during the automatic traveling-and-working mode, it is possible to further reduce the likelihood that, when the traveling vehicle body 3 has started moving toward the supply point Pz, the user will misunderstand that the user is in danger and immediately stop the agricultural machine 1 because of such misunderstanding.

In one or more preferred embodiments, the notifier 51g may provide a notification of information indicating that the material is running short, the supply point Pz, and/or a behavior of the traveling vehicle body 3 and/or the working device 2 in the material-supply-receiving mode. With this configuration, when agricultural work is performed by the working device 2 while the traveling vehicle body 3 of the agricultural machine 1 is caused to travel by automatic operation and before the traveling vehicle body 3 starts moving toward the supply point Pz, the user can recognize the necessity of receiving material supply, the supply point Pz, the time at which the material supply is to be received, and/or the behavior of the traveling vehicle body 3 and/or the working device 2 for receiving material supply. This makes it possible to further reduce the likelihood that, when the traveling vehicle body 3 has started to move to the supply point Pz, the user will misunderstand that the user is in danger and immediately stop the agricultural machine 1 because of such misunderstanding. It is also possible to prepare material in advance at the supply point Pz, making it possible to supply the agricultural machine 1 with material more efficiently.

In one or more preferred embodiments, the travel route L1 may include work route portions L1a, L1c (straight route portion(s) L1a, go-around route portion(s) Lk) along which agricultural work is to be performed by the working device 2 while the traveling vehicle body 3 travels, and turn route portions L1b along each of which the traveling vehicle body is to turn from one of adjacent ones of the work route portions L1a, L1c to the other of the adjacent ones of the work route portions L1a, L1c. The notifier 51g may provide the notification indicating that the traveling vehicle body 3 is about to move toward the supply point Pz, when the traveling vehicle body 3 travels based on one of the work route portions L1a, L1c or one of the turn route portions L1b before moving toward the supply point Pz.

With the above configuration, a notification indicating that the traveling vehicle body 3 of the agricultural machine 1 traveling by automatic operation is about to move toward the supply point Pz is provided somewhat before the traveling vehicle body 3 starts moving toward the supply point Pz. This make it possible to further reduce the likelihood that, when the traveling vehicle body 3 has started moving toward the supply point Pz, the user will misunderstand that the user is in danger and immediately stop the agricultural machine 1 because of such misunderstanding. Furthermore, since the notifier 51g provides a plurality of notifications at interval(s) at work route portion(s) L1a and/or L1c and/or turn route portion(s) L1b before moving toward the supply point Pz, it is possible to further reduce the likelihood that the user will misunderstand that the user is in danger and immediately stop the agricultural machine 1.

In one or more preferred embodiments, the agricultural machine 1 may further include a remaining amount calculator 51e to calculate a remaining amount of the material based on the amount of the material introduced into the working device 2 and the amount of the material consumed during agricultural work performed by the working device 2. The supply point setter 51f may predict a below-threshold point Pe at which the remaining amount of the material falls below a predetermined threshold (remaining amount for entering the material-supply-receiving mode) because of agricultural work performed by the working device 2 while the traveling vehicle body 3 travels, and set the supply point Pz on an extension L4 of one of the work route portions (straight route portions) L1a that includes the below-threshold point Pe, the extension extending in a direction opposite to a direction of travel. The notifier 51g may set a notification point Pa, Pb, Pc on another of the work route portions (straight route portions) L1a along which the traveling vehicle body 3 travels before the one of the work route portions L1a, and provide the notification indicating that the traveling vehicle body 3 is about to move toward the supply point Pz when the traveling vehicle body 3 passes the notification point Pa, Pb, Pc.

With the above configuration, before agricultural work is performed by the working device 2 while the traveling vehicle body 3 of the agricultural machine 1 is caused to travel by automatic operation based on the one of the work route portions L1a that includes the below-threshold point Pe at which the remaining amount of the material falls below the threshold, the traveling vehicle body 3 can be moved to the supply point Pz by the automatic operation and the supply of material can be received efficiently. Furthermore, when the traveling vehicle body 3 travels by automatic operation based on the other of the work route portions L1a preceding the one of the work route portions L1a, a notification indicating that the traveling vehicle body 3 is about to move toward the supply point Pz is provided. This makes it is possible to further reduce the likelihood that, when the traveling vehicle body 3 has started moving toward the supply point Pz, the user will misunderstand that the user is in danger and immediately stop the agricultural machine 1 because of such misunderstanding.

In one or more preferred embodiments, the agricultural machine 1 may further include an input (display operation interface) 52 to receive input of the amount of the material introduced and the amount of the material consumption per unit area. The remaining amount calculator 51e may, before or during travel of the traveling vehicle body 3 by automatic operation, calculate the remaining amount of the material based on the amount of the material introduced, the amount of the material consumption per unit area, and states of the traveling vehicle body 3 and the working device 2. The supply point setter 51f may, before or during travel of the traveling vehicle body 3 by automatic operation, set the supply point Pz based on the remaining amount of the material. The notifier 51g may, before or during travel of the traveling vehicle body 3 by automatic operation, set the notification point Pa, Pb, Pc based on the supply point Pz. With this configuration, the remaining amount of the material can be accurately calculated, and the supply point Pz and the notification point(s) Pa, Pb, and/or Pc can be appropriately set.

In one or more preferred embodiments, the agricultural machine 1 may further include a threshold changer (display operation interface) 52 to change the threshold (the remaining amount for entering the material-supply-receiving mode). Thus, it is possible to change the notification point(s) Pa, Pb, and/or Pc at which a notification is provided indicating, for example, the point in time at which the agricultural machine 1 enters the material-supply-receiving mode, the material supply point Pz, and an indication that the traveling vehicle body 3 is about to move toward the supply point Pz.

In one or more preferred embodiments, the agricultural machine 1 may further include a display (display operation interface) 52 to display, on a screen, the notification provided by the notifier 51g. With this, the user can, by looking at the notification displayed on the display 52, easily recognize in advance that the traveling vehicle body 3 is about to move toward the supply point Pz.

In one or more preferred embodiments, the agricultural machine 1 may further include a warning generator 63 to issue a warning indicating, via sound or light, the notification provided by the notifier 51g. This allows the user and/or the like around the traveling vehicle body 3 to easily recognize in advance that the traveling vehicle body 3 is about to move toward the supply point Pz.

An agricultural work assistance apparatus 50 according to one or more preferred embodiments, the agricultural work assistance apparatus 50 being provided in or on an agricultural machine 1, includes a route creator 51c to create a travel route L1 along which a traveling vehicle body 3 of the agricultural machine 1 is to travel by automatic operation a supply point setter 51f to set, at a location that is off the travel route L1, a supply point Pz at which supply of a material used during agricultural work performed by a working device 2 connected to the traveling vehicle body 3 is to be received, and a notifier 51g to provide a notification indicating that the traveling vehicle body 3 is about to move toward the supply point Pz, while the agricultural machine 1 causes the traveling vehicle body 3 to travel by automatic operation based on a position of the traveling vehicle body 3 detected by a position detector 40 and the travel route L1.

With the above configuration, a notification indicating that the traveling vehicle body 3 is about to move toward the supply point Pz is provided in advance by the notifier 51g of the agricultural work assistance apparatus 50 while the traveling vehicle body 3 of the agricultural machine 1 is caused to travel by automatic operation. This makes it possible to eliminate or reduce the likelihood that, when the traveling vehicle body 3 has started moving toward the supply point Pz, the user will misunderstand that the user is in danger and stop the agricultural machine 1 immediately because of such misunderstanding, making it possible to supply the agricultural machine 1 with material efficiently. It follows that the work efficiency of agricultural work performed by the agricultural machine 1 can be improved.

In one or more preferred embodiments, the agricultural work assistance apparatus may further include a remaining amount calculator 51e to calculate a remaining amount of the material for the supply point setter 51f to set the supply point Pz, an input (display operation interface) 52 to receive input of one or more parameters for the remaining amount calculator 51e to calculate the remaining amount of the material, and a display (display operation interface) 52 to display the travel route L1, the position of the traveling vehicle body 3, and the notification provided by the notifier 51g.

With the above configuration, the user can input the parameter(s) used to calculate the remaining amount of the material via the input 52 of the agricultural work assistance apparatus and visually recognize the prior notification indicating that the traveling vehicle body 3 is about to move toward the supply point Pz on the display 52, making it possible to improve convenience. This makes it possible to further reduce the likelihood that, when the traveling vehicle body 3 has started moving toward the supply point Pz, the user will misunderstand that the user is in danger and stop the agricultural machine 1 immediately because of such misunderstanding, making it possible to supply the agricultural machine 1 with material more efficiently.

An agricultural work assistance system 100 according one or more preferred embodiments includes an agricultural machine 1, and an agricultural work assistance apparatus 50 provided in or on the agricultural machine 1, wherein the agricultural work assistance apparatus includes a route creator 51c to create a travel route L1 along which a traveling vehicle body 3 of the agricultural machine 1 is to travel by automatic operation, a supply point setter 51f to set, at a location that is off the travel route L1, a supply point Pz at which supply of a material used during agricultural work performed by a working device 2 connected to the traveling vehicle body 3 is to be received, a communicator 54 to communicate with an automatic operation controller 61 and a position detector 40 of the agricultural machine 1, and a notifier 51g to provide a notification indicating that the traveling vehicle body 3 is about to move toward the supply point Pz, while the automatic operation controller 61 causes the traveling vehicle body 3 to travel by automatic operation based on the position of the traveling vehicle body 3 detected by the position detector 40 and the travel route L1.

With the above configuration, when the automatic operation controller 61 of the agricultural machine 1 causes the traveling vehicle body 3 to travel by automatic operation, the notifier 51g of the agricultural work assistance apparatus 50 provides in advance a notification indicating that the traveling vehicle body 3 is about to move toward the supply point Pz. This makes it possible to further reduce the likelihood that, when the traveling vehicle body 3 has started moving toward the supply point Pz, the user will misunderstand that the user is in danger and stop the agricultural machine 1 immediately because of such misunderstanding, making it possible to supply the agricultural machine 1 with material more efficiently. Furthermore, the notifier 51g of the agricultural work assistance apparatus 50 can provide in advance a notification indicating that the traveling vehicle body 3 is about to move toward the supply point Pz, based on the position of the traveling vehicle body 3 detected by the position detector 40. Further, the automatic operation controller 61 of the agricultural machine 1 can acquire the travel route L1 and the supply point Pz set by the agricultural work assistance apparatus 50, and cause the working device 2 to perform agricultural work with while causing the traveling vehicle body 3 to travel by automatic operation based on the travel route L1 and the supply point Pz and/or the like, and can cause the traveling vehicle body 3 to move to the supply point Pz by automatic operation, making it possible to more efficiently perform agricultural work and receive the supply of material.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
   a traveling vehicle body to travel;
   a three-point linkage which is provided at a rear portion of the traveling vehicle body and to which a working device for agricultural work is connectable;
   a controller including a processor and one or more memories and being configured or programmed to create a travel route along which the traveling vehicle body is to travel by automatic operation, and to set, at a location that is off the travel route, a supply point at which supply of a material used during agricultural work performed by the working device is to be received;
   a position detector to detect a position of the traveling vehicle body using a satellite positioning system;
   an automatic operation controller to cause the traveling vehicle body to travel by automatic operation based on the position of the traveling vehicle body and the travel route and cause the traveling vehicle body to move to the supply point; and
   a display; wherein
   the travel route includes work route portions along which agricultural work is to be performed by the working device while the traveling vehicle body travels, and turn route portions along each of which the traveling vehicle body is to turn from one of adjacent ones of the work route portions to the other of the adjacent ones of the work route portions;
   the controller is configured or programmed to:
   calculate a remaining amount of the material based on the amount of the material introduced into the working device and the amount of the material consumed during agricultural work performed by the working device;

predict a below-threshold point at which the remaining amount of the material falls below a predetermined threshold because of agricultural work performed by the working device while the traveling vehicle body travels by automatic operation;

set the supply point on an extension of one of the work route portions that includes the below-threshold point, the extension extending in a direction opposite to a direction of travel;

set a notification point on another of the work route portions along which the traveling vehicle body travels before traveling along the one of the work route portions that includes the below-threshold point, the another of the work route portions on which the notification point is set does not include the below-threshold point; and cause the display to display, on a screen displayed thereon, a notification indicating that the traveling vehicle body is about to move toward the supply point when the traveling vehicle body passes the notification point while the automatic operation controller causes the traveling vehicle body to travel by automatic operation.

2. The agricultural machine according to claim 1, wherein the controller is configured or programmed to:
set a plurality of the notification points on the other of the work route portions; and
cause the display to display, on the screen, the notification when the traveling vehicle body passes each of the plurality of notification points before the traveling vehicle body moves toward the supply point while the automatic operation controller causes the traveling vehicle body to travel by automatic operation.

3. The agricultural machine according to claim 1, wherein the automatic operation controller is configured or programmed to:
perform an automatic traveling-and-working mode in which the automatic operation controller causes the working device to perform agricultural work while causing the traveling vehicle body to travel by automatic operation based on the position of the traveling vehicle body and the travel route; and
perform a material-supply-receiving mode in which the automatic operation controller causes the traveling vehicle body to move to the supply point by automatic operation upon the traveling vehicle body reaching a predetermined point on the travel route that is just before the supply point during the automatic traveling-and-working mode; and
the controller is configured or programmed to cause the display to display, on the screen, the notification when the traveling vehicle body passes the notification point during the automatic traveling-and-working mode before entering the material-supply-receiving mode.

4. The agricultural machine according to claim 3, wherein the controller is configured or programmed to provide the notification including at least one of information indicating that the material is running short, information indicating the supply point, or information indicating a behavior of at least one of the traveling vehicle body or the working device in the material-supply-receiving mode.

5. The agricultural machine according to claim 1, further comprising:
an input to receive input of the amount of the material introduced and the amount of the material consumption per unit area; wherein the controller is configured or programmed to, before or during travel of the traveling vehicle body by automatic operation:
calculate the remaining amount of the material based on the amount of the material introduced, the amount of the material consumption per unit area, and states of the traveling vehicle body and the working device;
set the supply point based on the remaining amount of the material; and
set the notification point based on the below-threshold point and the supply point.

6. The agricultural machine according to claim 1, further comprising a threshold changer to change the threshold.

7. The agricultural machine according to claim 1, further comprising a warning generator to issue a warning indicating, via sound or light, the notification.

8. An agricultural work assistance apparatus comprising:
a controller including a processor and one or more memories and being configured or programmed to create a travel route along which a traveling vehicle body of an agricultural machine is to travel by automatic operation, and to set, at a location that is off the travel route, a supply point at which supply of a material used during agricultural work performed by a working device connected to the traveling vehicle body is to be received; and
a display; wherein
the travel route includes work route portions along which agricultural work is to be performed by the working device while the traveling vehicle body travels, and turn route portions along each of which the traveling vehicle body is to turn from one of adjacent ones of the work route portions to the other of the adjacent ones of the work route portions;
the controller is configured or programmed to:
calculate a remaining amount of the material based on the amount of the material introduced into the working device and the amount of the material consumed during agricultural work performed by the working device;
predict a below-threshold point at which the remaining amount of the material falls below a predetermined threshold because of agricultural work performed by the working device while the traveling vehicle body travels by automatic operation;
set the supply point on an extension of one of the work route portions that includes the below-threshold point, the extension extending in a direction opposite to a direction of travel;
set a notification point on another of the work route portions along which the traveling vehicle body travels before traveling along the one of the work route portions that includes the below-threshold point, the another of the work route portions on which the notification point is set does not include the below-threshold point; and
cause the display to display, on a screen displayed thereon, a notification indicating that the traveling vehicle body is about to move toward the supply point when the traveling vehicle body passes the notification point while the agricultural machine causes the traveling vehicle body to travel by automatic operation based on a position of the traveling vehicle body detected by a position detector using a satellite positioning system and the travel route.

9. The agricultural work assistance apparatus according to claim 8, further comprising:
an input to receive input of one or more parameters used to calculate the remaining amount of the material.

10. An agricultural work assistance system comprising:
a controller including a processor and one or more memories and being configured or programmed to create a travel route along which a traveling vehicle body of an agricultural machine is to travel by automatic operation, and to set, at a location that is off the travel route, a supply point at which supply of a material used during agricultural work performed by a working device connected to the traveling vehicle body is to be received;
a position detector to detect a position of the traveling vehicle body using a satellite positioning system;
an automatic operation controller to cause the traveling vehicle body to travel by automatic operation based on the position of the traveling vehicle body and the travel route and cause the traveling vehicle body to move to the supply point; and
a display; wherein
the travel route includes work route portions along which agricultural work is to be performed by the working device while the traveling vehicle body travels, and turn route portions along each of which the traveling vehicle body is to turn from one of adjacent ones of the work route portions to the other of the adjacent ones of the work route portions;
the controller is configured or programmed to:
calculate a remaining amount of the material based on the amount of the material introduced into the working device and the amount of the material consumed during agricultural work performed by the working device;
predict a below-threshold point at which the remaining amount of the material falls below a predetermined threshold because of agricultural work performed by the working device while the traveling vehicle body travels by automatic operation;
set the supply point on an extension of one of the work route portions that includes the below-threshold point, the extension extending in a direction opposite to a direction of travel;
set a notification point on another of the work route portions along which the traveling vehicle body travels before traveling along the one of the work route portions that includes the below-threshold point, the another of the work route portions on which the notification point is set does not include the below-threshold point; and
cause the display to display, on a screen displayed thereon, a notification indicating that the traveling vehicle body is about to move toward the supply point when the traveling vehicle body passes the notification point while the automatic operation controller causes the traveling vehicle body to travel by automatic operation based on the position of the traveling vehicle body detected by the position detector and the travel route.

11. The agricultural work assistance system according to claim 10, comprising:
the agricultural machine; and
an agricultural work assistance apparatus provided in or on the agricultural machine; wherein
the agricultural machine includes the position detector and the automatic operation controller; and
the agricultural work assistance apparatus includes the controller, the display, and a communicator to communicate with the automatic operation controller and the position detector.

12. The agricultural machine according to claim 1, wherein
the controller is configured or programmed to:
set a plurality of the notification points on another two or more of the work route portions along which the traveling vehicle body travels before the one of the work route portions that includes the below-threshold point;
cause the display to display, on the screen, a first notification indicating that the material is running short when the traveling vehicle body passes a first notification point of the plurality of notification points that is farthest from the supply point;
cause the display to display, on the screen, a second notification when the traveling vehicle body passes a second notification point of the plurality of notification points; and
cause the display to display, on the screen, a third notification when the traveling vehicle body passes a third notification point of the plurality of notification points that is closest to the supply point; and
the second and third notifications each indicate when the supply of the material is received, where the supply of the material is received, and behaviors of the traveling vehicle body and the working device for receiving the supply.

13. The agricultural machine according to claim 12, wherein
the controller is configured or programmed to:
set, as the first notification point, a starting point of a work route portion traveled by the traveling vehicle body three lines before the one of the work route portions that includes the below-threshold point;
set, as the second notification point, a starting point of an adjacent work route portion adjacent to the one of the work route portions and traveled by the traveling vehicle body immediately before the one of the work route portions; and
set, as the third notification point, a point which is on the adjacent work route portion and which is displaced from an end point toward the starting point of the adjacent work route portion.

* * * * *